(12) United States Patent
Brown et al.

(10) Patent No.: US 10,810,052 B2
(45) Date of Patent: *Oct. 20, 2020

(54) METHODS AND SYSTEMS TO PROACTIVELY MANAGE USAGE OF COMPUTATIONAL RESOURCES OF A DISTRIBUTED COMPUTING SYSTEM

(71) Applicant: VMware, Inc., Palo Alto, CA (US)

(72) Inventors: Darren Brown, Seattle, WA (US); Junyuan Lin, Seattle, WA (US); Paul Pedersen, Palo Alto, CA (US); Keshav Mathur, Palo Alto, CA (US); Peng Gao, Palo Alto, CA (US); Xing Wang, Palo Alto, CA (US); Leah Nutman, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/046,706

(22) Filed: Jul. 26, 2018

(65) Prior Publication Data

US 2019/0317829 A1 Oct. 17, 2019

Related U.S. Application Data

(63) Continuation-in-part of application No. 15/951,523, filed on Apr. 12, 2018.

(51) Int. Cl.
*G06F 17/18* (2006.01)
*G06F 9/50* (2006.01)
(Continued)

(52) U.S. Cl.
CPC .......... *G06F 9/5083* (2013.01); *G06F 9/4856* (2013.01); *G06F 9/5077* (2013.01); *G06F 11/3409* (2013.01); *G06F 17/18* (2013.01); *G06N 7/08* (2013.01); *G06F 2201/835* (2013.01); *G06F 2209/5019* (2013.01); *G06F 2209/5022* (2013.01)

(58) Field of Classification Search
CPC ............. G06F 17/18; G06F 2209/5019; G06F 2009/4557; G06F 9/5027; G06F 9/5083
See application file for complete search history.

(56) References Cited

U.S. PATENT DOCUMENTS

2010/0083248 A1* 4/2010 Wood .................... G06F 9/5077
718/1
2015/0308938 A1* 10/2015 Scheucher ......... G01N 33/0006
73/1.06

* cited by examiner

*Primary Examiner* — Dong U Kim

(57) ABSTRACT

Computational methods and systems that proactively manage usage of computational resources of a distributed computing system are described. A sequence of metric data representing usage of a resource is detrended to obtain a sequence of non-trendy metric data. Stochastic process models, a pulse wave model and a seasonal model of the sequence of non-trendy metric data are computed. When a forecast request is received, a sequence of forecasted metric data is computed over a forecast interval based on the estimated trend and one of the pulse wave or seasonal model that matches the periodicity of the sequence of non-trendy metric data. Alternatively, the sequence of forecasted metric data is computed based on the estimated trend and the stochastic process model with a smallest accumulated residual error. Usage of the resource by virtual objects of the distributed computing system may be adjusted based on the sequence of forecasted metric data.

21 Claims, 42 Drawing Sheets

(51) Int. Cl.
*G06F 9/48* (2006.01)
*G06F 11/34* (2006.01)
*G06N 7/08* (2006.01)

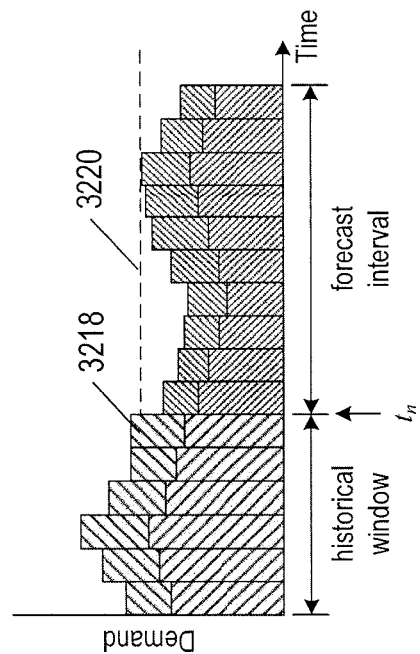
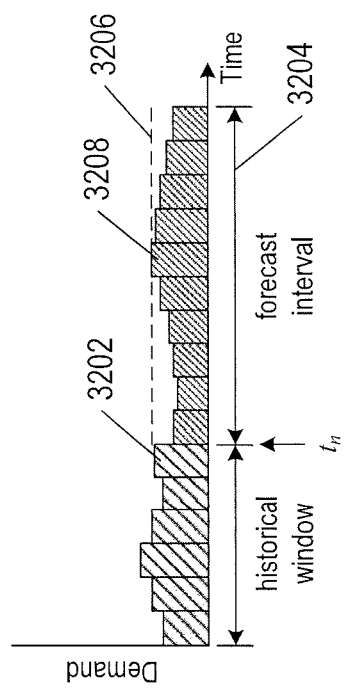
FIG. 32A
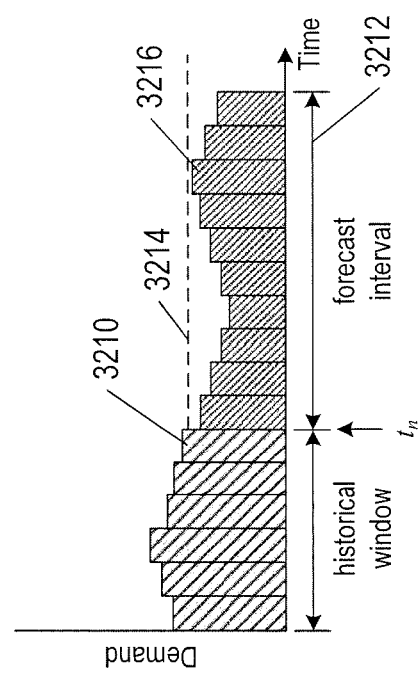
FIG. 32B
FIG. 32C

US 10,810,052 B2

METHODS AND SYSTEMS TO PROACTIVELY MANAGE USAGE OF COMPUTATIONAL RESOURCES OF A DISTRIBUTED COMPUTING SYSTEM

CROSS-REFERENCE TO RELATED APPLICATION

This application is a continuation-in-part of patent application Ser. No. 15/951,523 filed Apr. 12, 2018.

TECHNICAL FIELD

This disclosure is directed to automated methods and systems to manage computational resource of a distributed computing system, and, in particular, to forecasting resource usage and proactively adjust resource usage based on the forecast.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

Because distributed computing systems have an enormous number of computational resources, various management systems have been developed to collect performance information about these resources, and based on the information, detect performance problems and generate alerts when a performance problem occurs. For example, a typical management system may collect hundreds of thousands of streams of metric data to monitor various computational resources of a data center infrastructure. Each data point of a stream of metric data may represent an amount of the resource in use at a point in time. However, the enormous number of metric data streams received by a management system makes it impossible for information technology ("IT") administrators to manually monitor the metrics, detect performance issues, and respond in real time. Failure to respond in real time to performance problems can interrupt computer services and have enormous cost implications for data center tenants, such as when a tenant's server applications stop running or fail to timely respond to client requests.

Typical management systems use reactive monitoring to generate an alert when metric data of a corresponding resource violates a usage limit. Although reactive monitoring techniques are useful for identifying current performance problems, reactive monitoring techniques have scalability limitations and force IT administrators to react immediately to performance problems that have already started to impact the performance of computational resources or are imminent. For example, by the time an IT administrator has been alerted by a management system that metric data for memory usage of a server computer has violated a usage limit, applications, VMs and containers running on the server computer may have already stopped running or slowed significantly. As a result, the IT administrator has to immediately execute remedial measures, which is error prone and may only temporarily address the performance problem. IT administrators seek management systems that identify performance problems in advance so that IT administrators have sufficient time to assess the problems and implement appropriate remedial measures that avoid future interruptions in computational services.

SUMMARY

Computational methods and systems to proactively manage usage of computational resources of a distributed computing system are described. Streams of metric data representing usage of various resources of the distributed computing system are sent to a management system of the distributed computing system. For each user-selected resource of the distributed computed system, the management system computes an estimated trend in most recently sequence of metric data that represents latest usage of a resource of the distributed computing system. If the sequence of metric data has an increasing or decreasing trend, the sequence of metric data may be detrended to obtain a sequence of non-trendy metric data. Otherwise, the sequence of metric data is non-trendy metric data. Stochastic process models of the sequence of non-trendy metric data are computed and corresponding accumulated residual errors are computed as new metric day representing latest usage of the resource are received by the management system. Whether the sequence of non-trendy metric data is a pulse wave is determined based on changes in averages of metric data in two sliding adjacent time windows of the non-trendy metric data. If the sequence of non-trendy metric data is not a pulse wave, methods and system determine whether the sequence of non-trendy metric data has a seasonal period. When a forecast request for resource usage over a forecast interval is received, a sequence of forecasted metric data over the forecast interval is computed. The forecasted metric data is computed based on the estimated trend and one of the pulse wave or seasonal model that matches the periodicity of the sequence of non-trendy metric data. Alternatively, when neither pulse wave model nor the seasonal model matches the periodicity of the sequence of non-trendy metric data, the sequence of forecasted metric data is computed over the forecast interval based on the estimated trend and the stochastic process model with a smallest corresponding accumulated residual error. Usage of the resource by virtual objects of the distributed computing system may be adjusted based on the sequence of forecasted metric data.

DESCRIPTION OF THE DRAWINGS

FIGS. 32A-32C show an example of planning optimal resource usage for a cluster of server computers.

DETAILED DESCRIPTION

Figure 1:
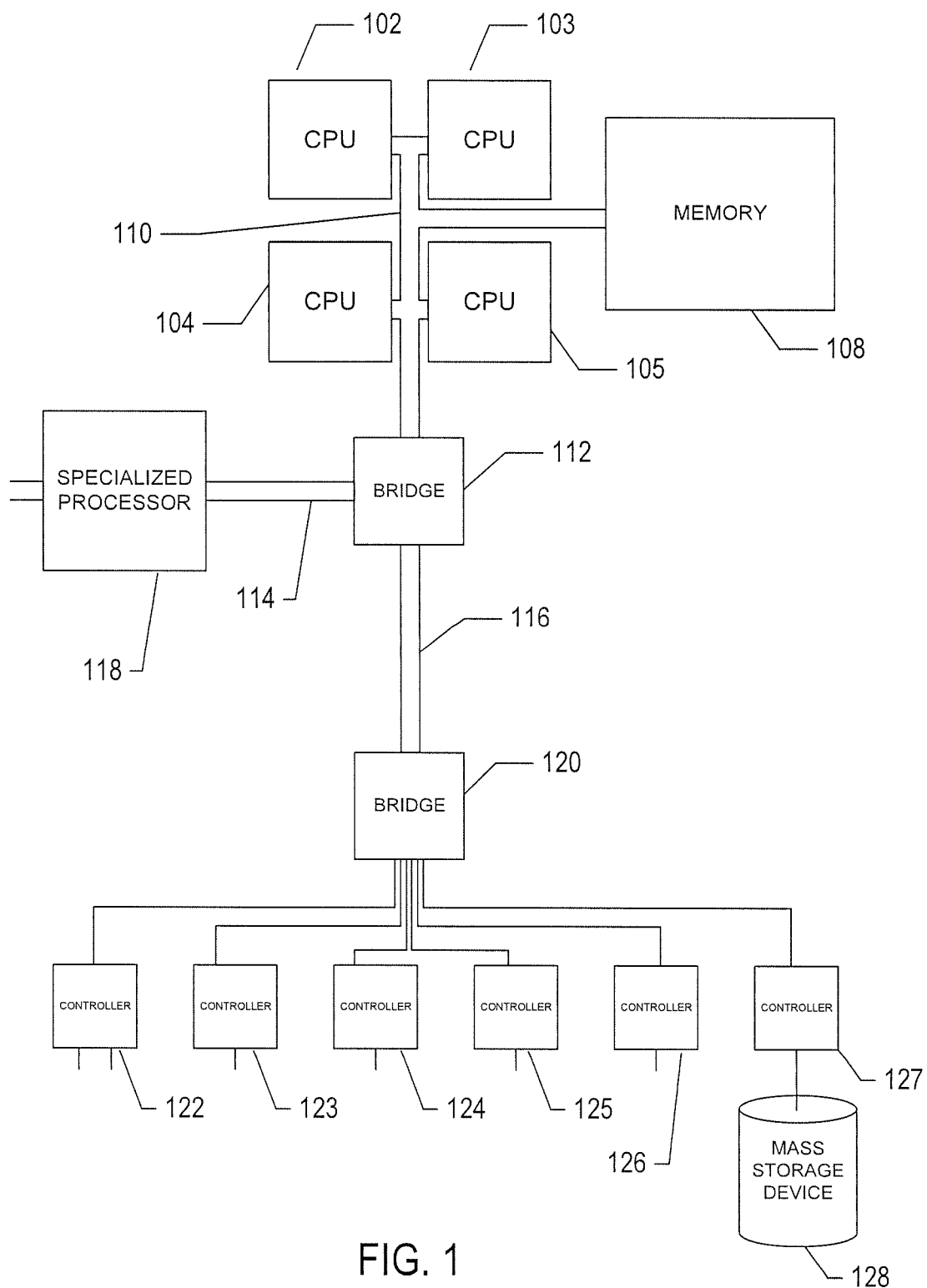
FIG. 1 shows an architectural diagram for various types of computers.

This disclosure presents computational methods and systems to proactively manage resources in a distributed computing system. In a first subsection, computer hardware, complex computational systems, and virtualization are described. Containers and containers supported by virtualization layers are described in a second subsection. Methods to proactively manage resources in a distributed computing system are described below in a fourth subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, containers, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
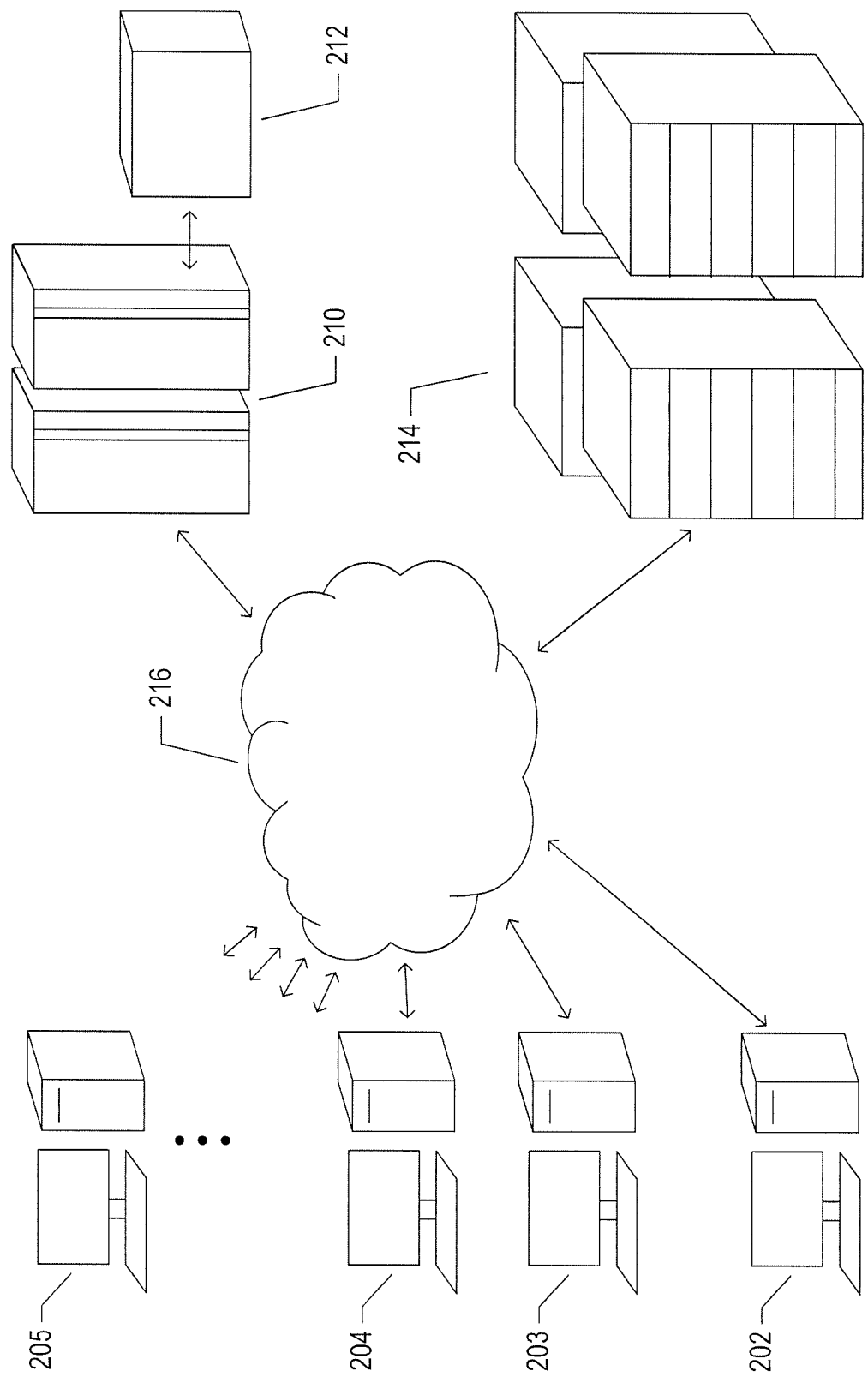
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
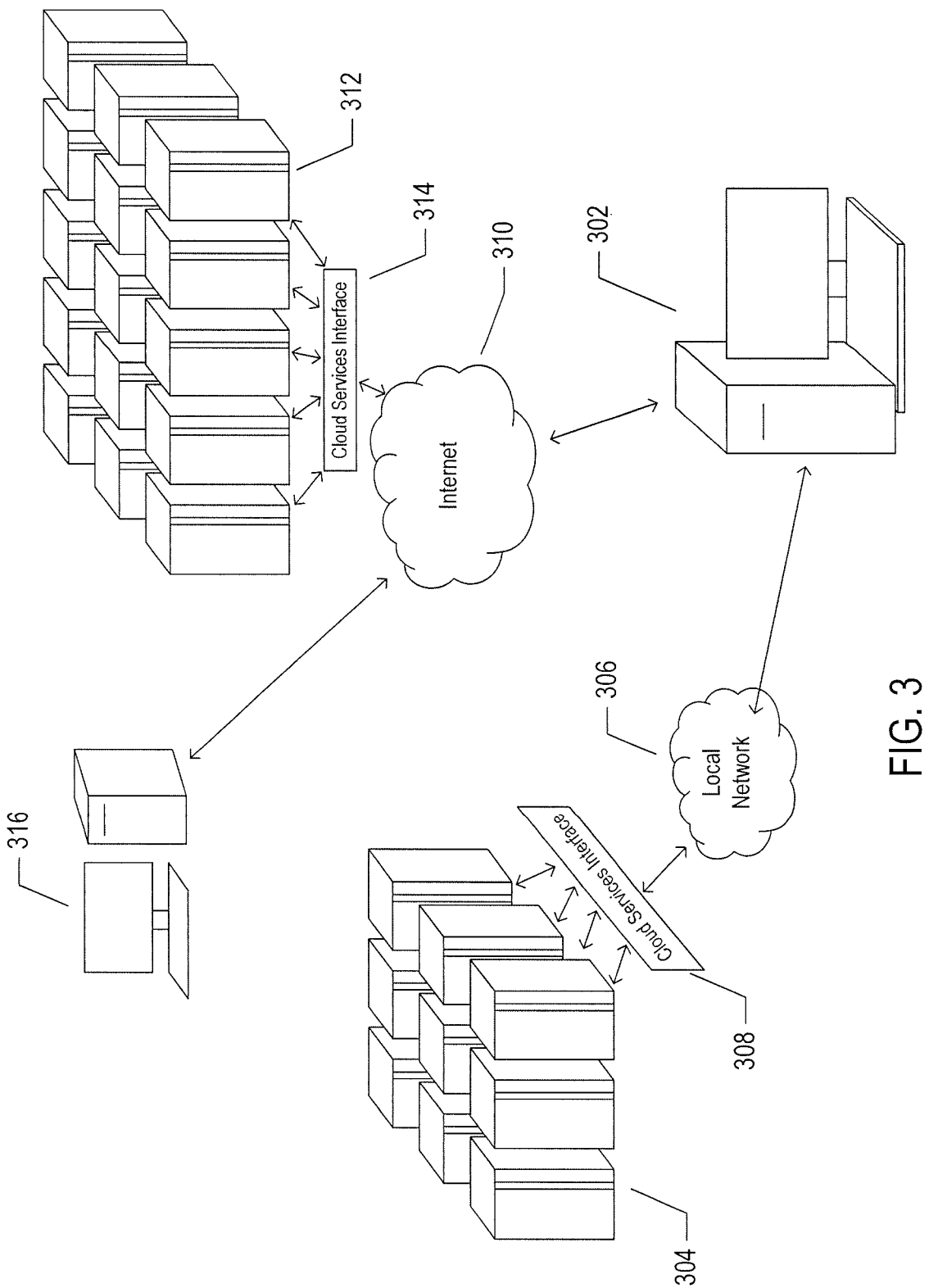
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
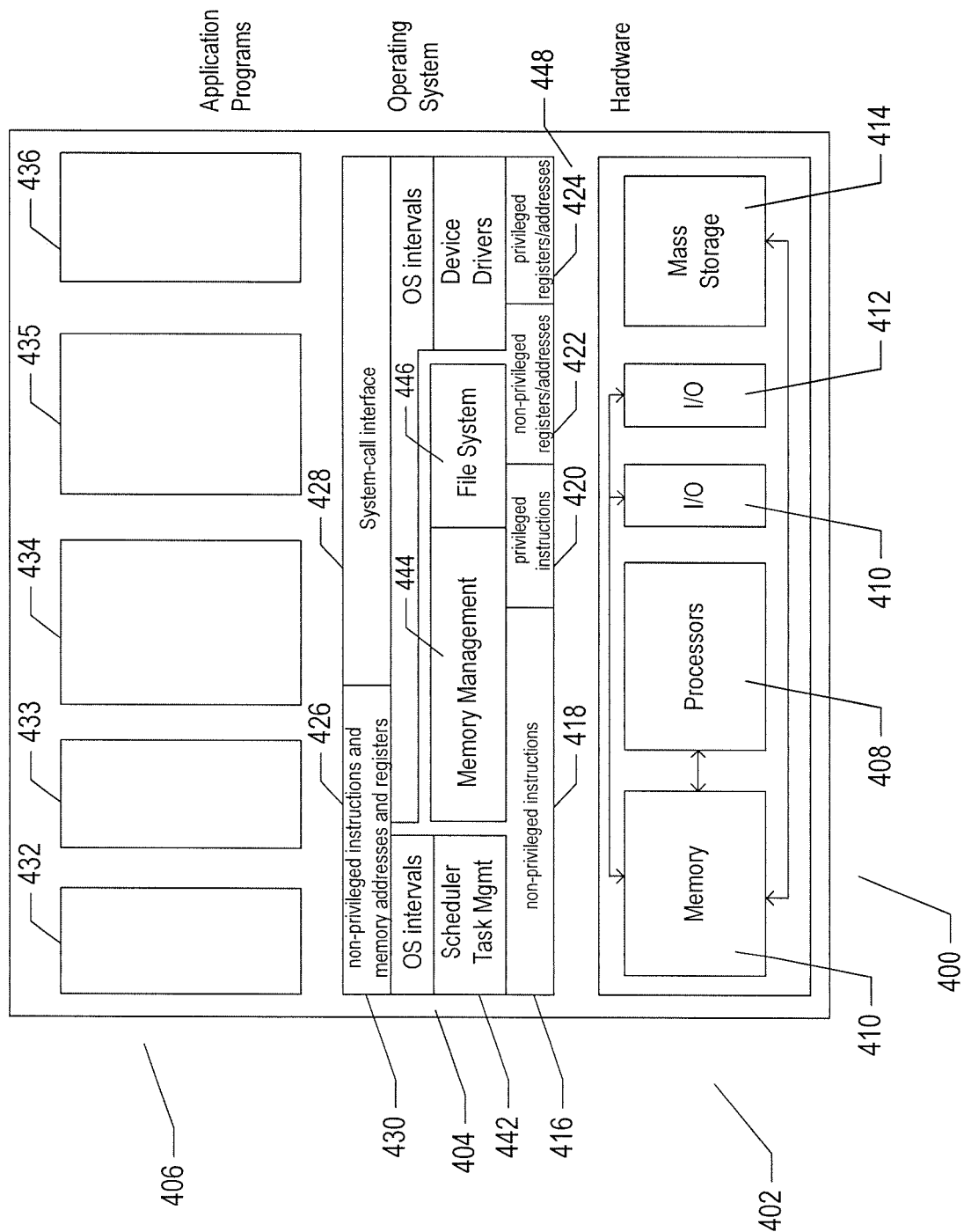
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
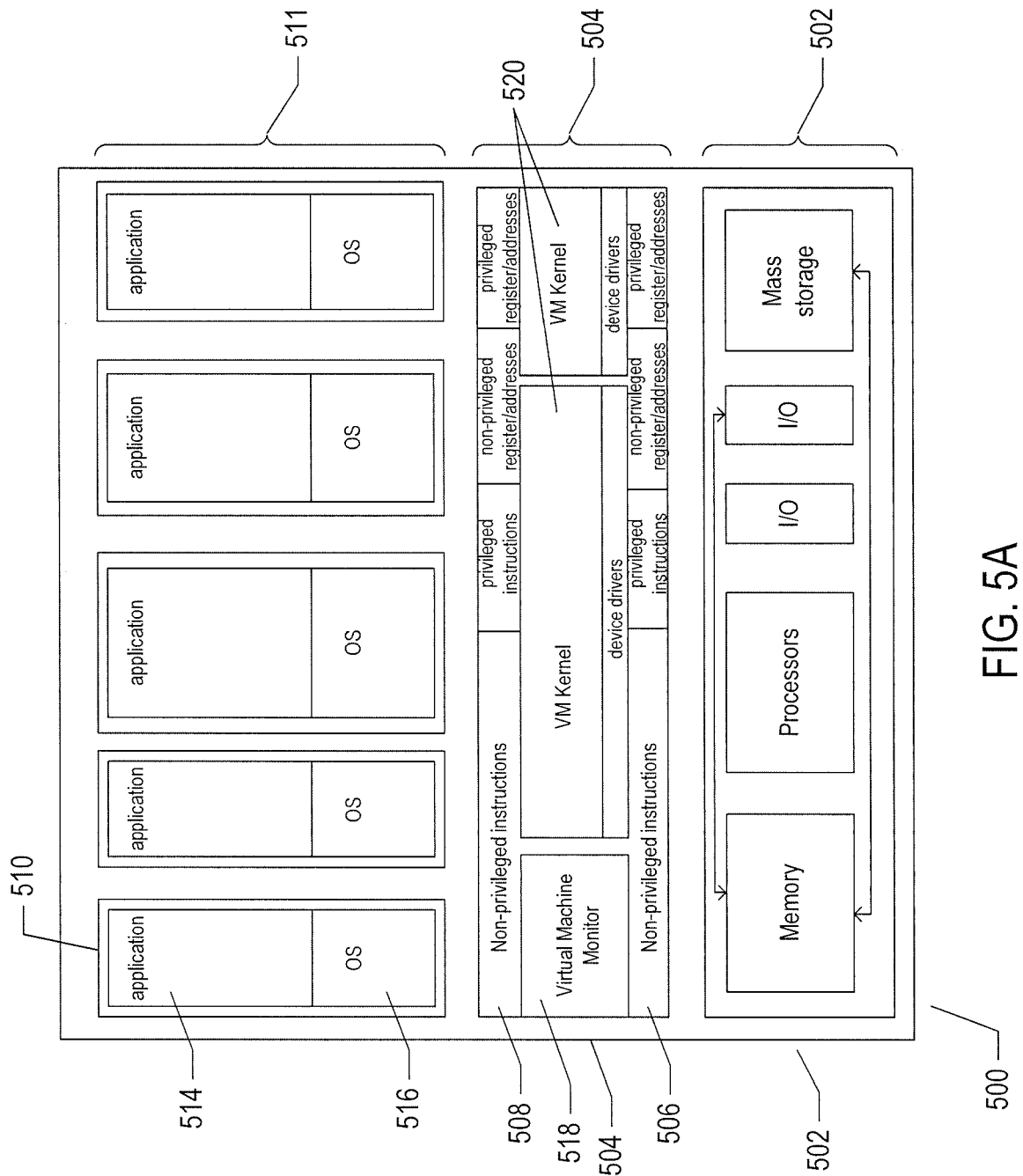
FIGS. 5A-5B show two types of virtual machine ("VM") and VM execution environments.
Figure 5B:
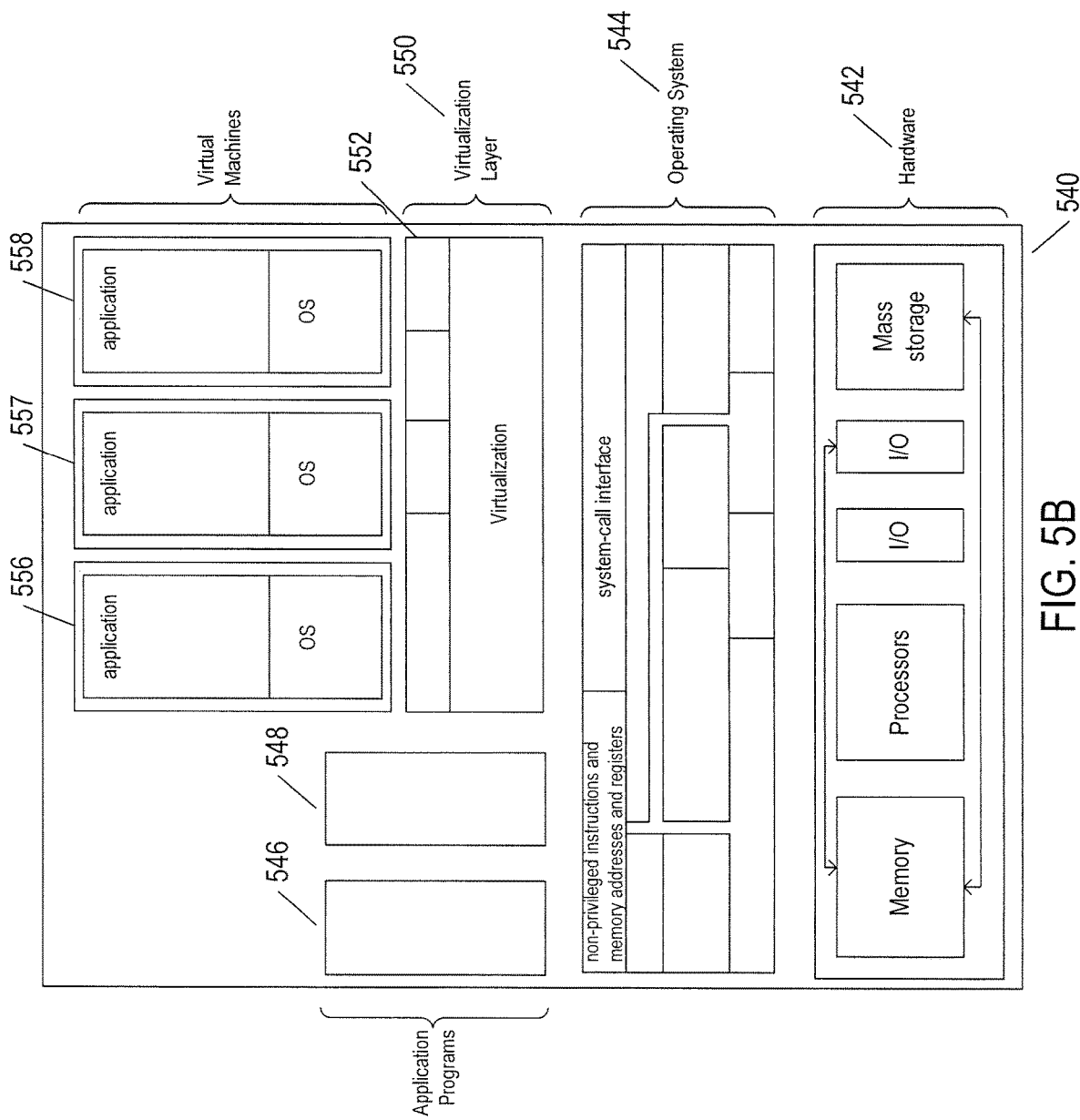

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
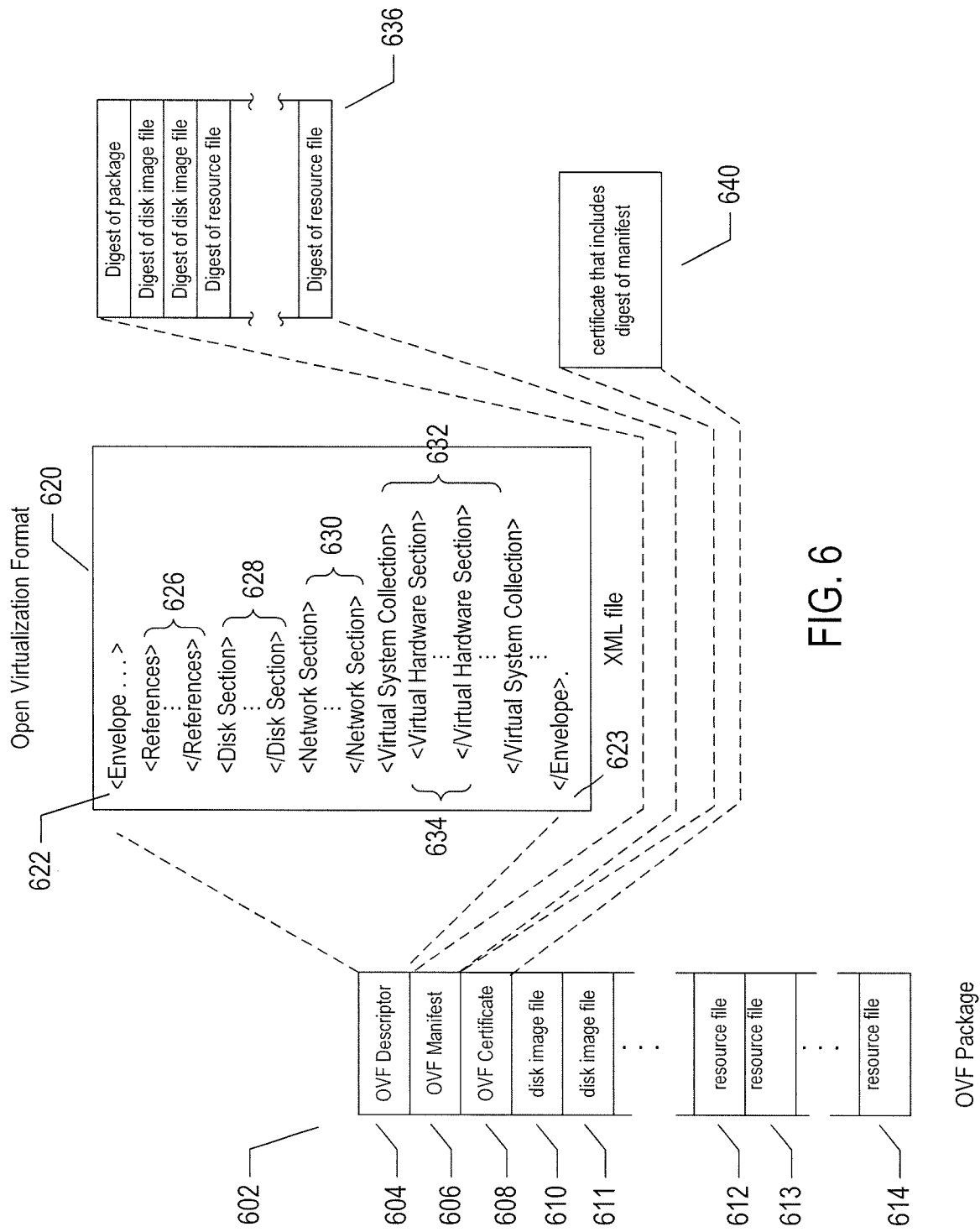
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
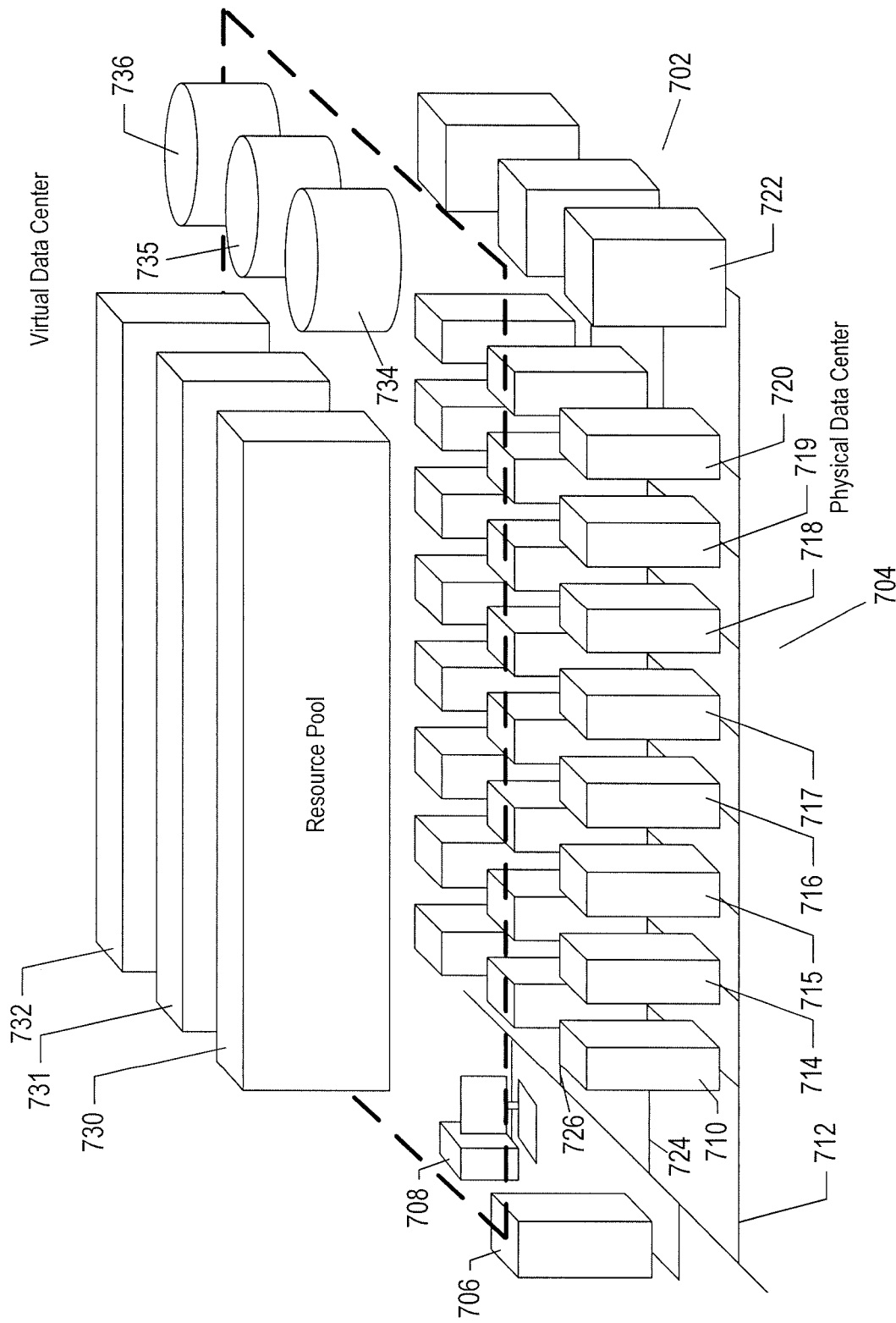
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
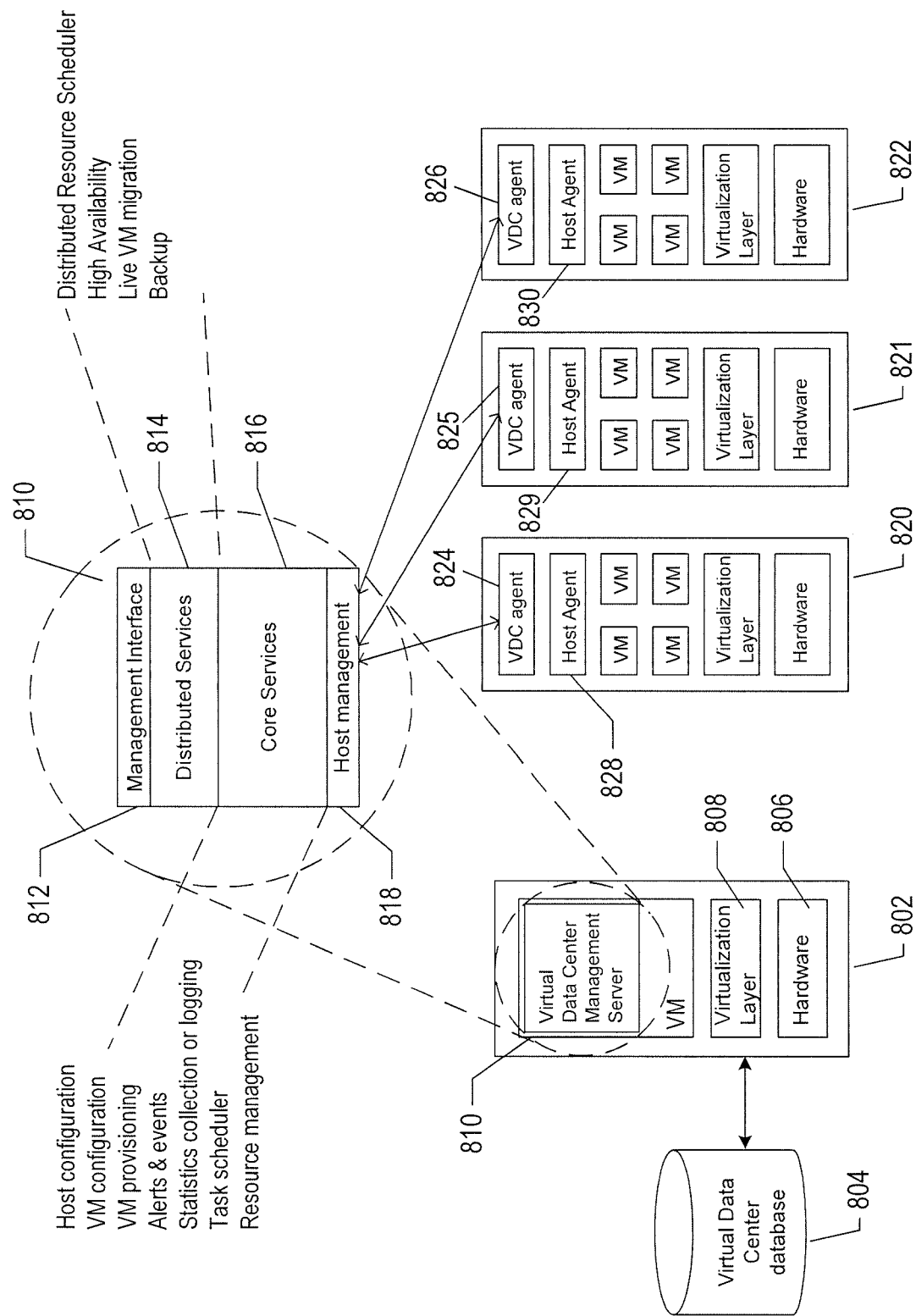
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
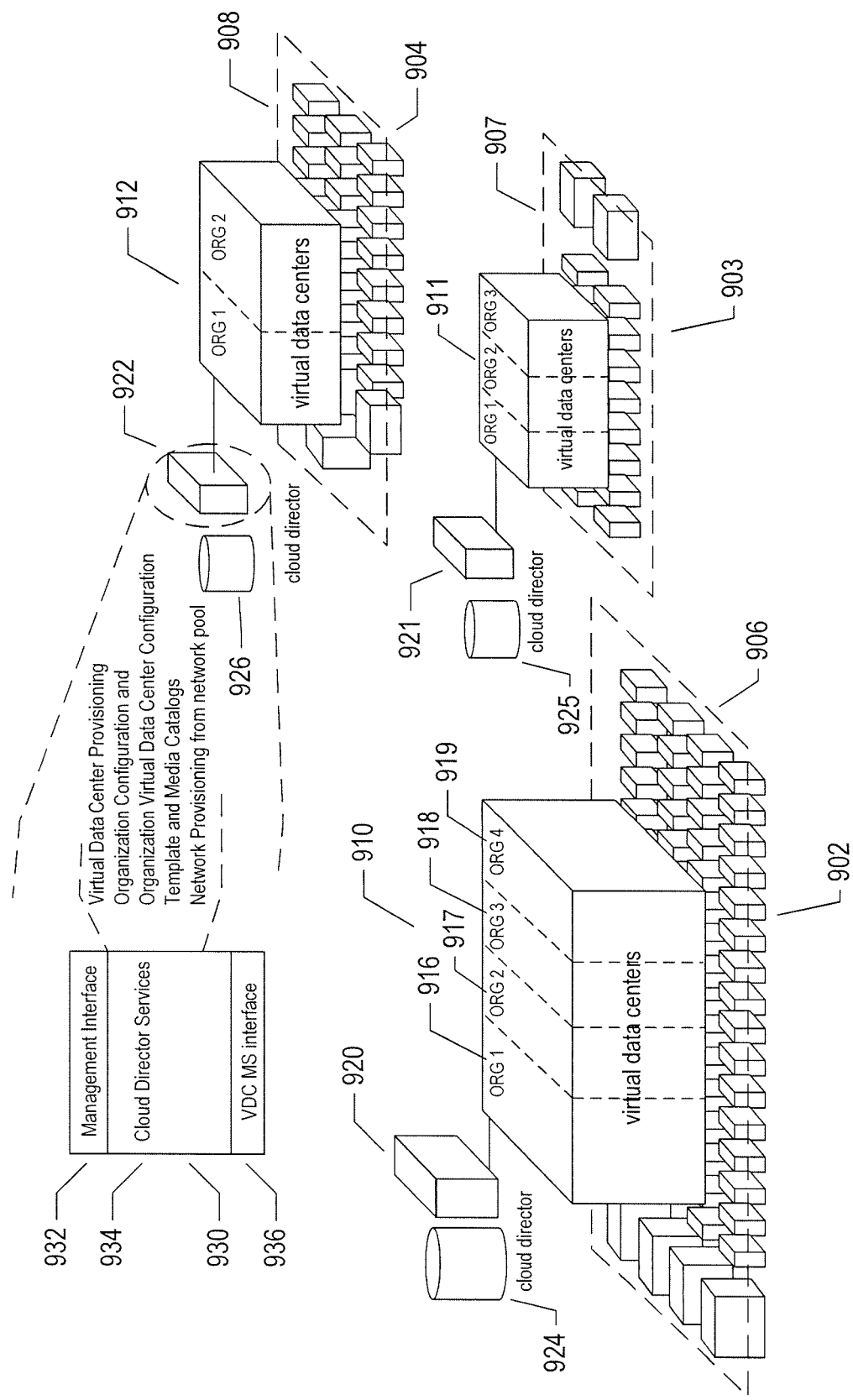
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
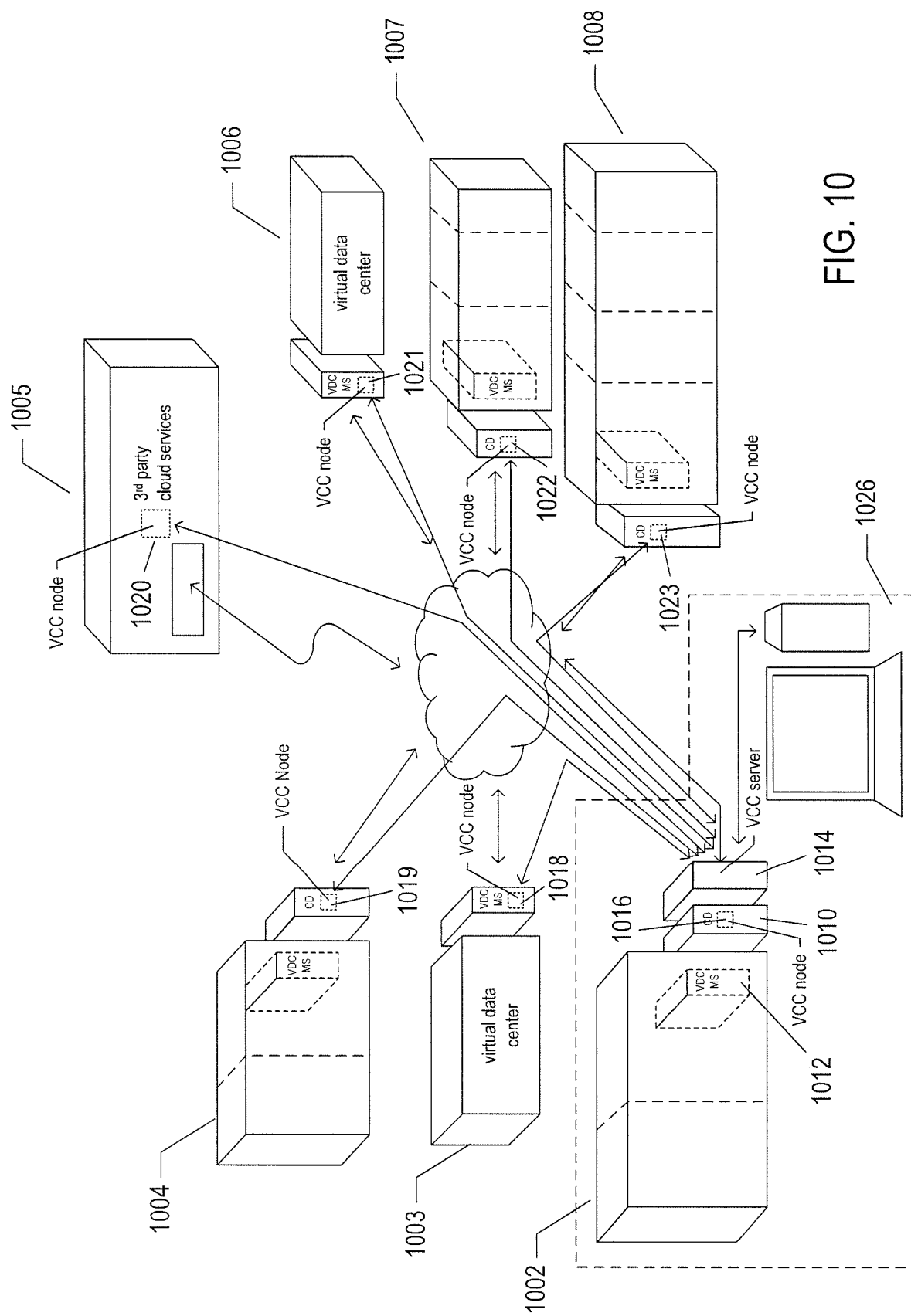
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
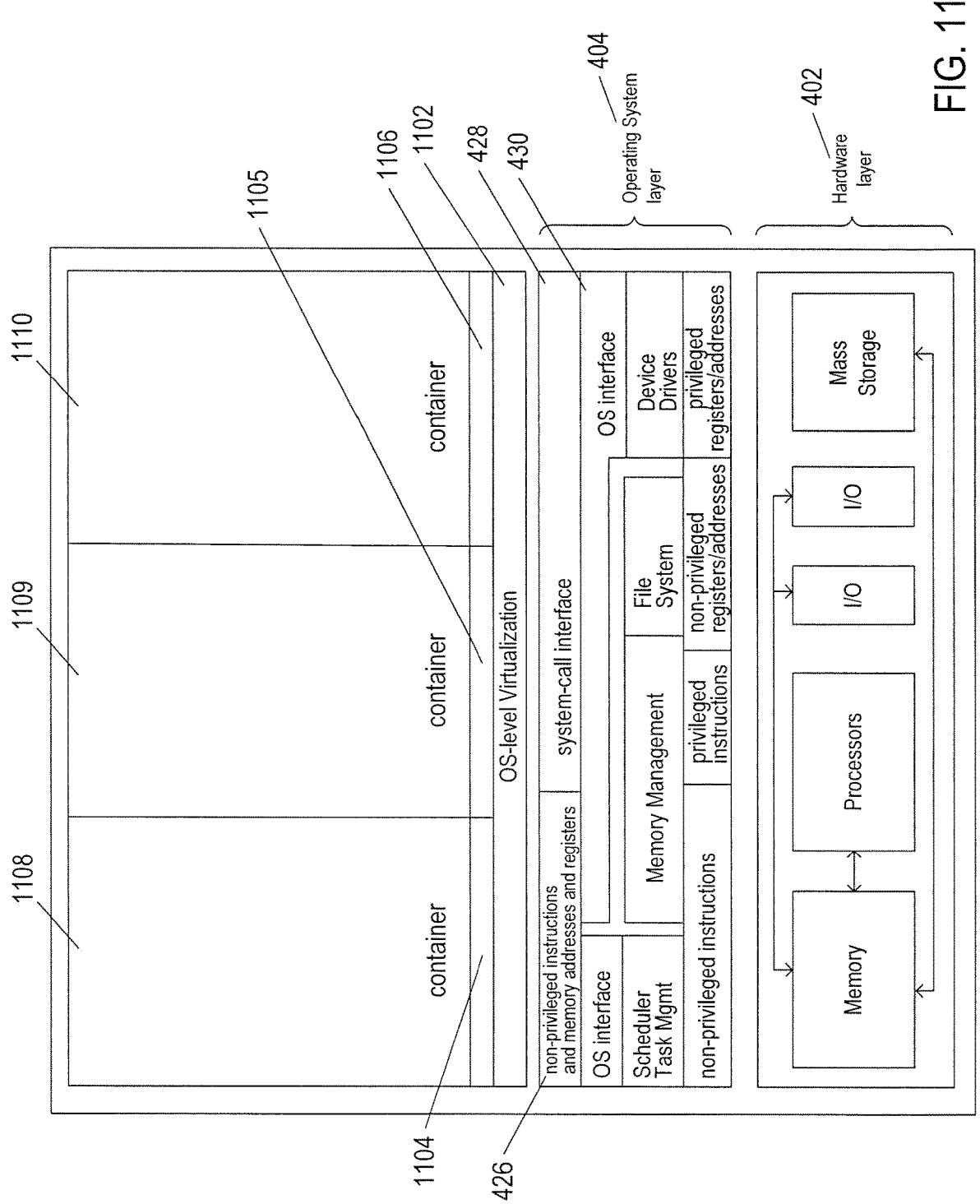
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
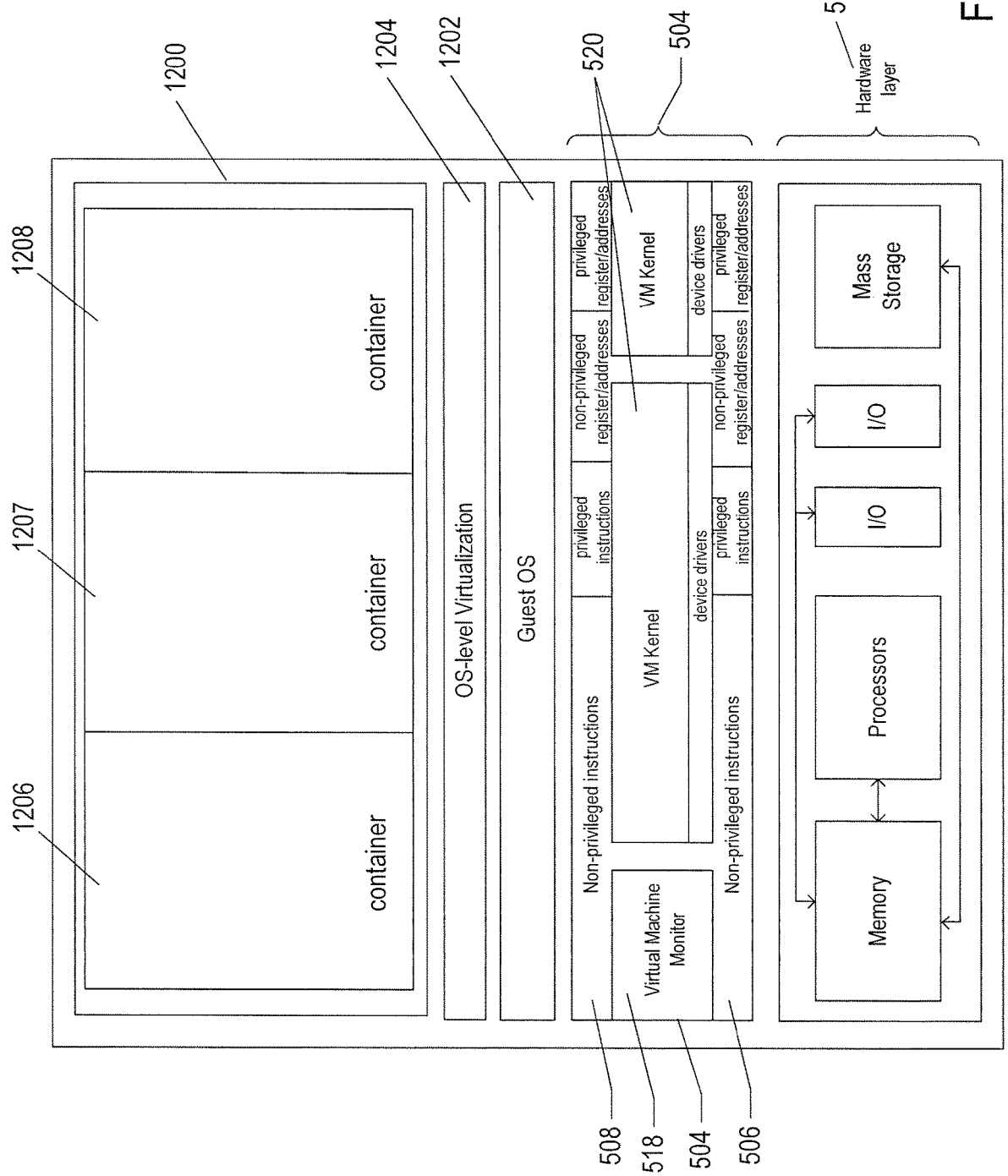
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13A:
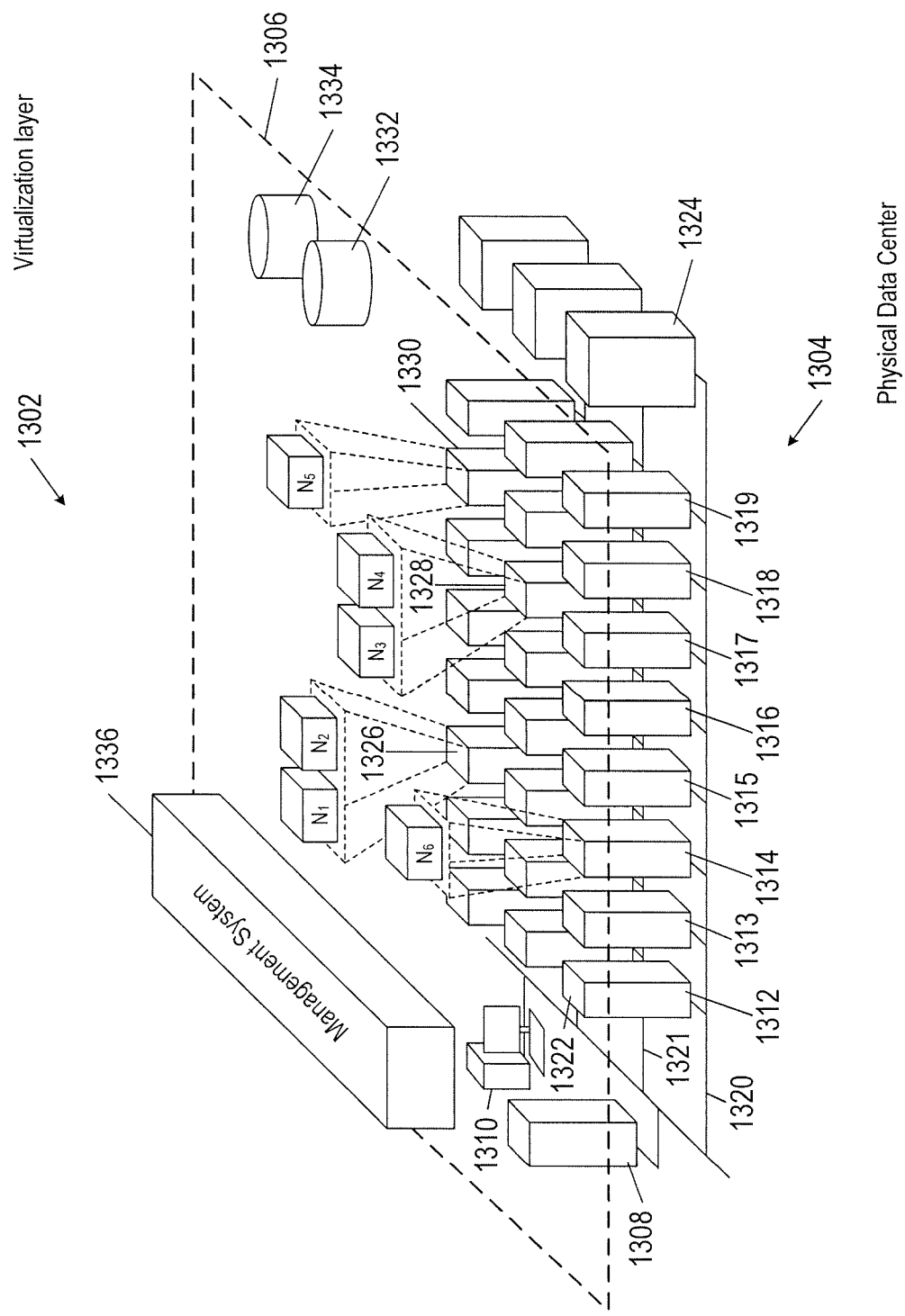
FIG. 13A shows an example of a virtualization layer located above a physical data center.

Method and System to Proactively Manage Resources in a Distributed Computing System FIG. 13A shows an example of a virtualization layer 1302 located above a physical data center 1304. The virtualization layer 1302 is separated from the physical data center 1304 by a virtual-interface plane 1306. The physical data center 1304 comprises a management server computer 1308 and any of various computers, such as PC 1310, on which a virtual-data-center management interface may be displayed to system administrators and other users. The physical data center 1304 additionally includes many server computers, such as server computers 1312-1319, that are coupled together by local area networks 1320-1322. In the example of FIG. 13A, each local area network directly interconnects a bank of eight server computers and a mass-storage array. For example, local area network 1320 directly interconnects server computers 1312-1319 and a mass-storage array 1324. Different physical data centers may be composed of many different types of computers, networks, data-storage systems and devices connected according to many different types of connection topologies. In the example of FIG. 13, the virtualization layer 1302 includes six virtual objects represented by $N_1$, $N_2$, $N_3$, $N_4$, $N_5$, and $N_6$. A virtual object can be an application, a VM, or a container. The virtual objects are hosted by four server computers 1314, 1326, 1328, and 1330. For example, virtual objects $N_1$ and $N_2$ are hosted by server computer 1326. The virtualization layer 1302 includes virtual data stores 1332 and 1334 that provide virtual storage for the virtual objects.

FIG. 13A also shows a management system 1336 abstracted to the virtualization layer 1302. The management system 1336 is hosted by the management server computer 1308. The management system 1336 includes an information technology ("IT") operations management server, such as VMware's vRealize® Operations™. The management system 1336 monitors usage, performance, and capacity of physical resources of each computer system, data-storage device, server computer and other components of the physical data center 1304. The physical resources include processors, memory, network connections, and storage of each computer system, mass-storage devices, and other components of the physical data center 1304. The management system 1336 monitors physical resources by collecting streams of time series metric data, also called "streams of metric data" or "metric data streams," sent from operating systems, guest operating systems, and other metric data sources running on the server computers, computer systems, network devices, and mass-storage devices.

Figure 13B:
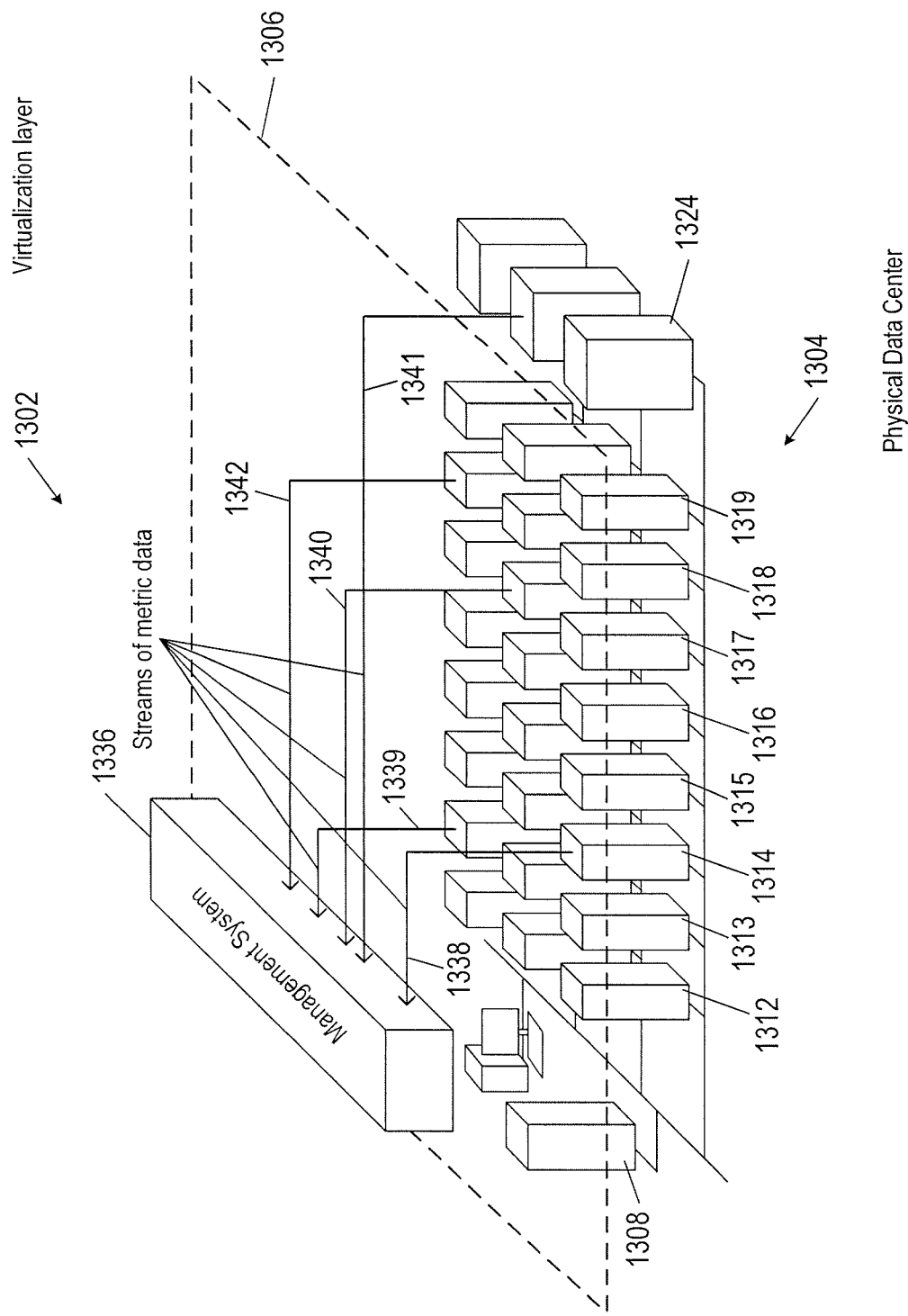
FIG. 13B shows a management system receiving streams of metric data.

FIG. 13B shows the management system 1336 receiving streams of metric data represented by directional arrows 1338-1342. The streams of metric data include CPU usage, amount of memory, network throughput, network traffic, and amount of storage. CPU usage is a measure of CPU time used to process instructions of an application program or operating system as a percentage of CPU capacity. High CPU usage may be an indication of unusually large demand for processing power, such as when an application program enters an infinite loop. Amount of memory is the amount of memory (e.g., GBs) a computer system or other device uses at a given time. Network throughput is the number of bits of data transmitted to and from a server computer or data-storage device and is often recorded in megabits, kilobits or simply bits per second. Network traffic at a server computer or mass-storage array is a count of the number of data packets received and sent at a given time. Clusters of server computers may also send collective metric data to the management system 1336. For example, a cluster of server computers 1312-1319 sends streams of cluster metric data, such as total CPU usage, total amount of memory, total network throughput, and total network traffic, used by the cluster to the management system 1336. Metric data may also be sent from the virtual objects and clusters of virtual objects to the management system 1336. The metric data may represent usage of virtual resources, such as virtual CPU and virtual memory.

Figure 14A:
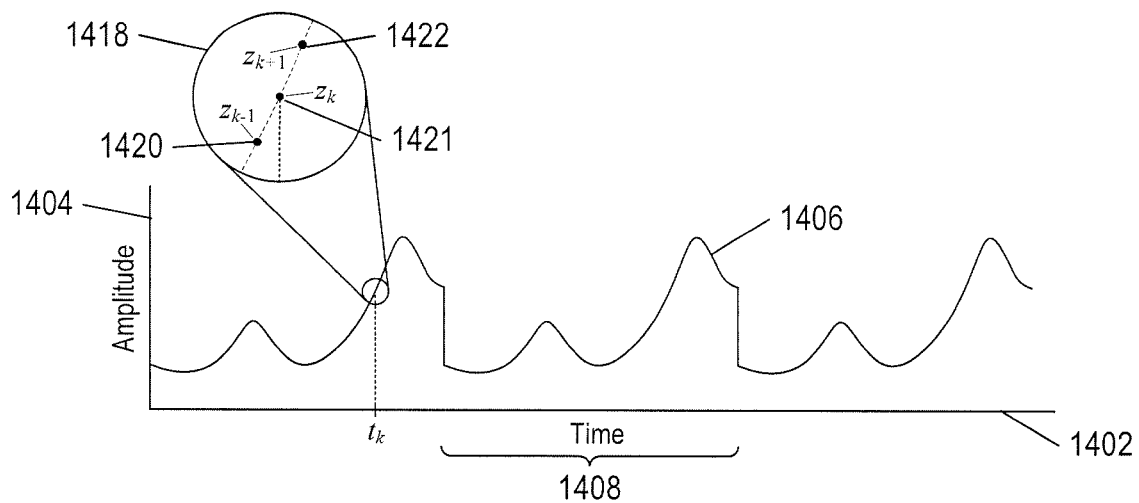
FIG. 14A-14D show plots of four different example streams of metric data.
Figure 14B:
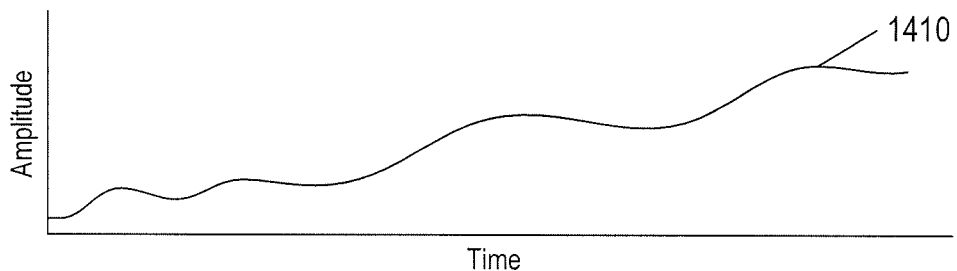
Figure 14C:
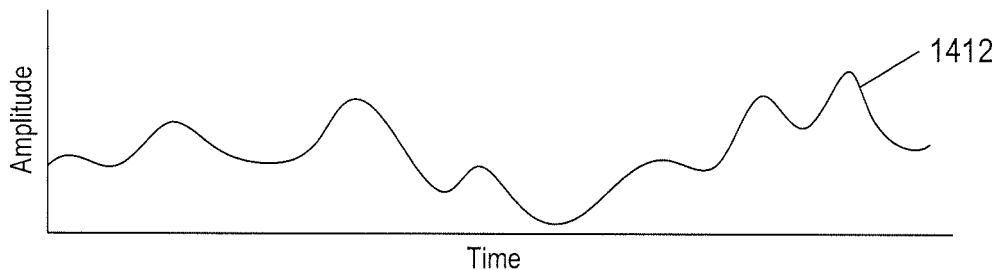
Figure 14D:
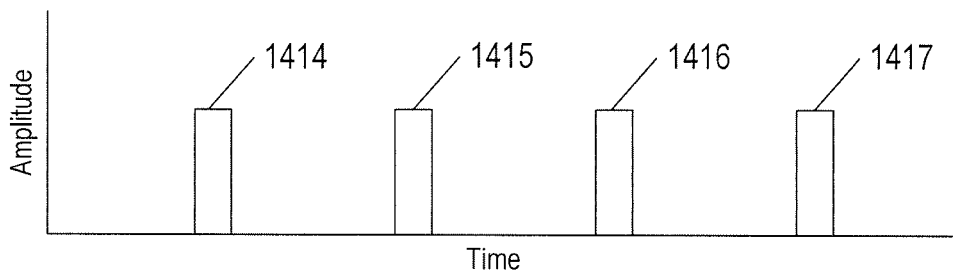

FIG. 14A-14D show plots of four different example streams of metric data. Horizontal axes, such as axis 1402, represents time. Vertical axes, such as vertical axis 1404, represents a range of metric data amplitudes. In FIGS. 14A-14C, curves represent four examples of different patterns of metric data streams. For example, in FIG. 14A, curve 1406 represents a periodic stream of metric data in which the pattern of metric data in time interval 1408 is repeated. In FIG. 14B, curve 1410 represents a trendy stream of metric data in which the amplitude of the metric data generally increases with increasing time. In FIG. 14C, curve 1412 represents a non-trendy, non-periodic stream of metric data. In FIG. 14D, rectangles 1414-1417 represent pulse waves of a pulsed stream of metric data generated by a resource that is utilized periodically and only for the duration of each pulse. The example streams of time series metric data shown in FIGS. 14A-14D represent usage of different resources. For example, the metric data in FIG. 14A may represent CPU usage of a core in a multicore processor of a server computer over time. The metric data in FIG. 14B may represent the amount of virtual memory a VM uses over time. The metric data in FIG. 14C may represent network throughput for a cluster of server computers.

In FIGS. 14A-14D, the streams of metric data are represented by continuous curves. In practice, a stream of metric data comprises a sequence of discrete metric data values in which each numerical value is recorded in a data-storage device with a time stamp. FIG. 14A includes a magnified view 1418 of three consecutive metric data points represented by points. Points represent amplitudes of metric data points at corresponding time stamps. For example, points 1420-1422 represents consecutive metric data values (i.e., amplitudes) $z_{k-1}$, $z_k$, and $z_{k+1}$ recorded in a data-storage device at corresponding time stamps $t_{k-1}$, $t_k$, and $t_{k+1}$, where subscript k is an integer time index of the k-th metric data point in the stream of metric data.

Figure 15:
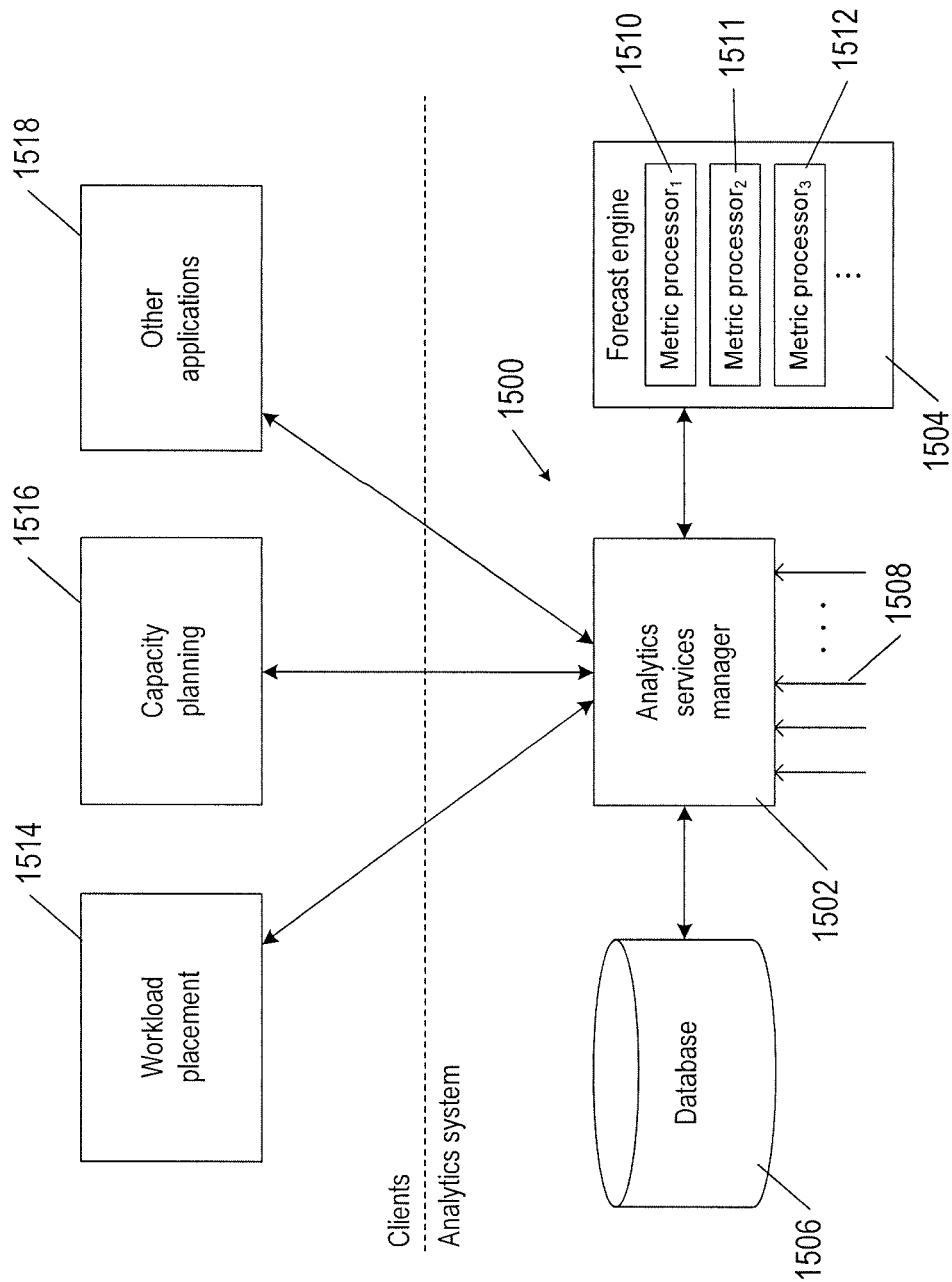
FIG. 15 shows an architecture of an example metric data analytics system that may be implemented as part of a management system.

FIG. 15 shows an architecture of an example metric data analytics system 1500 that may be implemented as part of the management system 1336. The analytics system 1500 comprises an analytics services manager 1502, a forecast engine 1504, and a metric data stream database 1506. The analytics services manager 1502 receives streams of metric data represented by directional arrows, such as directional arrow 1508. The forecast engine 1502 host a collection of metric processors, such as metric processors 1510-1512. The forecast engine 1504 provides a library of configurable models. The forecast engine 1504 includes an interface that enables a user to create one or more metric processors from the configurable models described below and assigns to each metric processor a single stream of metric data. Each metric processor is registered with a registration key that the analytical services manager 1502 uses to route a stream of metric data associate with a physical resource to a corresponding metric processor. Each stream of metric data is copied to the database 1506 to create a history for each resource. Each metric processor generates a forecast when the metric processor receives a forecast request sent by a user or when the metric processor receives a forecast request from a client, such as a workload placement application 1514, a capacity planning application 1516, or any other application 1518 that uses forecasted metric data.

Figure 16:
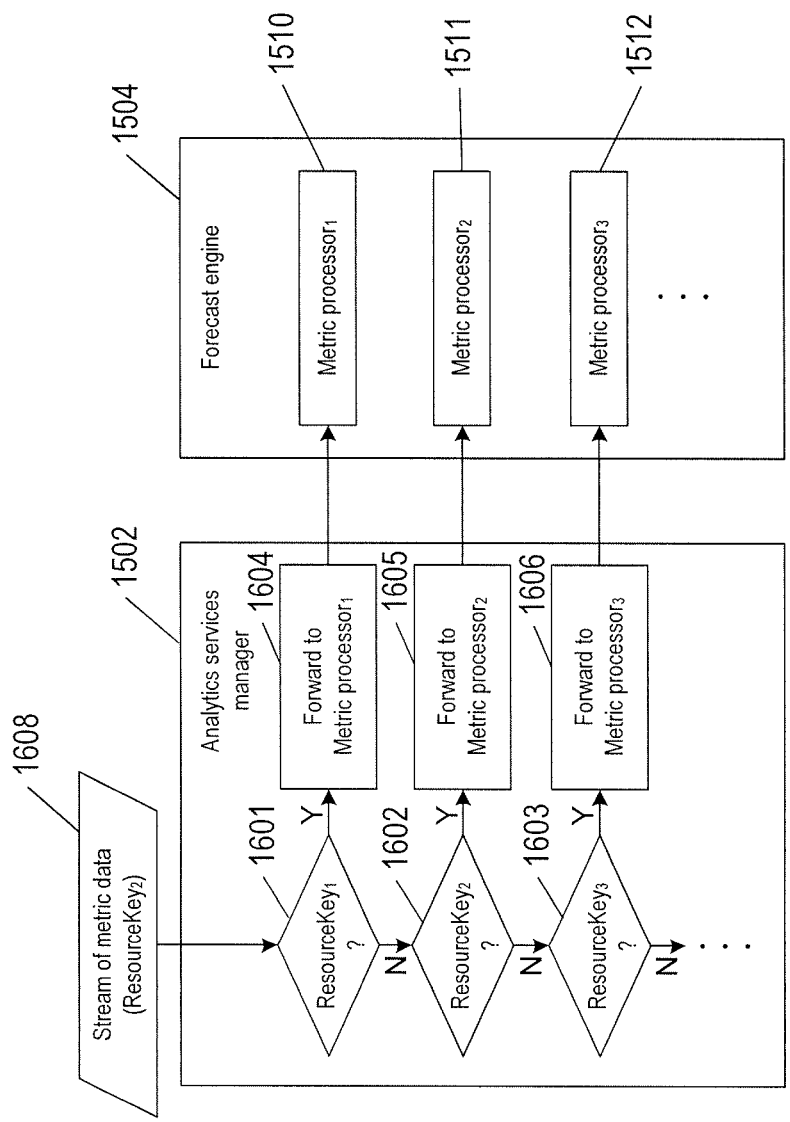
FIG. 16 shows an example implementation of the analytics services manager.

FIG. 16 shows an example implementation of the analytics services manager 1502. Each metric processor is registered with a resource key in the analytics services manager 1502. Each data point of a stream of metric data comprises a resource key, time stamp, and a metric data value. The analytics services manager 1502 utilizes the resource key to route the stream of metric data to the metric processor associated with the resource key. In the example of FIG. 16, a series of decision blocks 1601-1603 represent operations in which the resource key of each stream of metric data received by the analytics services manager 1502 is checked against the resource keys of registered metric processors. Blocks 1604-1606 represent forwarding operations that correspond to the decision blocks 1601-1603 in which a metric data stream with a resource key that matches one of the registered registration keys is forwarded to one of the corresponding metric processors 1510-1512 of the forecast engine 1504. For example, FIG. 16 shows an example stream of metric data 1608 with a resource key denoted by "ResourceKey$_2$" input to the analytics services manager 1502. The resource key is checked against the registered resource keys maintained by the analytics services manager 1502. Because the resource key "ResourceKey$_2$" matches the registered resource key represented by block 1602, control flows to block 1605 in which the stream of metric data is forwarded to corresponding metric processor 1511. The stream of metric data may also be copied to the database 1506.

The analytics services manager 1502 also manages the life cycle of each metric processor. The analytics service manager 1502 can tear down a metric processor when requested by a user and may reconstruct a metric processor when instructed by a user by resetting and replaying an historical stream of metric data stored in the database 1506.

Each metric processor updates and constructs models of metric data behavior based on a stream of metric data. The models are used to create metric data forecasts when a request for a forecast is made. As a result, each metric processor generates a real time metric data forecast in response to a forecast request. In order to generate a real time metric data forecast, each metric processors maintains the latest statistics on the corresponding stream of metric data, updates model parameters as metric data is received, and maintains a limited history of metric data. The duration of the sequence of metric data values comprising a limited history may vary, depending on the resource. For example, when the resource is a CPU or memory of single server computer, the limited history of metric comprise a sequence collected over an hour, day, or a week. On the other hand, when the resource is CPU usage or memory of an entire cluster of server computers that run a data center tenant's applications, the limited history of metric may comprise a sequence collected over days, weeks, or months. By updating the models, statistics, and maintaining only a limited history of the metric data, each metric processor utilizes a bounded memory footprint, a relatively small computational load, and computes a metric data forecast at low computational costs.

Figure 17:
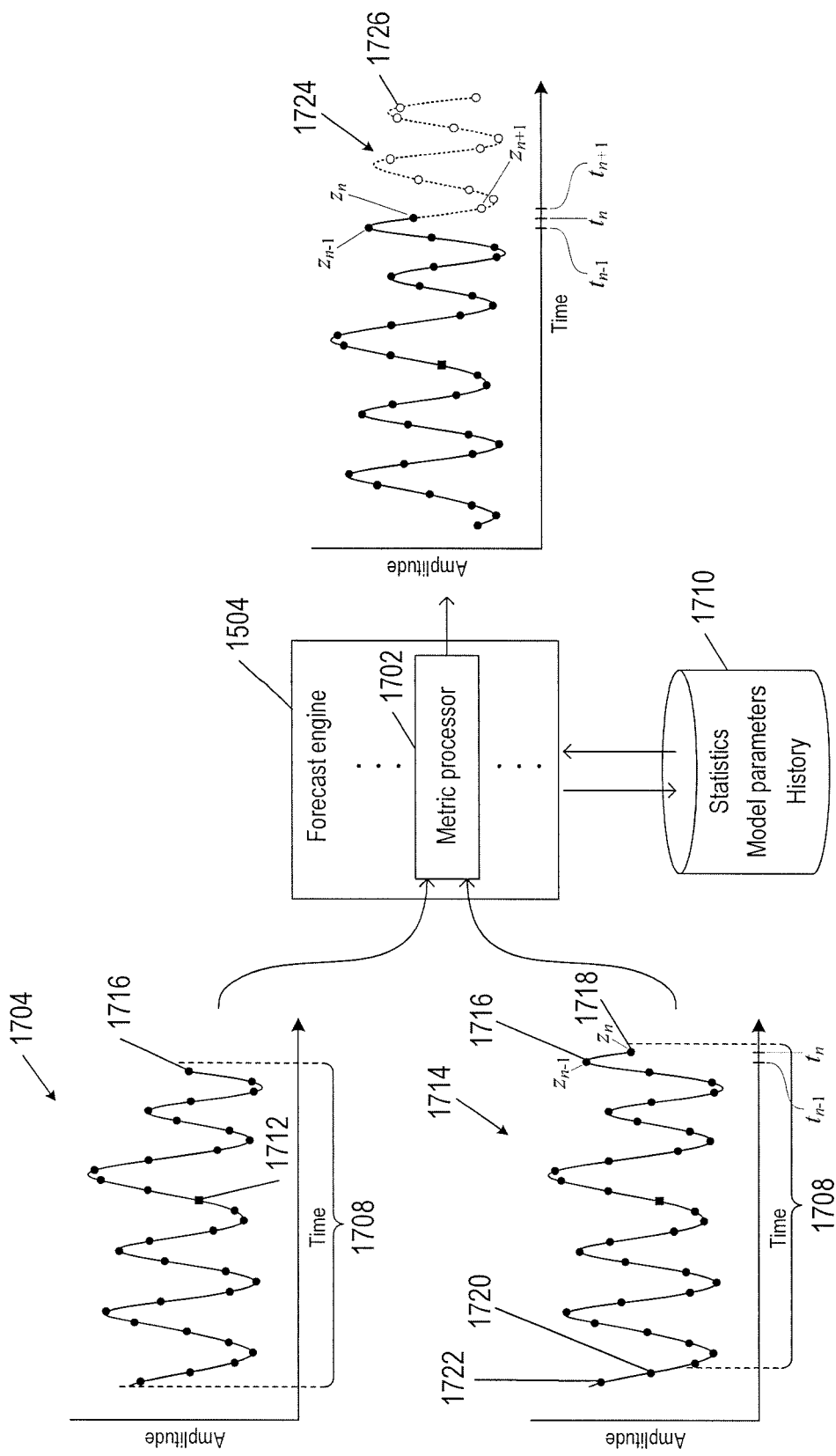
FIG. 17 shows an example of a history of metric data maintained by a metric processor of the forecast engine.

Metric data points of a metric data stream may arrive at the analytics services manager 1502 one at a time or two or more metric data points may arrive in time intervals. FIG. 17 shows an example of a limited history of metric data maintained by a metric processor 1702 of the forecast engine 1502. Plot 1704 displays data points of a limited history of metric data maintained by the metric processor 1702. For example, point 1706 represents a recently forwarded metric data value of the limited history of metric data recorded in a data-storage device 1710. The limited history of metric data is contained in a historical window 1708 of duration D. The historical window 1708 contains a sequence of metric data with time stamps in a time interval $[t_n-D, t_n]$, where subscript n is a positive integer time index, and $t_n$ is the time stamp of the most recently received metric data value $z_n$ added to the limited history and in the historical window. Ideally, consecutive metric data values forwarded to the metric processor 1702 have regularly spaced time stamps with no gaps. Interpolation is used to fill in any gaps or missing metric data in the limited history of metric data. For example, square-shaped metric data point 1712 represents an interpolated metric data value in the limited history of metric data. Interpolation techniques that may be used to fill in missing metric data values include linear interpolation, polynomial interpolation, and spline interpolation. The metric processor 1702 computes statistical information and forecast model parameters based on the limited history of metric data 1704 and records the statistical information and forecast model parameters in the data-storage device 1710. The historical window 1708 advances in time to include the most recently received metric data values and discard a corresponding number of the oldest metric data values from the limited history of metric data. Plot 1714 displays data points of an updated limited history of metric data. Points 1716 and 1718 represents two recently received metric data values added to the limited history of metric data and points 1720 and 1722 that represent the oldest metric data values outside the historical window 1708 are discarded. The metric data in the historical window 1708 are called "lags" and a time stamp of a lag is called "lag time." For example, metric data values $z_{n-1}$ and $z_n$ in the historical window are called lags and the corresponding time stamps values $t_{n-1}$ and $t_n$ and called lag times. The metric processor 1702 computes statistical information and updates model parameters stored in the data-storage device 1710 based on the latest limited history of metric data 1704.

When a forecast request is received by the metric processor 1702, the metric processor 1702 computes a metric data forecast based on the latest model parameters. The metric processor 1702 computes forecasted metric data values in a forecast interval at regularly spaced lead time stamps represented by open points. FIG. 17 shows a plot of forecasted metric data 1724 represented by open points, such as open point 1726, appended to the latest limited history of metric data. For example, a first forecasted metric data value $\tilde{z}_{n+1}$ occurs at lead time stamp $t_{n+1}$, where "~" denotes a forecast metric data value.

Each metric data value in a stream of metric data may be decomposed as follows:

$$z_i = T_i + A_i + S_i \quad (1)$$

where
i=1, ..., n;
n is the number of metric data values in the historical window;
$T_i$ is the trend component;
$A_i$ is the stochastic component; and
$S_i$ is the seasonal or periodic component.

Note that certain streams of metric data may have only one component (e.g., $A_i \neq 0$ and $T_i = S_i = 0$, for all i). Other streams may have two components (e.g., $A_i \neq 0$, $S_i \neq 0$, and $T_i = 0$, for all i). And still other streams may have all three components.

Figure 18:
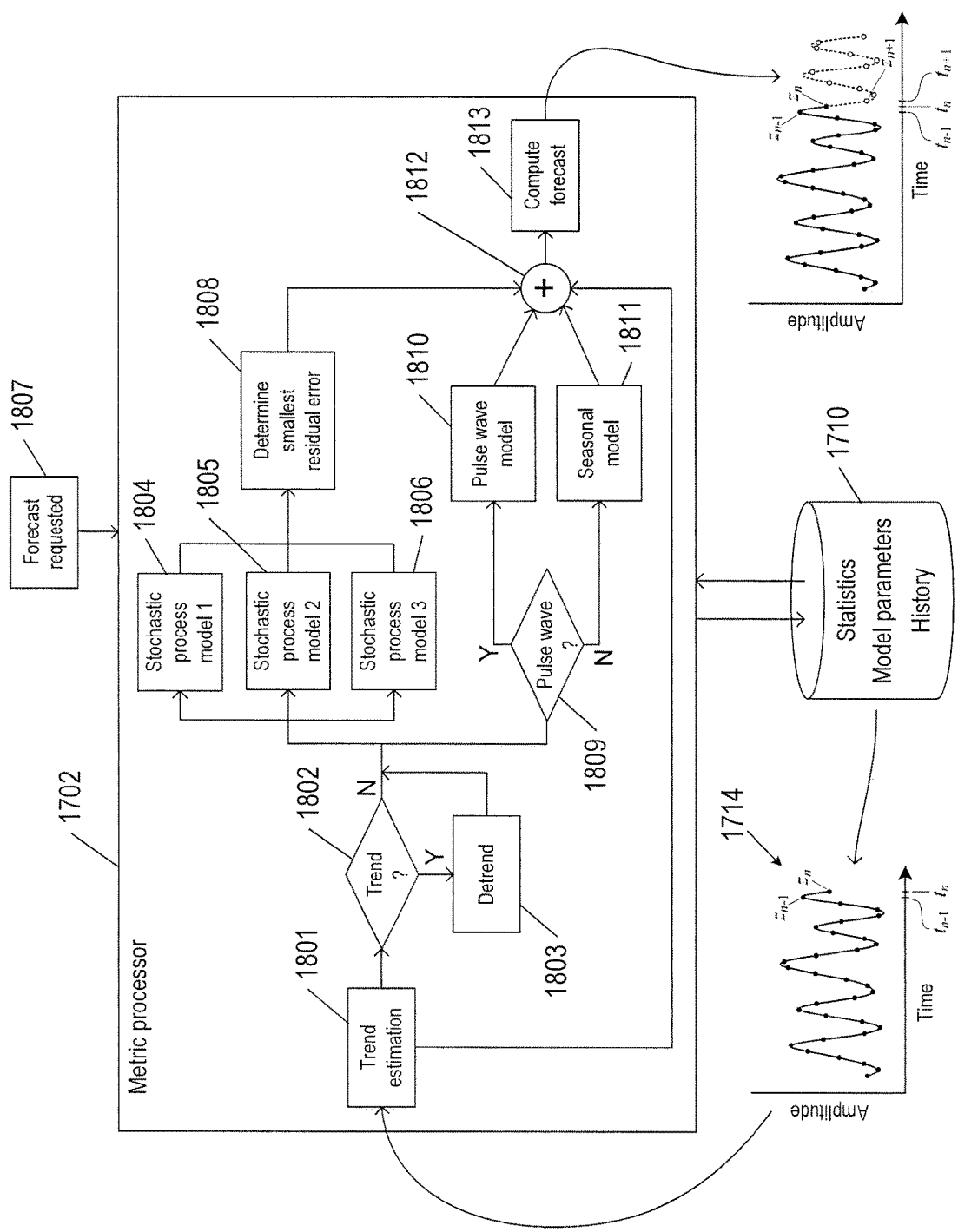
FIG. 18 shows an overview of example processing operations carried out by a metric processor.

FIG. 18 shows an overview of example processing operations carried out by the metric processor 1720. The latest metric data 1714 within the historical window 1708 is input to the metric processor 1702. The historical window contains the latest sequence of metric data in the limited history. In block 1801, a trend estimate of the metric data in the historical window is computed. In decision block 1802, if the trend estimate fails to adequately fit the metric data in the historical window, the metric data is non-trendy. On the other hand, if the trend estimate adequately fits the sequence of metric data, the sequence of metric data in the historical window is trendy and control flows to block 1803 where the trend estimate is subtracted from the metric data to obtain detrended sequence of metric data over the historical window.

Figure 19A:
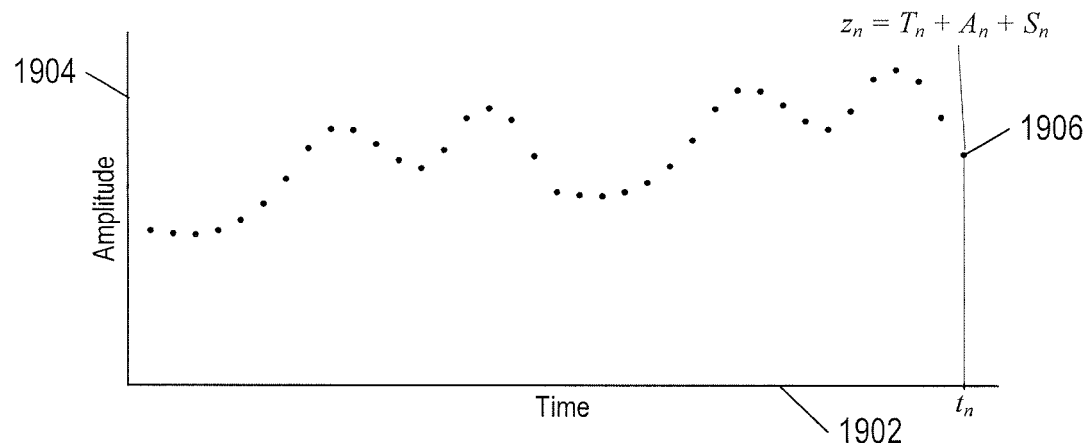
FIGS. 19A-19C show an example of computing a trend estimate and detrending metric data within a historical window.
Figure 19B:
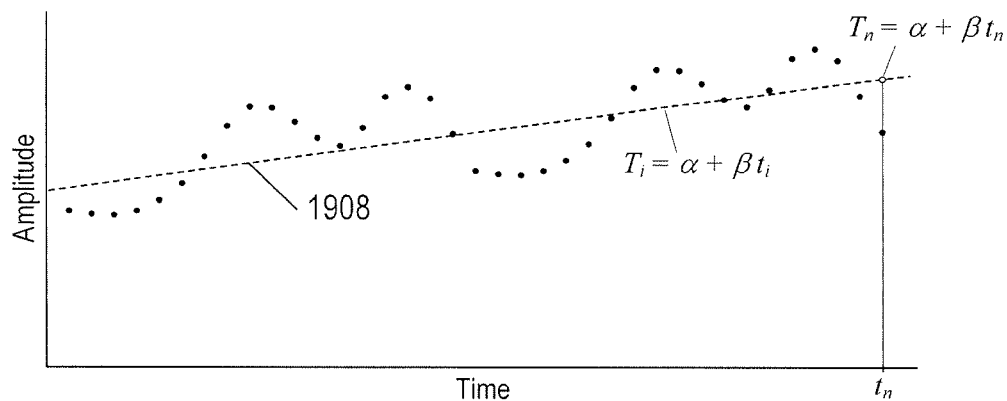
Figure 19C:
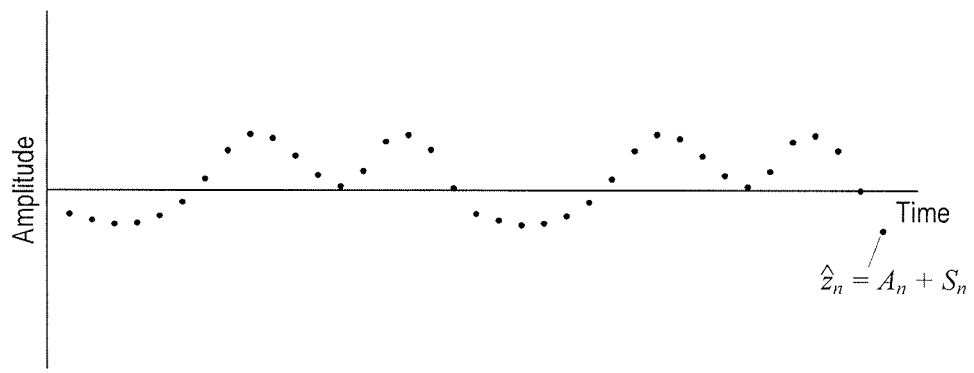

FIGS. 19A-19C show an example of computing a trend estimate and detrending metric data within a historical window. In FIGS. 19A-19C, horizontal axes, such as horizontal axis 1902, represent time. Vertical axes, such as vertical axis 1904, represent the amplitude range of the metric data in the historical window. In FIG. 19A, the values of the metric data represented by points, such as point 1906, vary over time, but a trend is recognizable by an overall increase in metric data values with increasing time. A linear trend may be estimated over the historical window by a linear equation given by.

$$T_i = \alpha + \beta t_i \quad (2a)$$

where
α is vertical axis intercept of the estimated trend;
μ is the slope of the estimated trend;
i=1, ..., n; and
n is the time index of the most recently added metric data value to sequence of metric data with a time stamp in the historical window.

The index i is the time index for time stamps in the historical window. The slope α and vertical axis intercept β of Equation (2a) may be determined by minimizing a weighted least squares equation given by:

$$L = \sum_{i=1}^{n} w_i (z_i - \alpha - \beta t_i)^2 \qquad (2b)$$

where $w_i$ is a normalized weight function.

Normalized weight functions $w_i$ weight recent metric data values higher than older metric data values within the historical window. Examples of normalized weight functions that give more weight to more recently received metric data values within the historical window include $w_i = e^{(i-n)}$ and $w_i = i/n$, for $i=1, \ldots, n$. The slope parameter of Equation (2a) is computed as follows:

$$\beta = \frac{\sum_{i=1}^{n} w_i (t_i - t_w)(z_i - z_w)}{\sum_{i=1}^{n} w_i (t_i - t_w)^2} \qquad (2c)$$

where $$t_w = \frac{\sum_{i=1}^{n} w_i t_i}{\sum_{i=1}^{n} w_i}$$

$$z_w = \frac{\sum_{i=1}^{n} w_i z_i}{\sum_{i=1}^{n} w_i}$$

The vertical axis intercept parameter of Equation (2a) is computed as follows:

$$\alpha = z_w - \beta t_w \qquad (2d)$$

In other implementations, the weight function may be defined as $w_i \equiv 1$.

A goodness-of-fit parameter is computed as a measure of how well the trend estimate given by Equation (2a) fits the metric data values in the historical window:

$$R^2 = \frac{\sum_{i=1}^{n} (T_i - z_w)^2}{\sum_{i=1}^{n} (z_i - z_w)^2} \qquad (3)$$

The goodness-of-fit $R^2$ ranges between 0 and 1. The closer $R^2$ is to 1, the closer linear Equation (2a) is to providing an accurately estimate of a linear trend in the metric data of the historical window. In decision block 1802 of FIG. 18, when $R^2 \leq Th_{trend}$, where $Th_{trend}$ is a user defined trend threshold less than i, the estimated trend of Equation (2a) is not a good fit to the sequence of metric data values and the sequence of metric data in the historical window is regarded as non-trendy metric data. On the other hand, when $R^2 > Th_{trend}$, the estimated trend of Equation (2a) is recognized as a good fit to the sequence of metric data in the historical window and the trend estimate is subtracted from the metric data values. In other words, when $R^2 > Th_{trend}$, for $i=1, \ldots, n$, the trend estimate of Equation (2a) is subtracted from the sequence of metric data in the historical window to obtain detrended metric data values:

$$\hat{z}_i = z_i - T_i \qquad (4)$$

where the hat notation "^" denotes non-trendy or detrended metric data values.

In FIG. 19B, dashed line 1908 represents an estimated trend of the sequence of metric data. The estimated trend is subtracted from the metric data values according to Equation (4) to obtain a detrended sequence of metric data shown in FIG. 19C. Although metric data values may vary stochastically within the historical window, with the trend removed as shown in FIG. 19C, the metric data is neither generally increasing nor decreasing for the duration of the historical window.

Returning to FIG. 18, as recently forwarded metric data values are input to the metric processor 1702 and a corresponding number of oldest metric data values are discarded from the historical window, as described above with reference to FIG. 17, the metric processor 1702 updates the slope and vertical axis intercepts according to Equations (2b) and (2c), computes a goodness-of-fit parameter according to Equation (3), and, if a trend is present, subtracts the trend estimate according to Equation (4) to obtain a detrended sequence of metric data in the historical window. If no trend is present in the metric data of the historical window as determined by the goodness-of-fit in Equation (3), the sequence of metric data in the historical window is non-trendy. In either case, the sequence of metric data output from the computational operations represented by blocks 1801-1803 is called a sequence of non-trendy metric data and each non-trendy metric data value is represented by $$\hat{z}_i = A_i + S_i \qquad (5)$$

where $i=1, \ldots, n$.

The mean of the non-trendy metric data in the historical window is given by:

$$\mu_z = \frac{1}{n} \sum_{i=1}^{n} \hat{z}_i$$

When the metric data in the historical window has been detrended according to Equation (4) and $R^2 > Th_{trend}$, the mean $\mu_z = 0$. On the other hand, when the metric data in the historical satisfies the condition $R^2 \leq Th_{trend}$, then it may be the case that the mean $\mu_z \neq 0$.

In alternative implementations, computation of the goodness-of-fit $R^2$ is omitted and the trend is computed according to Equations (2a)-(2d) followed by subtraction of the trend from metric data in the historical window according to Equation (4). In this case, the mean of the metric data $\mu_z$ equals zero in the discussion below.

The sequence of detrended or non-trendy metric data may be either stationary or non-stationary metric data. Stationary non-trendy metric data varies over time in a stable manner about a fixed mean. Non-stationary non-trendy metric data, on the other hand, the mean is not fixed and varies over time. For a stationary sequence of non-trendy metric data, the stochastic process models 1804-1806 in FIG. 18 may be autoregressive moving-average models 1806-1808 ("ARMA") computed separately for the stationary sequence of metric data in the historical window. An ARMA model is represented, in general, by $$\phi(B)\hat{z}_n = \theta(B)\alpha_n \qquad (6a)$$

where

B is a backward shift operator $$\phi(B) = 1 - \sum_{i=1}^{p} \phi_i B^i$$

$$\theta(B) = 1 - \sum_{i=1}^{q} \theta_i B^i$$

$a_n$ is white noise;

$\phi_i$ is an i-th autoregressive weight parameter, $\theta_i$ is an i-th moving-average weight parameter;

p is the number of autoregressive terms called the "autoregressive order;" and q is the number of moving-average terms called the "moving-average order;"

The backward shift operator is defined as $B\hat{z}_n = \hat{z}_{n-1}$ and $B^i \hat{z}_n = \hat{z}_{n-i}$. In expanded notation, the ARMA model is represented by $$\hat{z}_n = \sum_{i=1}^{p} \phi_i \hat{z}_{n-i} + a_n + \mu_z \Phi + \sum_{i=1}^{q} \theta_i a_{n-i} \quad (6b)$$

where $\Phi = 1 - \phi_1 - \ldots - \phi_p$.

The white noise parameters $\alpha_n$ may be determined at each time stamp by randomly selecting a value from a fixed normal distribution with mean zero and non-zero variance. The autoregressive weight parameters are computed from the matrix equation:

$$\vec{\phi} = P^{-1} \vec{\rho} \quad (7)$$

where $$\vec{\phi} = \begin{bmatrix} \phi_1 \\ \vdots \\ \phi_p \end{bmatrix};$$

$$\vec{\rho} = \begin{bmatrix} \rho_1 \\ \vdots \\ \rho_p \end{bmatrix}; \text{ and}$$

$$P^{-1} = \begin{bmatrix} 1 & \rho_1 & \cdots & \rho_{p-1} \\ \rho_1 & 1 & \cdots & \rho_{p-2} \\ \vdots & \vdots & \ddots & \vdots \\ \rho_{p-1} & \rho_{p-2} & \cdots & 1 \end{bmatrix}^{-1}$$

The matrix elements are computed from the autocorrelation function given by:

$$\rho_k = \frac{\gamma_k}{\gamma_0} \quad (8)$$

where $$\gamma_k = \frac{1}{n} \sum_{i=1}^{n-k} (\hat{z}_i - \mu_z)(\hat{z}_{i+k} - \mu_z)$$

$$\gamma_0 = \frac{1}{n} \sum_{i=1}^{n} (\hat{z}_i - \mu_z)^2$$

The moving-average weight parameters may be computed using gradient descent. In the Example of FIG. 18, the metric processor 1702 computes three separate stochastic process models 1804-1806 for stationary sequence of non-trendy metric data in the latest historical window. For example, when the historical window of the sequence of non-trendy metric data is updated with recently received non-trendy metric data values, three sets of autoregressive and moving average weight parameters are computed for each the three ARMA models denoted by ARMA($p_1,q_1$), ARMA($p_2,q_2$), and ARMA($p_3,q_3$).

Figure 20:
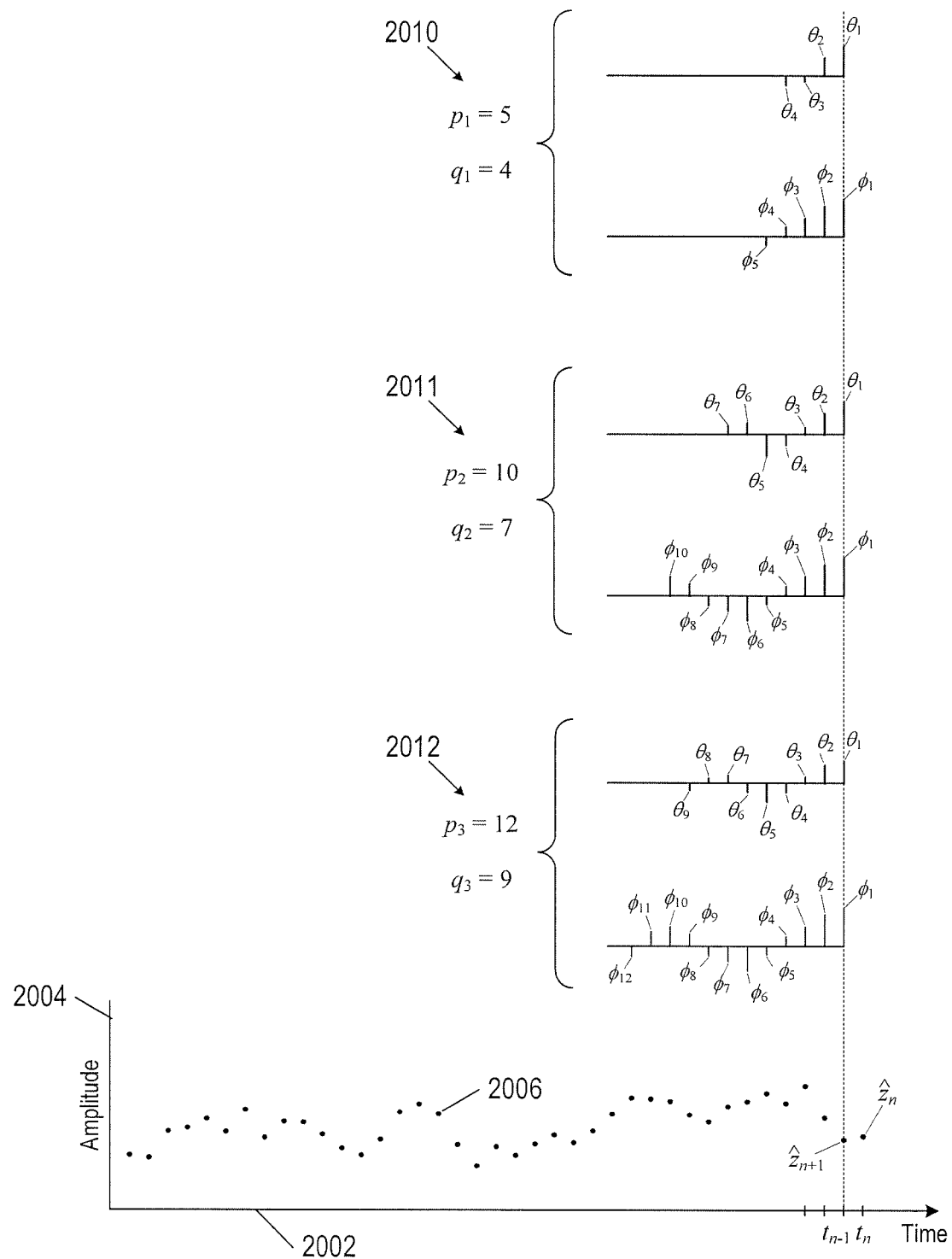
FIG. 20 shows example weight parameters for three autoregressive moving-average models.

FIG. 20 shows example weight parameters for three autoregressive moving-average models ARMA($p_1,q_1$), ARMA($p_2,q_2$), and ARMA $p_3,q_3$). Horizontal axis 2002 represents time. Vertical axis 2004 represents a range of amplitudes of a stationary sequence of non-trendy metric data. Points, such as point 2006, represent metric data values in a historical window. FIG. 20 includes plots of three example sets of autoregressive and moving average weight parameters 2010-2012 for three different autoregressive and moving-average models. For example, ARMA model ARMA($p_3,q_3$) 2012 comprises twelve autoregressive weight parameters and nine moving-average weight parameters. The values of the autoregressive weight parameters and moving-average weight parameters are computed for the stationary sequence of non-trendy metric data in the historical window. Positive and negative values of the autoregressive weight parameters and moving-average weight parameters are represented by line segments that extend above and below corresponding horizontal axes 2014 and 2016 and are aligned in time with time stamps of the non-trendy metric data.

Prior to updating the stochastic process models, when a new metric data value $z_{n+14}$ is received by the metric processor 1702, the new metric data value is detrended according to Equation (4) to obtained detrended metric value $\hat{z}_{n+1}$ and a corresponding estimated non-trendy metric data value $\hat{z}_{n+1}^{(m)}$ is computed using each of the stochastic process models 1804-1806. For example, the estimated non-trendy metric data value $\hat{z}_{n+1}^{(m)}$ may be computed using each of the ARMA models ARMA ($p_m,q_m$) as follows:

$$\hat{z}_{n+1}^{(m)} = \sum_{i=1}^{p_m} \phi_i \hat{z}_n + a_{n+1} + \mu_z \Phi + \sum_{i=1}^{q_m} \theta_i a_n \quad (9)$$

where m=1, 2, 3.

Separate accumulated residual errors are computed for each stochastic model as new metric data values are received by the metric processor 1702 as follows:

$$\text{Error}(p_m, q_m) = \sum_{i=1}^{n} (\hat{z}_{n+1}^{(m)} - \hat{z}_{n+1})^2 \quad (10)$$

where $\hat{z}_{n+1}$ is a latest non-trendy metric data value received by the metric processor 1702 at time stamp $t_{n+1}$;

$\hat{z}_{n+1}^{(m)}$ is an estimated non-trendy metric data value computed using the ARMA model ARMA($p_m$,$q_m$) at the time stamp $t_{n+1}$; and $(\hat{z}_{n+1}^{(m)}-\hat{z}_{n+1})^2$ is a residual error at the time stamp $t_{n+1}$.

After the accumulated residual error is computed, the limited history of metric data is updated as described above with reference to FIG. 17 and the parameters of the stochastic process models 1804-1806 are updated.

Figure 21:
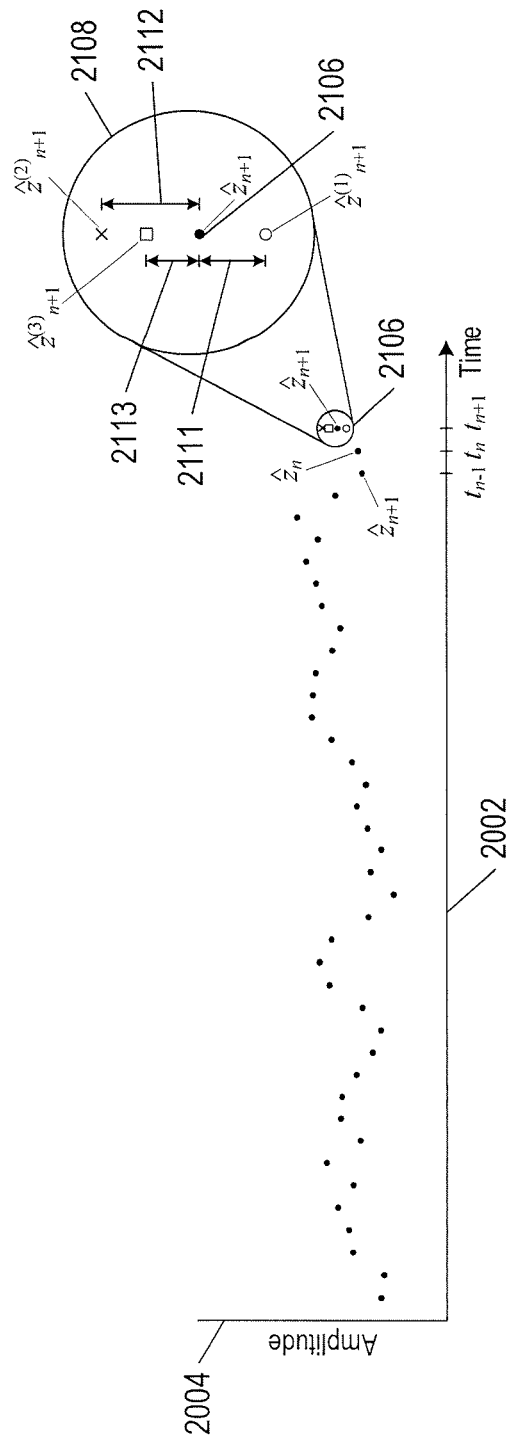
FIG. 21 shows an example of a latest non-trendy metric data value and three forecasted non-trendy metric data values with the same time stamp.

FIG. 21 shows an example of a latest non-trendy metric data value $\hat{z}_{n+1}$ received by the metric processor 1702 as represented by point 2106. Three candidate metric data values are separately computed using the three ARMA models ARMA($p_1$,$q_1$), ARMA($p_2$,$q_2$), and ARMA($p_3$,$q_3$) as follows:

$$\hat{z}_{n+1}^{(1)} = \sum_{i=1}^{p_1} \phi_i \hat{z}_n + a_{n+1} + \mu_z \Phi + \sum_{i=1}^{q_1} \theta_i a_n$$

$$\hat{z}_{n+1}^{(2)} = \sum_{i=1}^{p_2} \phi_i \hat{z}_n + a_{n+1} + \mu_z \Phi + \sum_{i=1}^{q_2} \theta_i a_n$$

and $$\hat{z}_{n+1}^{(3)} = \sum_{i=1}^{p_3} \phi_i \hat{z}_n + a_{n+1} + \mu_z \Phi + \sum_{i=1}^{q_3} \theta_i a_n$$

where the white noise $\alpha_{n+1}$ is randomly selecting from the fixed normal distribution. FIG. 21 includes a magnified view 2108 of the latest non-trendy metric data value $\hat{z}_{n+1}$ 2106 received by the metric processor 1702 and three estimated non-trendy metric data values $\hat{z}_{n+1}^{(1)}$, $\hat{z}_{n+1}^{(2)}$ and $\hat{z}_{n+1}^{(3)}$ computed separately from the three ARMA models at the time stamp $t_{n+1}$. Directional arrows 2011-2013 represent differences in amplitudes between the latest non-trendy metric data value $\hat{z}_{n+1}$ 2106 and the three estimated non-trendy metric data values $\hat{z}_{n+1}^{(1)}$, $\hat{z}_{n+1}^{(2)}$ and $\hat{z}_{n+1}^{(3)}$. Accumulated residual errors are maintained for each of the ARMA models as follows:

$$\text{Error}(p_1, q_1) = \sum_{i=1}^{n} (\hat{z}_{n+1}^{(1)} - \hat{z}_{n+1})^2$$

$$\text{Error}(p_2, q_2) = \sum_{i=1}^{n} (\hat{z}_{n+1}^{(2)} - \hat{z}_{n+1})^2$$

and $$\text{Error}(p_3, q_3) = \sum_{i=1}^{n} (\hat{z}_{n+1}^{(3)} - \hat{z}_{n+1})^2$$

Returning to FIG. 18, when a forecast is requested 1807 in block 1808, the accumulated residual errors of the stochastic models are compared and the stochastic process model with the smallest accumulated residual error is selected for forecasting. For example, the ARMA model ARMA($p_m$,$q_m$) may be used to compute forecasted metric data values as follows:

$$\hat{z}_{n+l}^{(m)} = \sum_{i=1}^{l-1} \phi_i \hat{z}_{n+l-i}^{(m)} + \sum_{i=l}^{p_m} \phi_i \hat{z}_{n+l-i} + a_{n+l} + \mu_z \Phi + \sum_{i=1}^{q_m} \theta_i a_{n+l-i} \quad (11)$$

where $l=1, \ldots,$ L is a lead time index with L the number of lead time stamps in the forecast interval;

$\hat{z}_n^{(m)}$ is zero; and $\alpha_{n+l}$ is the white noise for the lead time stamp $t_{n+l}$.

Figure 22:
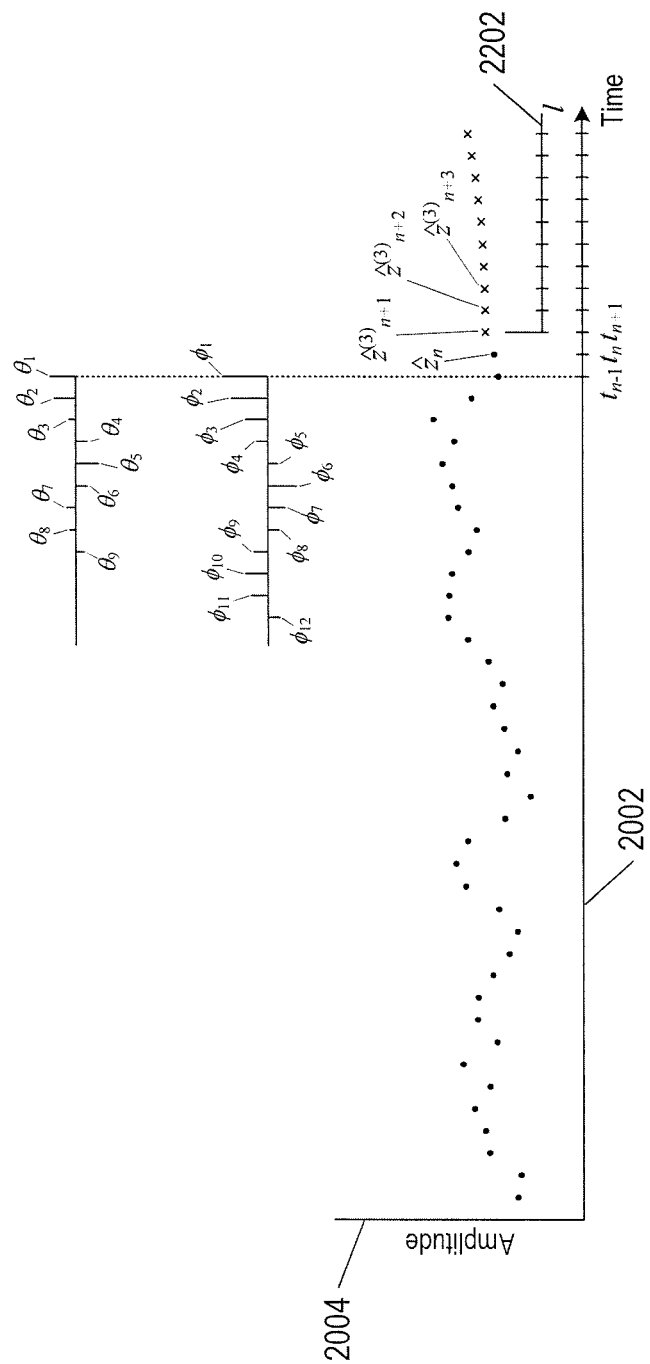
FIG. 22 shows an example sequence of forecasted non-trendy metric data.

FIG. 22 shows forecasted metric data values computed using weight parameters of the ARMA model 2012 ARMA($p_3$, $q_3$) in FIG. 20. In the example of FIG. 22, horizontal axis 2202 is a time axis for positive integer lead time indices denoted by l. The first three forecasted metric data values, denoted by "x's" in FIG. 22, are computed using ARMA($p_3$,$q_3$) as follows:

$$\hat{z}_{n+1}^{(3)} = \sum_{i=1}^{p_3} \phi_i \hat{z}_{n+1-i} + a_{n+1} + \mu_z \Phi + \sum_{i=1}^{q_3} \theta_i a_{n+l-i}$$

$$\hat{z}_{n+2}^{(3)} = \phi_1 \hat{z}_{n+1}^{(3)} + \sum_{i=2}^{p_3} \phi_i \hat{z}_{n+2-i} + a_{n+2} + \mu_z \Phi + \sum_{i=1}^{q_3} \theta_i a_{n+l-i}$$

and $$\hat{z}_{n+3}^{(3)} = \phi_1 \hat{z}_{n+2}^{(3)} + \phi_2 \hat{z}_{n+1}^{(3)} + \sum_{i=3}^{p_3} \phi_i \hat{z}_{n+3-i} + a_{n+3} + \mu_z \Phi + \sum_{i=1}^{q_3} \theta_i a_{n+l-i}$$

In still other implementations, the stochastic process models 1804-1806 in FIG. 18 may be implemented as autoregressive process ("AR") models given by:

$$\hat{z}_n = \sum_{i=1}^{p} \phi_i \hat{z}_{n-i} + a_n + \mu_z \Phi \quad (12)$$

The autoregressive process model is obtained by omitting the moving-average weight parameters form the ARMA model. By omitting the moving-average model, computation of the autoregressive weight parameters of the autoregressive model is less computationally expensive than computing the autoregressive and moving-average weight parameters of the ARMA models. When the historical window of the sequence of non-trendy metric data is updated with recently received non-trendy metric data values, three sets of autoregressive weight parameters are computed for each the three AR models denoted by AR($p_1$), AR($p_2$), and AR($p_3$). Accumulated residual errors are maintained for each of the AR models. Forecasted metric data values $\hat{z}_{n+l}^{(m)}$ are computed for lead times using Equation (11) with the moving-average weight parameters equal to zero and the AR model with smallest accumulated residual error at the time of the forecast request.

Unlike a stationary sequence of non-trendy metric data, a non-stationary sequence of non-trendy metric data does not vary over time in a stable manner about a fixed mean. In other words, a non-stationary sequence of non-trendy metric data behaves as the though the metric data values of the sequence have no fixed mean. In these situations, one or more of the stochastic process models 1804-1806 in FIG. 18 may be implemented using an autoregressive integrated moving-average ("ARIMA") model given by:

$$\phi(B)\nabla^d \hat{z}_n = \theta(B)\alpha_n \quad (13)$$

where $\nabla^d = (1-B)_d$.

The ARIMA autoregressive weight parameters and move-average weight parameters are computed in the same manner as the parameters of the ARMA models described above. The ARIMA model, denoted by ARIMA($p_1$,$q_1$), ARIMA($p_2$, $q_2$), and ARIMA($p_3$,$q_3$), with the smallest accumulated residual error at the time of the forecast request is used to compute forecasted metric data values $\hat{z}_{n+l}^{(m)}$ for lead times in the forecast interval.

Returning to FIG. 18, certain streams of metric data may have pulse wave patterns. Other streams of metric data may have a single time varying periodic pattern or a combination of period patterns, such as hourly, daily, weekly or monthly periodic patterns, and are called "seasonal." Other streams of metric data may not be periodic. Because pulse wave metric data is a special type of periodic data, in decision block 1809, edge detection is used to determine if the sequence of non-trendy metric data in the historical window is pulse wave metric data. If edge detection reveals that the metric data is pulse wave metric data, control flows to determining the pulse wave model 1810. Otherwise, control flows to block 1811 to determine if the metric data contains a seasonal pattern. Seasonality in a sequence of non-trendy metric data is a regular periodic pattern of amplitude changes that repeats in time periods. A seasonal period is determined in a seasonal model in block 1811.

Figure 23:
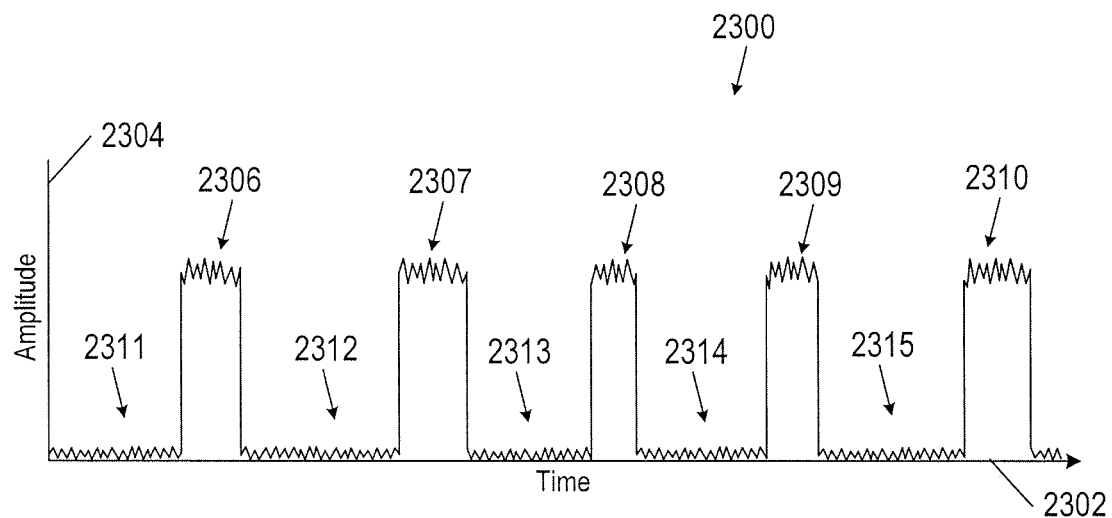
FIG. 23 shows a plot of an example stream of metric data that exhibits a pulse wave pattern.

FIG. 23 shows a plot of an example stream of metric data 2300. Horizontal axis 2302 represents time. Vertical axis 2304 represents a range of amplitudes for metric data values. The stream of metric data comprises pulses 2306-2310 separated by low amplitude time intervals 2311-2314. The stream of metric data may represent network traffic, memory usage, or CPU usage for a server computer that runs a periodically executed VM. The low amplitude time intervals 2311-2314 represent time intervals in which the VM is idle. Pulses 2306-2310 represent time intervals when the VM is running. This stream of metric data is an example of metric data modeled using a pulse wave model 1810.

Figure 24:
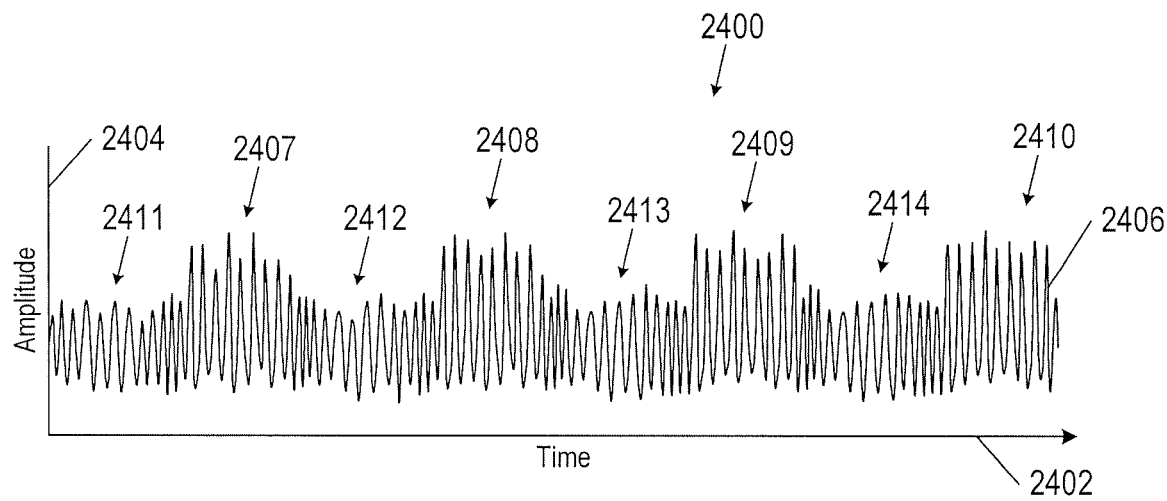
FIG. 24 shows a plot of an example stream of metric data that exhibits a seasonal wave pattern.

FIG. 24 shows a plot of an example stream of metric data 2400 that exhibits two seasonal periods. Horizontal axis 2402 represents time. Vertical axis 2404 represents a range of amplitudes for metric data values. Oscillating curve 2406 represents a stream of metric data with two seasonal periods. A first longer seasonal period appears with regularly spaced larger amplitude oscillations 2406-2409 separated by regularly spaced smaller amplitude oscillations 2410-2413. A second shorter seasonal period exhibits oscillations over much shorter time intervals. This stream of metric data is an example of seasonal metric data modeled using the seasonal model 1811.

In block 1809 of FIG. 18, edge detection is applied to the metric data in the historical window. An exponentially weighted moving average ("EWMA") of absolute differences between two consecutive non-trendy metric data values denoted by $|\hat{z}_i - \hat{z}_{i-1}|$ is maintained for i=1, . . . , n metric data values in the historical window. The EWMA for the latest time stamp $t_n$ in the historical window is computed recursively by:

$$MA_n = \alpha |\hat{z}_n - \hat{z}_{n-1}|_n + (1-\alpha)MA_{n-1} \quad (14a)$$

where
$MA_0 = 0$; and
$0 < \alpha < 1$.

For example, the parameter α may be set 0.1, 0.2, or 0.3. For each new non-trendy metric data value $\hat{z}_{n+1}$, the absolute difference $|\hat{z}_{n+1} - \hat{z}_n|$ is computed. The new non-trendy metric data value $\hat{z}_{n+1}$ is a spike in the magnitude of the stream of metric data, when the absolute difference satisfies the following spike threshold condition:

$$|\hat{z}_{n+1} - \hat{z}_n| \quad (14b)$$

where $Th_{spike} = C \times MA_n$.

The parameter C is a numerical constant (e.g., C=4.0, 4.5, or 5.0). When the absolute difference $\Delta_{n+1}$ is less than the spike threshold, control flows to seasonal model in block 1811 of FIG. 18. When the new non-trendy metric data value $\hat{z}_{n+1}$ satisfies the condition given by Equation (14b), edge detection is applied to determine if sequence of non-trendy metric data comprises pulse wave edges in a backward time window $[\hat{z}_{n-X}, \hat{z}_n]$ and a forward time window $[\hat{z}_n, \hat{z}_{n+X}]$, where X is a fixed number of metric data points.

Figure 25A:
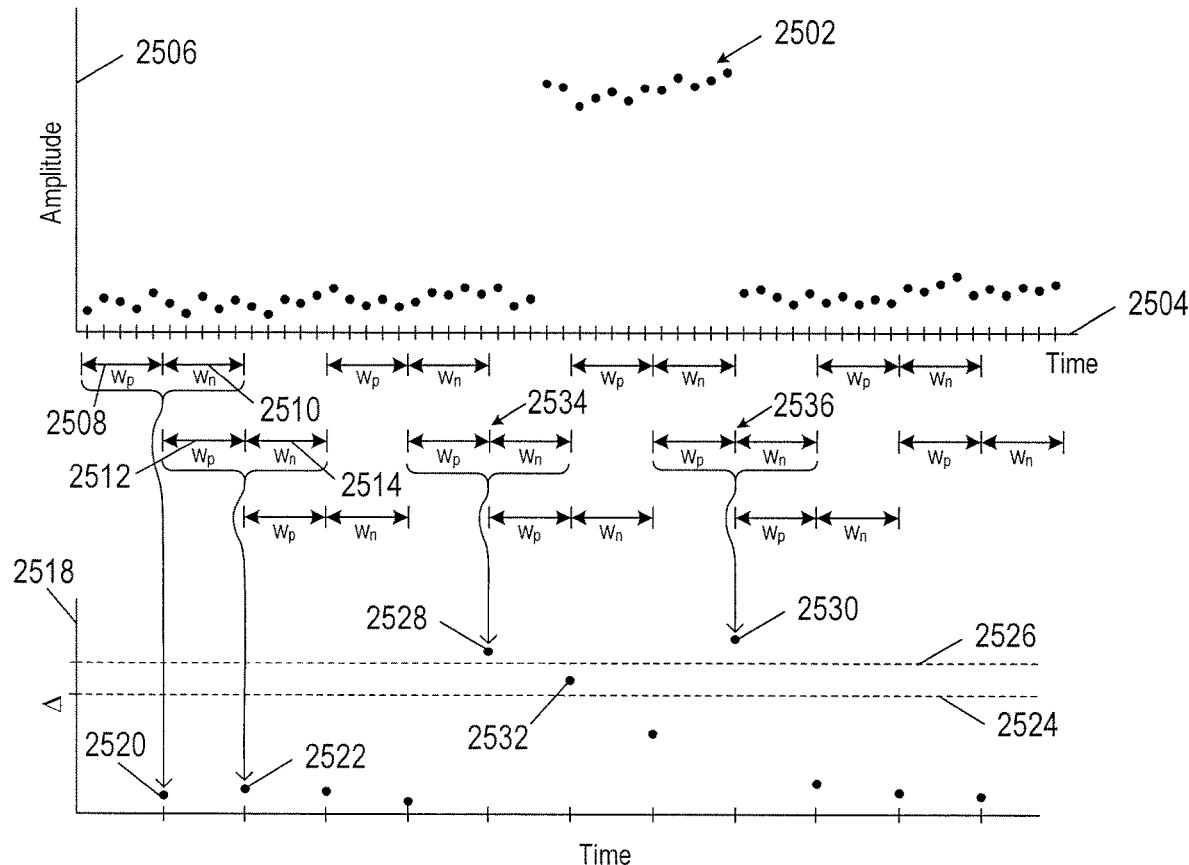
FIGS. 25A-25B shows edge detection applied to a sequence of metric data.
Figure 25B:
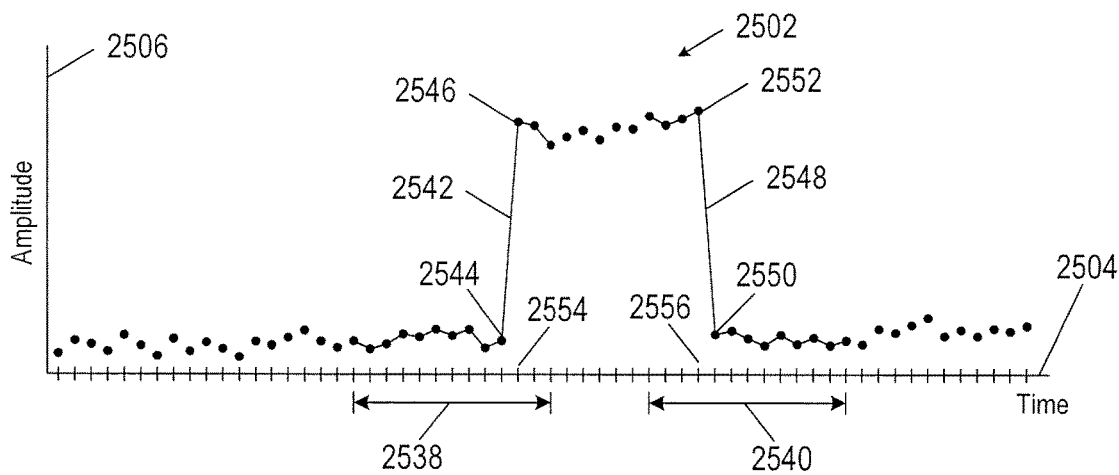

FIGS. 25A-25B show edge detection applied to a sequence of metric data. FIG. 25A shows a plot of a square pulse 2502 in metric data. The metric data may have been smoothed to suppress the noise using a smoothing filter applied to the metric data in the historical window. The smoothing filter may be a moving median filter, a moving average filter, or a Gaussian filter. Horizontal axis 2504 represents a time window of the historical window. For example, the time window may be 20 minutes, 30 minutes, or 40 minutes or a longer time window of the historical window. Vertical axis 2506 represents a range of metric data amplitudes. Metric data are averaged in two adjacent sliding time windows within the larger time window 2504. The two adjacent time windows are referred to as a previous time window, denoted by $w_p$, and a next time window, denoted by $w_n$. FIG. 25A shows examples of adjacent sliding previous and next time windows. For example, directional arrows 2508 and 2510 represent adjacent previous and next time windows, respectively. In the example of FIG. 25A, the previous and next time windows each contain five metric data points. In other implementations, the previous and next time windows may contain any number of metric data points. FIG. 25A shows the locations of previous and next time windows as the windows move within the larger time window 2504 represented by horizontal time axis 2504. Each next time window becomes a previous time window. For example, next time window 2510 becomes previous time window 2512. For each location of the previous time window, an average of the metric data values in the previous time window is computed as follows:

$$\sum S(w_p) = \frac{1}{|S(w_p)|} \sum_{z_i \in S(w_p)} z_i \quad (15a)$$

where
$S(w_p)$ is the set of metric data with time stamps in the previous time window $w_p$; and
$|S(w_p)|$ is the number of metric data points with time stamps in the previous time window $w_p$.

An average of the metric data values in the next time window is computed as follows:

$$\sum S(w_n) = \frac{1}{|S(w_n)|} \sum_{z_i \in S(w_n)} z_i. \quad (15b)$$

where
$S(w_n)$ is the set of metric data with time stamps in the next time window $w_n$; and
$|S(w_n)|$ is the number of metric data values with time stamps in the next time window $w_n$.

The average metric data $\Sigma S(w_p)$ in the previous time window and the average metric data $\Sigma S(w_n)$ in the next time window are moving averages as the previous and next time windows are moved within the larger time window 2504. A change parameter is computed for each location of the previous and next time windows in the larger time window 2504 as follows:

$$\Delta = |\Sigma S(w_p) - \Sigma S(w_n)| \tag{16}$$

FIG. 25A shows a plot of change parameters for each location of the previous and next time windows. Horizontal axis 2516 represents time. Vertical axis 2518 represents a range of change parameter values. For example, solid point 2520 represents the value of a change parameter for the metric values in previous and next time windows 2508 and 2510. Solid point 2522 represents the value of a change parameter for the metric values in previous and next time windows 2512 and 2514.

When the following two conditions are satisfied for a change parameter, the corresponding previous and next time windows are a time interval, denoted by $w_p \cup w_n$, that contains an edge of a square pulse of metric data. The first condition is given by $$\Delta > Th_1 \times (\max\{z_i\} - \min\{z_i\}) \tag{17a}$$

where
$0 < Th_1 < 1$ (e.g., $Th_1 = 0.05$);
$\max\{z_i\}$ is the maximum metric value in set of metric data values in the historical window;
$\min\{z_i\}$ is the minimum metric value in the set of metric data values in the historical window; and
$\max\{z_i\} - \min\{z_i\}$ is the maximum amplitude range of metric data values in the historical window.
The quantity $Th_1 \times (\max\{z_i\} - \min\{z_i\})$ is the maximum amplitude range of metric data values threshold. The second condition is given by $$\Delta > Th_2 \times MA(\Delta) \tag{17b}$$

where
$0 < Th_2 < 1$ (e.g., $Th_2 = 0.25$); and
$MA(\Delta)$ is the EWMA.
The quantity $Th_2 \times MA(\Delta)$ is a change parameter EWMA threshold. The EWMA of the change parameters is a weighted average that assigns weight to the most recently generated change parameter relative to change parameters generated in the past and is given by:

$$MA(\Delta_i) = \lambda \Delta_i + (1-\lambda)MA(\Delta_{i-1})$$

where
$MA(\Delta_0)$ is the mean of historical change parameters;
$\Delta_i$ is the change parameter of the i-th most recent previous and next time window; and
$0 < \lambda < 1$ is a constant that determines the weight at which older change parameters enter into calculation of the EWMA (i.e., a large value of λ gives more weight to recent change parameters and less weight to older change parameters).

In FIG. 25A, dashed lines 2524 and 2526 represent thresholds in Equations (17a) and (17b). Change parameters 2528 and 2530 satisfy the two conditions. Change parameter 2530 satisfies one condition but not the other. Change parameters with values less than dashed line 2524 do not satisfy either condition. Because the change parameters 2528 and 2530 satisfy the two conditions, the corresponding previous and next time windows 2534 and 2536 are time intervals that contain edges of the square pulse 2502.

An absolute difference is computed between each pair of consecutive metric data values with time stamps in a time interval $w_p \cup w_n$ identified as having an edge. The largest absolute difference between consecutive pairs of metric data values in the time interval is given by $$|z_{i+1} - z_i| = \max\{|z_{j+1} - z_j|\}_{j=1}^{J-1} \tag{18}$$

where
$z_j \in w_p \cup w_n$ for $j = 1, \ldots, J$; and
J is the number of metric data points in the time interval $w_p \cup w_n$.
When $z_{i+1} - z_i > 0$, the edge is an upward or increasing edge and time $t_{i+1}$ is the time of the upward edge. When $z_{i+1} - z_i < 0$, the edge is a downward or decreasing edge and time $t_i$ is the time of the downward edge.

FIG. 25B shows a plot of the square pulse 2502 of metric data values and time intervals 2538 and 2540 that correspond to previous and next time intervals 2534 and 2536, respectively. Line segments between metric data points represent absolute differences. Line segment 2542 between metric data values 2544 and 2546 is the largest difference between consecutive pairs of metric data points in the time interval 2538. Line segment 2548 between metric points 2550 and 2552 is the largest difference between consecutive pairs of metric data values in the time interval 2540. Time stamps 2554 and 2556 of the metric data values 2546 and 2552 are the edges of the square pulse 2502.

Returning to FIG. 18, the pulse wave model 1810 estimates the pulse width and period for the pulse wave stream of metric data. The pulse width can be estimated as a difference in time between consecutive upward and downward edges. The period can be estimated as a difference in time between two consecutive upward (or downward) edges.

Figure 26:
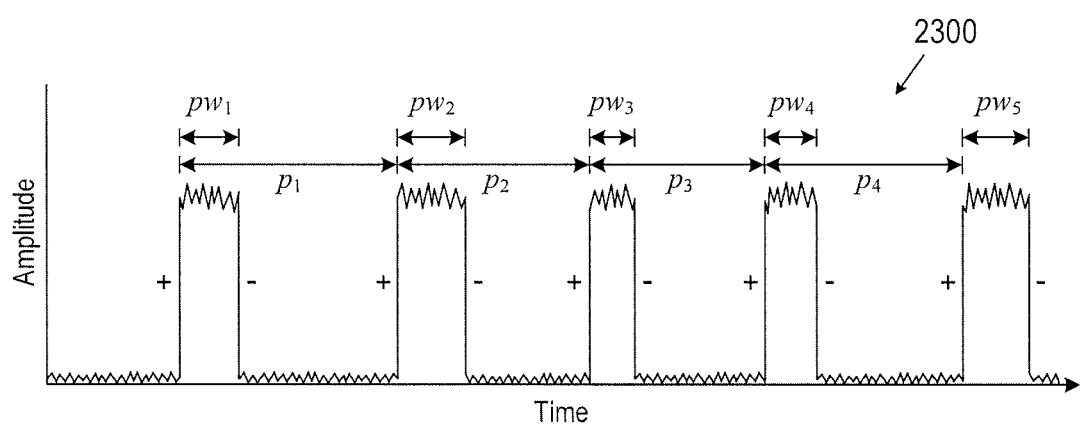
FIG. 26 shows pulse widths and periods of the pulses in the pulse-wave stream of metric data of FIG. 23.

FIG. 26 shows pulse widths and periods of the stream of metric data 2300. Each edge has a corresponding 3-tuple ($t_s$, A, sign), where $t_s$ represents the time stamp of the pulse edge, A is the amplitude of the pulse edge, and "sign" indicates whether pulse is upward denoted by "+" or downward denoted by "−". Pulse widths denoted by $pw_1$, $pw_2$, $pw_3$, $pw_4$, and $pw_5$ are computed as a difference between time stamps of consecutive upward and downward edges. Periods denoted by $p_1$, $p_2$, $p_3$, $p_4$, and $p_5$ are computed as a difference between time stamps of two consecutive upward (or downward) edges. The latest pulse widths and periods are recorded in corresponding circular buffer back-sliding histograms described below with reference to FIG. 30A.

Returning to FIG. 18, if the sequence of non-trendy metric data is not pulse-wave metric data, the metric data may be seasonal metric data and a seasonal period is determined in seasonal model 1811. The seasonal model 1811, begins by applying a short-time discrete Fourier transform ("DFT") given by:

$$Z(m, k/N) = \sum_{i=1}^{N} \hat{z}_i w(i-m) \exp(-j2\pi ki/N) \tag{19}$$

where
m is an integer time shift of a short-time window;
j is the imaginary constant $\sqrt{-1}$;
k = 0, ..., N−1 is a frequency spectrum sample;
N is the number of data points in a subset of the historical window (i.e., N ≤ n); and
w(i−m) is a window function.
The window function w(i−m) is function that tapers toward both ends of the short-time window. For example, the window function can be a Hann function, a Hamming function, or Gaussian function. The spectrum Z(m,k/N) is a complex valued function of m and k. The power spectral density ("PSD") is given by:

$$PSD(m, k/N) = |Z(m, k/N)|^2 \qquad (20)$$

where $k = 0, \ldots, N/2;$ $f_k = \frac{2k}{N} f_c;$ and $f_c$ is the Nyquist frequency.

The PSD is the power of the frequency spectrum at N/2+1 frequencies. The PSD values PSD(m,k/N) form a periodogram over a domain of frequency samples k (i.e., $f_k$) for each time shift m.

The short-time DFT may be executed with a fast Fourier transform ("FFT"). Ideally, a high-resolution FFT comprising a large window size and high sampling rate would be used to compute a PSD in each historical window of the FFT to provide complete frequency spectrum information in the historical window. By finding a maximum PSD point at each time shift m and curve fitting, various seasonal patterns and reconstructed metric data values can ideally be forecasted with an inverse FFT. However, computing a high-resolution FFT and storing the full PSD for a sequence of non-trendy metric data is computationally expensive and time consuming in a resource constrained management system that already receives thousands of different streams of metric data and in which real time forecasts are needed to respond to rapidly to changing demands for computational resources in a distributed computing system.

Methods described herein avoid the slowdown created by a high-resolution FFT by:

1) using an FFT in a short-time window with a small number of metric data points (e.g., a short-time window may have N=64, 128 or 256 sequential non-trendy metric data points of the limited history) for three different coarse sampling rates, 2) extracting a single principle frequency from each PSD and tracking a most recent mode of the principle frequency, and 3) performing a local auto-correlation function ("ACF") search in the time domain to refine estimation of a principle period that corresponds to the principle frequency of the metric data to compensate for resolution lost with coarse sampling rates and spectral leakage.

The FFT is applied to subsequences of the sequence of non-trendy metric data, each subsequence comprising N metric data points sampled from the sequence of non-trendy metric data using a different sampling rate. Each subsequence of metric data points is searched for a periodic pattern. For example, the example sequence of non-trendy metric data 2400 shown in FIG. 24 appears to have a short periodic pattern and a longer periodic pattern as described above with reference to FIG. 24. The period determined for the shorter sampling rate has higher priority in forecasting than a period obtained for a longer sampling rate.

Figure 27:
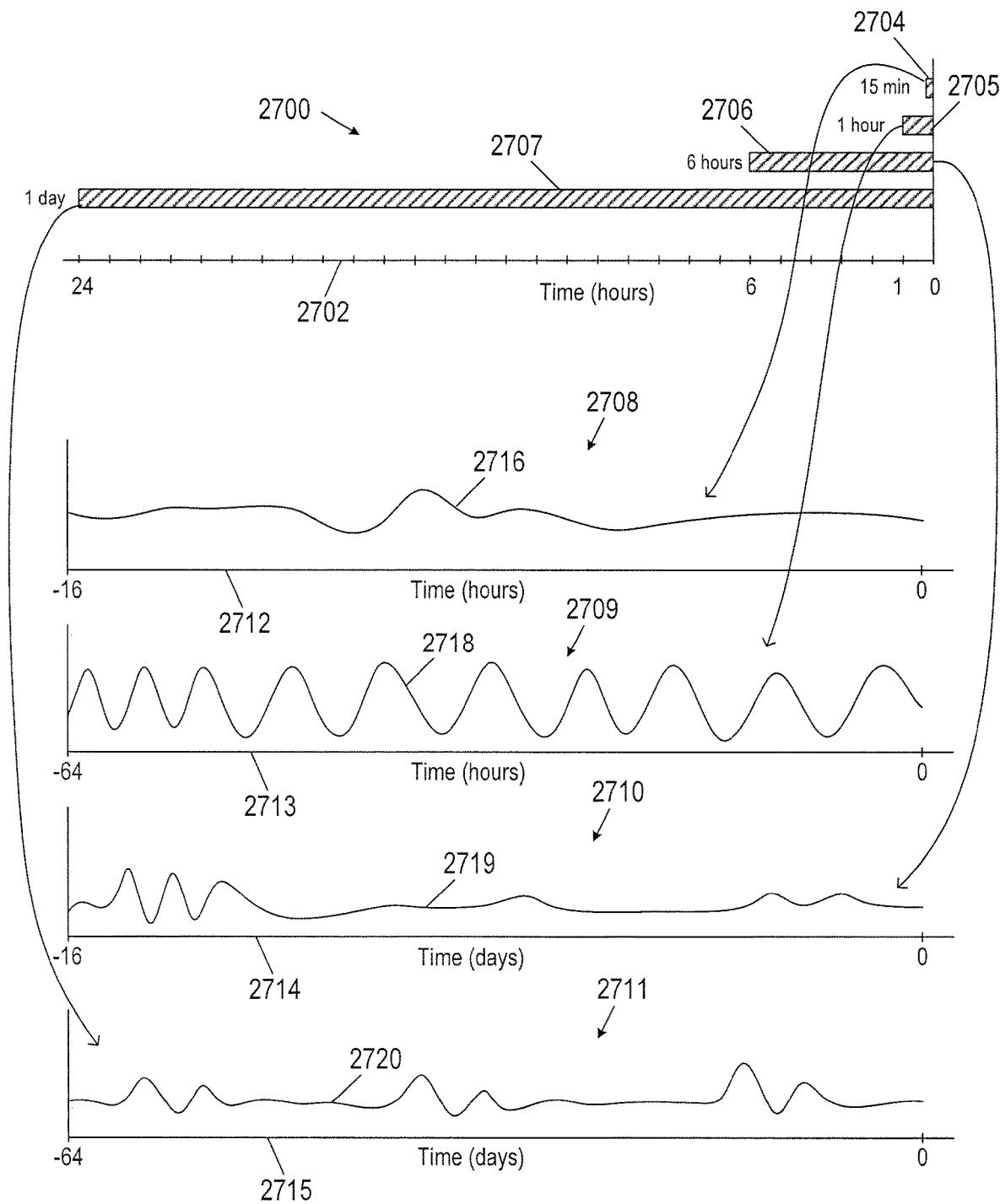
FIG. 27 shows a bar graph of four different examples of coarse sampling rates and associated streams of metric data.

FIG. 27 shows a bar graph 2700 of four different examples of sampling rates and associated with different subsequences of samples of the same sequence of non-trendy metric data. Horizontal axis 2702 represent time in hours. Hash-marked bars 2704-2707 represent durations of three different sampling rates applied to the same stream of metric data to collect three different subsequences of non-trendy metric data over three different time intervals. Each subsequence contains N=64 sequential non-trendy metric data points of the larger sequences of non-trendy metric data. Plots 2708-2711 are example plots of subsequences of metric data resampled from the sequence of non-trendy metric data over four different time intervals and the four different sampling rates represented by the bar graph 2700. In plots 2708-2711, horizontal axes 2712-2715 represent different time intervals. Time zero along each axis represents the current time. In plot 2708, horizontal axis 2712 represents a time interval of 16 hours. Curve 2716 represents a subsequence of metric data sampled from the sequence of non-trendy metric data over a 16-hour time interval at the sampling rate of 15 minutes. In plot 2708, horizontal axis 2713 represents a time interval of 64 hours. Curve 2718 represents a subsequence of metric data sampled from the sequence of non-trendy metric data over a 64-hour time interval at the sampling rate of 1 hour. In plot 2710, horizontal axis 2714 represents a time interval of 16 days. Curve 2719 represents a sequence of metric data sampled from the sequence of non-trendy metric data over a 16-day time interval at the sampling rate of 6 hours. In plot 2711, horizontal axis 2715 represents a time interval of 64 days. Curve 2720 represents metric data sampled from the sequence of non-trendy metric data over a 64-day time interval at the sampling rate of 24 hours. The different sampling rates applied to the same sequence of non-trendy metric data over different time intervals reveal different frequency patterns or seasonal periods within the sequence of non-trendy metric data. Subsequences of metric data 2718 exhibits a seasonal period. Subsequences of metric data 2716, 2719, and 2720 exhibit no discernible periodic pattern. If it is the case that different periods are present in two or more subsequences of metric data, the period associated with the shorter sampling rate has higher priority in forecasting than the period associated with the longer sampling rate. The dominant frequency or period of the subsequence of metric data with shortest associated sampling rate is determined. Methods for determining the dominant frequency or period of a sequence of non-trendy metric data are described below with reference to FIGS. 28-30.

Figure 28:
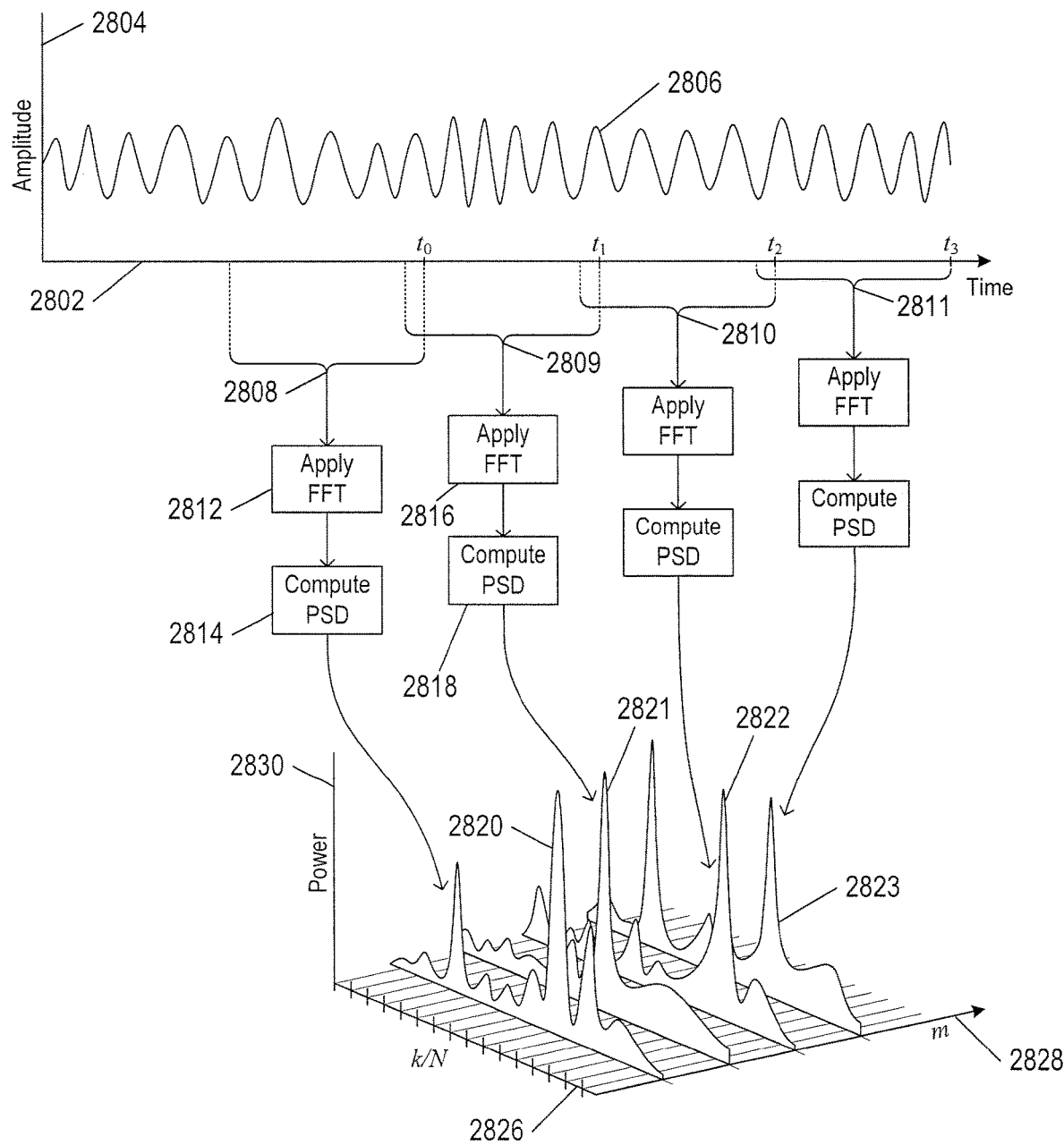
FIG. 28 shows an example of periodograms for a series of short-time windows of non-trendy metric data.

FIG. 28 shows an example of periodograms computed for a series of short-time windows of a sequence of non-trendy metric data. In FIG. 28, horizontal axis 2802 represents time. Vertical axis 2804 represents a range of metric data amplitudes. Curve 2806 represents a sequence of non-trendy metric data. Brackets 2808-2811 represents the location of a moving overlapping short-time window of non-trendy metric data as non-trendy metric data is received by the seasonal model 1811. For each short-time window, an FFT is applied to a small number N of the latest metric data points followed by computation of a PSD. For example, short-time window 2808 contains a subsequence of non-trendy metric data values up to a current time $t_0$. An FFT 2812 is applied to the latest subsequence of metric data (e.g., N=64) in the shot-time window 2808 followed by computation of a PSD 2814. As more metric data is received and sampled at the sampling rate, the FFT is applied to the subsequence of metric data in a current short-time window followed by computation of a PSD. For example, short-time window 2809 contains a subsequence of metric data up to a next current time $t_1$. An FFT 2816 is applied to the subsequence of latest metric data (e.g., N=64) in the shot-time window 2809 followed by computation of a PSD 2818. FIG. 28 also shows example plots of periodograms 2820-2823 for each the PSDs computed from the subsequences of metric data in each of the corresponding short-time windows 2808-2811. Axis 2826 represents a range of frequencies. Axis 2828 represents a range of time shifts. Axis 2830 represents a range of power.

For each periodogram, an approximate area of the periodogram is computed. For example, the approximate area of a periodogram can be computed using the Trapezoid Rule:

$$PSD_{Area} = \frac{N}{2} \sum_{k=1}^{N/2} \left( PSD\left(\frac{k-1}{N}\right) - PSD\left(\frac{k}{N}\right) \right) \quad (21)$$

Other methods may be used to compute the area of a periodogram, such as Simpson's rule and Romberg's method. Candidate principle frequencies of a periodogram are identified from the approximate area of the periodogram using the following threshold condition:

$$\underset{k}{\operatorname{argmax}}\left\{\left(PSD\left(\frac{k}{N}\right) * K_{trap}\left(\frac{k}{N}\right)\right)\right\} > Th_{princ} * \sum_{k=0}^{N/2} PSD\left(\frac{k}{N}\right) \quad (22)$$

where

"$*$" means convolution;

$Th_{princ} = PSD_{Area} / Q$; and $$K_{trap}\left(\frac{k}{N}\right) = C_1 PSD\left(\frac{k-1}{N}\right) + C_2 PSD\left(\frac{k}{N}\right) + C_3 PSD\left(\frac{k+1}{N}\right)$$

The parameter Q is a positive integer (e.g., Q=3, 4, or 5) and $K_{trap}(k/N)$ is called a normalized three-point trapezoid window. The parameters $C_1$, $C_2$, and $C_3$ are normalized to 1. For example, $C_1=C_3=0.25$ and $C_2=0.5$. If none of the frequencies of the periodogram satisfies the condition given by Equation (19), the subsequence of the sequence of non-trendy metric data does not have a principle frequency in the short-time window of the FFT and is identified as non-periodic.

Figure 29A:
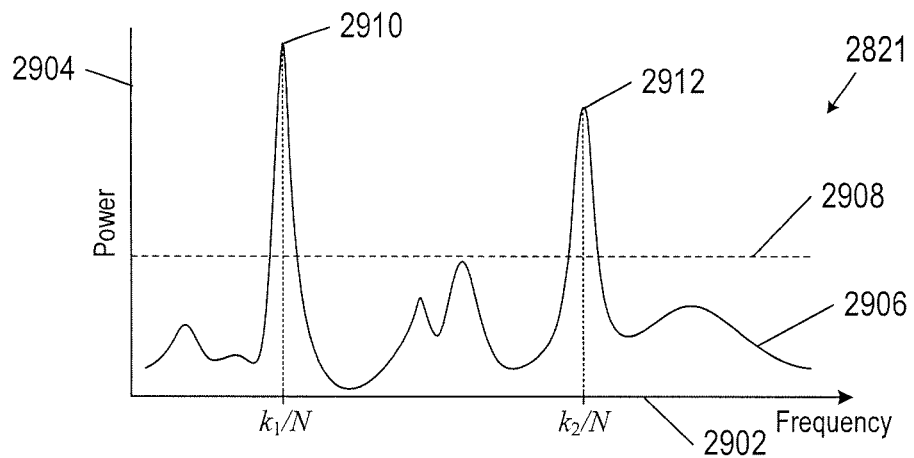
FIG. 29A show a plot of a periodogram.

FIG. 29A show a plot of the periodogram 2821 shown in FIG. 28.

Horizontal axis 2902 represents a frequency spectrum sample domain. Vertical axis 2904 represents a power range. Curve 2906 represents the power spectrum present in the subsequence of metric data over a spectral domain of frequencies k/N. The area under the curve 2906 may be approximated by Equation (21). Dashed line 2908 represents the principle frequency threshold $Th_{princ}$. In this example, the periodogram reveals two strong peaks 2910 and 2912 above the threshold 2908 with corresponding frequencies $k_1/N$ and $k_2/N$. However, which of the two peaks 2910 and 2912 is the principle frequency cannot be determined directly from the periodogram alone.

Each PSD value PSD(k/N) of a periodogram is the power in the spectral domain at a frequency k/N or equivalently at a period N/k in the time domain. Each DFT bin corresponds to a range of frequencies or periods. In particular, Z(k/N) bin corresponds to periods in the time interval $$\left[\frac{N}{k}, \frac{N}{k-1}\right).$$

The accuracy of discovered candidate principle frequencies based on the periodogram deteriorates for large periods because of the increasing width of the DFT bins (N/k). In addition, spectral leakage causes frequencies that are not integer multiples of the DFT bin width to spread over the entire frequency spectrum. As a result, a periodogram may contain false candidate principle frequencies. However, a periodogram may provide a useful indicator of candidate principle frequencies.

In certain implementations, the principle frequency of the periodogram is determined by computing an autocorrelation function ("ACF") within each neighborhood of candidate periods that correspond to candidate principle frequencies of the periodogram. The autocorrelation function over time lags τ is given by:

$$ACF(\tau) = \frac{1}{N} \sum_{i=1}^{N} \hat{z}_i \hat{z}_{i+\tau} \quad (23)$$

The ACF is time-domain convolution of the subsequence of non-trendy metric data values $\hat{z}_i$ in the short-time window of the FFT. Given the candidate principle frequencies of the periodogram that satisfy the threshold requirements of the condition in Equation (22), the ACF is used to determine which of the corresponding candidate periods in the time domain is a valid principle period. A candidate period with an ACF value located near a local maximum of the ACF (i.e., located within a concave-down region) is a valid period. A candidate period with an ACF value located near a local minimum of the ACF (i.e., located within a concave-up region) is not a valid period and is discarded. For a period with an ACF value that lies on a concave-down region of the ACF, the period is refined by determining the period of a local maximum ACF value of the concave-down region. The period of the local maximum is the principle period used to forecast seasonal metric data.

Figure 29B:
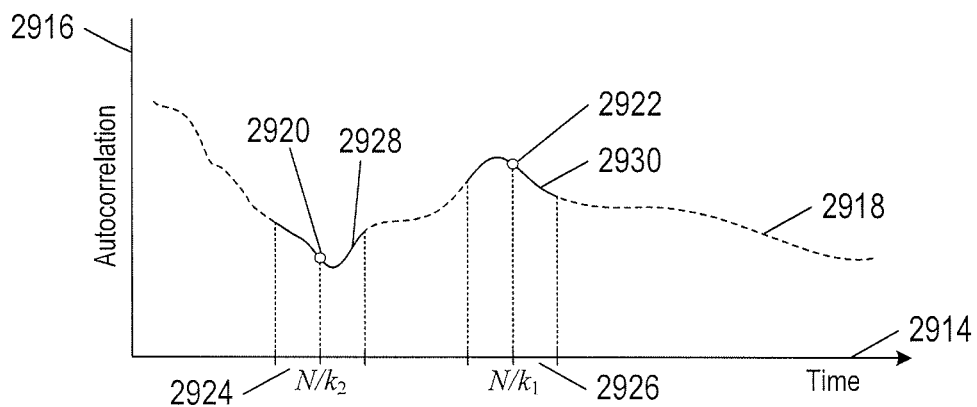
FIG. 29B shows a plot of an autocorrelation function that corresponds to the periodogram shown in FIG. 29A.

FIG. 29B shows a plot of an example ACF that corresponds to the periodogram shown in FIG. 29A. Horizontal axis 2914 represents time. Vertical axis 2916 represents a range of ACF values. Dashed curve 2918 represents ACF values computed according to Equation (23) over a time interval. Periods $N/k_1$ and $N/k_2$ represent candidate periods that correspond to candidate principle frequencies $k_2/N$ and $k_1/N$ in FIG. 29A. Open points 2920 and 2922 are ACF values at candidate periods $N/k_1$ and $N/k_2$. Rather than computing the full ACF represented by dashed curve 2918 over a large time interval, in practice, the ACF may be computed in smaller neighborhoods 2924 and 2926 of the candidate periods as represented by solid curves 2928 and 2930. The ACF value 2922 is located on a concave-down region of the ACF and corresponds to the largest of the two candidate principle frequencies. The other ACF value 2920 is located on a concave-up region of the ACF and corresponds to the smallest of the two candidate principle frequencies.

A neighborhood centered at the candidate period N/k is represented by:

$$NBH_{N/k} = \left[a, \ldots, \frac{N}{k}, \ldots, b\right] \quad (24)$$

In certain implementations, the end points for the neighborhoods may be given by:

$$a = \frac{1}{2}\left(\frac{N}{k+1} + \frac{N}{k}\right) - 1$$

and $$b = \frac{1}{2}\left(\frac{N}{k} + \frac{N}{k-1}\right) + 1$$

The upward or downward curvature of the ACF in the neighborhood of a candidate period is determined by computing a linear regression model for a sequence of points t between the endpoints of the neighborhood $NBH_{N/k}$. A split period within the search interval $R_{N/k}$ is obtained by minimizing a local approximation error for two line segments obtained from linear regression as follows:

$$t_{split} = \operatorname*{argmin}_{p}(\text{error}(S(a, t)) + \text{error}(S(t+1, b))) \quad (25)$$

where t is point in the neighborhood $NBH_{N/k}$;

S(a,t) is a first line segment fit to points between point a and point t of the search interval $NBH_{N/k}$;

S(t+1,b) is a second line segment fit to points between point t+1 and point b of the search interval $NBH_{N/k}$;

error(S(a,t)) is the error between the S(a,t) and ACF values between point a and point t; and error(S(t+1,b)) is the error between S(t+1,b) and ACF values between point t+1 and point b.

If the slopes of the first line segment $S(a, t_{split})$ and the second line segment $S(t_{split}+1, b)$ are correspondingly negative and positive, then the ACF value is in a concave-up region of the ACF and the corresponding period is discarded. If the slopes of the first line segment $S(a, t_{split})$ and second line segment $S(t_{split}+1, b)$ are correspondingly positive and negative, then the ACF value is in a concave-down region of the ACF and the corresponding candidate period is kept. Once a candidate period of a concave-down region has been identified, the local maximum ACF may be located at the end point of the first line segment $S(a, t_{split})$ or located at the start point of the second line segment $S(t_{split}+1, b)$. Alternatively, a hill-climbing technique, such as gradient ascent, is applied to determine the local maximum ACF of the concave-down region. The period that corresponds to the ACF local maximum is the principle period and is seasonal parameter used to forecast seasonal metric data over a forecast interval.

Figure 29C:
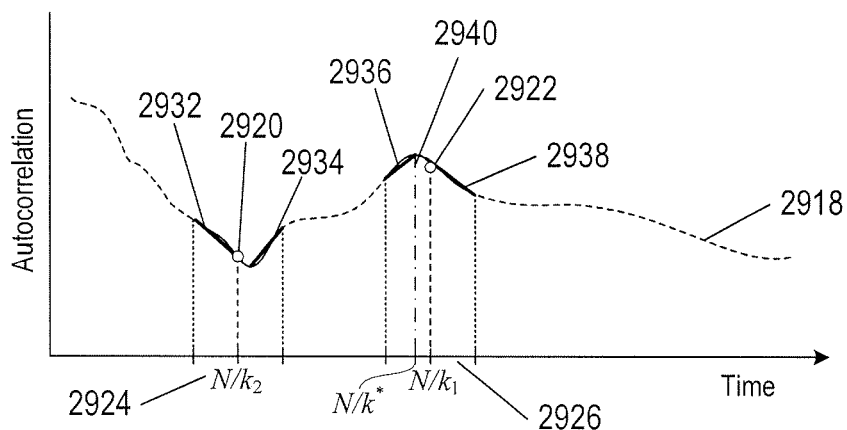
FIG. 29C shows examples of a local maximum and a local minimum in neighborhoods of the autocorrelation function shown in FIG. 29B.

FIG. 29C shows examples of line segments computed from ACF values in the neighborhoods 2924 and 2926. First and second line segments 2932 and 2934 in the neighborhood 2924 have negative and positive slopes, respectively. As a result, the candidate period $N/k_2$ is in a concave-up region of the ACF and is discarded. On the other hand, first and second line segments 2936 and 2938 in the neighborhood 2926 have positive and negative slopes, respectively. As a result, the candidate period $N/k_1$ is in a concave-down region of the ACF. The local maximum 2940 with principle period N/k* may be at the end of the first line segment or beginning of the second line segment or determined by applying a hill-climbing technique. The principle period is a seasonal parameter.

In other implementations, rather than checking each candidate period of the candidate frequencies that satisfy the condition in Equation (24) in neighborhoods of the ACF, only the candidate period that corresponds to the largest candidate principle frequency is checked using the ACF to determine if the candidate period is a principle period.

Recent mode tracking may be used to determine robust periodic model parameter estimates. Recent mode tracking is implemented with a circular buffer back-sliding histogram to track recent distributions. The periodic parameters are stored in a circular buffer. When a latest periodic parameter is determined, the periodic parameter is input to the circular buffer to overwrite the oldest periodic parameter stored in the buffer. The back-sliding histogram is updated by incrementing the count of the histogram bin the latest periodic parameter belongs to and by decrementing the count of the histogram bin the oldest periodic parameter belongs to. The mode tracker outputs the histogram bin with the largest count when the count is greater than a histogram threshold defined as $Th_{hist}=C\times\text{total\_count}$, where $0<C<1$ (e.g., C equals 0.2, 0.3, 0.4, or 0.5) and total_count is the total count of periodic parameters recorded in the histogram. For each histogram bin, the count of periodic parameters in the histogram bin, denoted by Count(bin), is compared with the histogram threshold. When the following condition is satisfied $$\text{Count(bin)} > Th_{hist} \quad (26)$$

the latest periodic parameter with a count added to the bin with Count(bin) that satisfies Equation (26) is used to forecast periodic metric data. On the other hand, if none of the counts of the histogram bins are greater than the histogram threshold, then forecasting of the metric data is not carried out with any of the periodic parameters of the histogram bins and the metric data in the historical window does not have a periodic pattern.

Figure 30A:
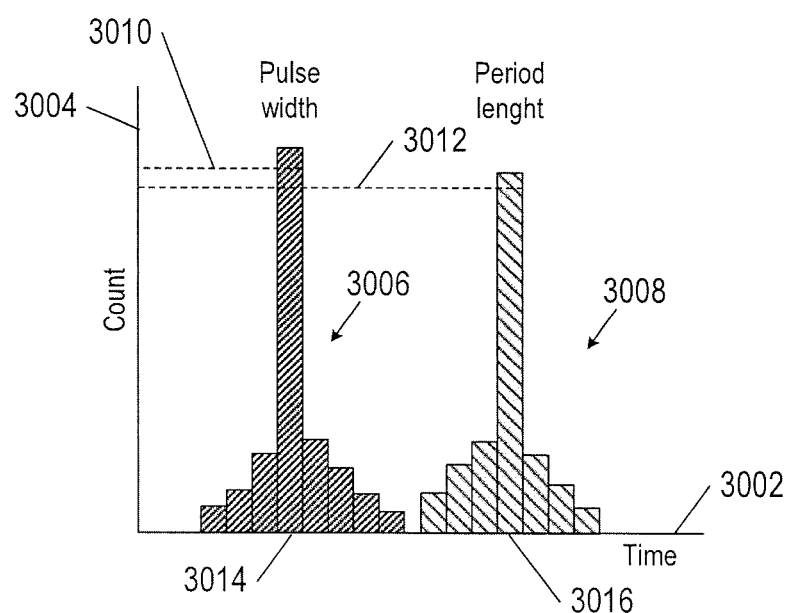
FIG. 30A shows a plot of example periodic parameters for a pulse wave model.

FIG. 30A shows a plot of an example histogram of periodic parameters for the pulse wave model. Horizontal axis 3002 represents a time bin axis. Vertical axis 3004 represents counts. In FIG. 30A, histogram 3006 represents a back-sliding histogram of pulse widths and histogram 3008 represents a back-sliding histogram of periods for pulse-wave metric data for seasonal model. Dashed line 3010 represents a histogram threshold for pulse widths. Dashed line 3012 represents a histogram of threshold for periods. In the example of FIG. 30A, the count of pulse widths in histogram bin 3014 is greater than the histogram threshold 3010 and the count of periods in histogram bin 3016 is greater than the histogram threshold 3012. In this case, the most recent pulse width and period counted in corresponding historical bins 3014 and 3016 are pulse wave period parameters used to forecast pulse wave metric data.

The principle frequency computed for each short-time interval as described above with reference to FIGS. 28-29 is recorded in a principle frequency back-sliding circular buffer that maintains a fixed number of the most recently generated principle frequencies. A count for each principle frequency, denoted by Count($f_i$), where $f_i$ is the i-th principle frequency (i.e., $f_i=k_i/N$), is maintained. When a new principle frequency is computed for a most recent short-time interval and added to the principle frequency circular buffer, the oldest principle frequency stored in the buffer is deleted. The count of the new principle frequency is incremented and the count of the oldest principle frequency removed from the buffer is decremented. The counts of the principle frequencies are rank ordered from largest to smallest. The principle frequency with the largest count that satisfies the following condition is the dominant principle frequency and the corresponding principle period is used to forecast seasonal data:

$$\text{Count}_1(f_i) > N_f \times \text{Count}_2(f_j) \quad (27)$$

where $\text{Count}_1(f_i)$ is the largest count;

Count$_2$(f$_j$) is the second largest count; and

N$_f$ is threshold count factor (e.g., N$_f$ equals 2, 3, or 4).

The quantity N$_f$×Count$_2$(f$_j$) is called a dominant principle frequency threshold. If the condition given by Equation (27) is not satisfied, then there is no seasonal pattern in the metric data.

Figure 30B:
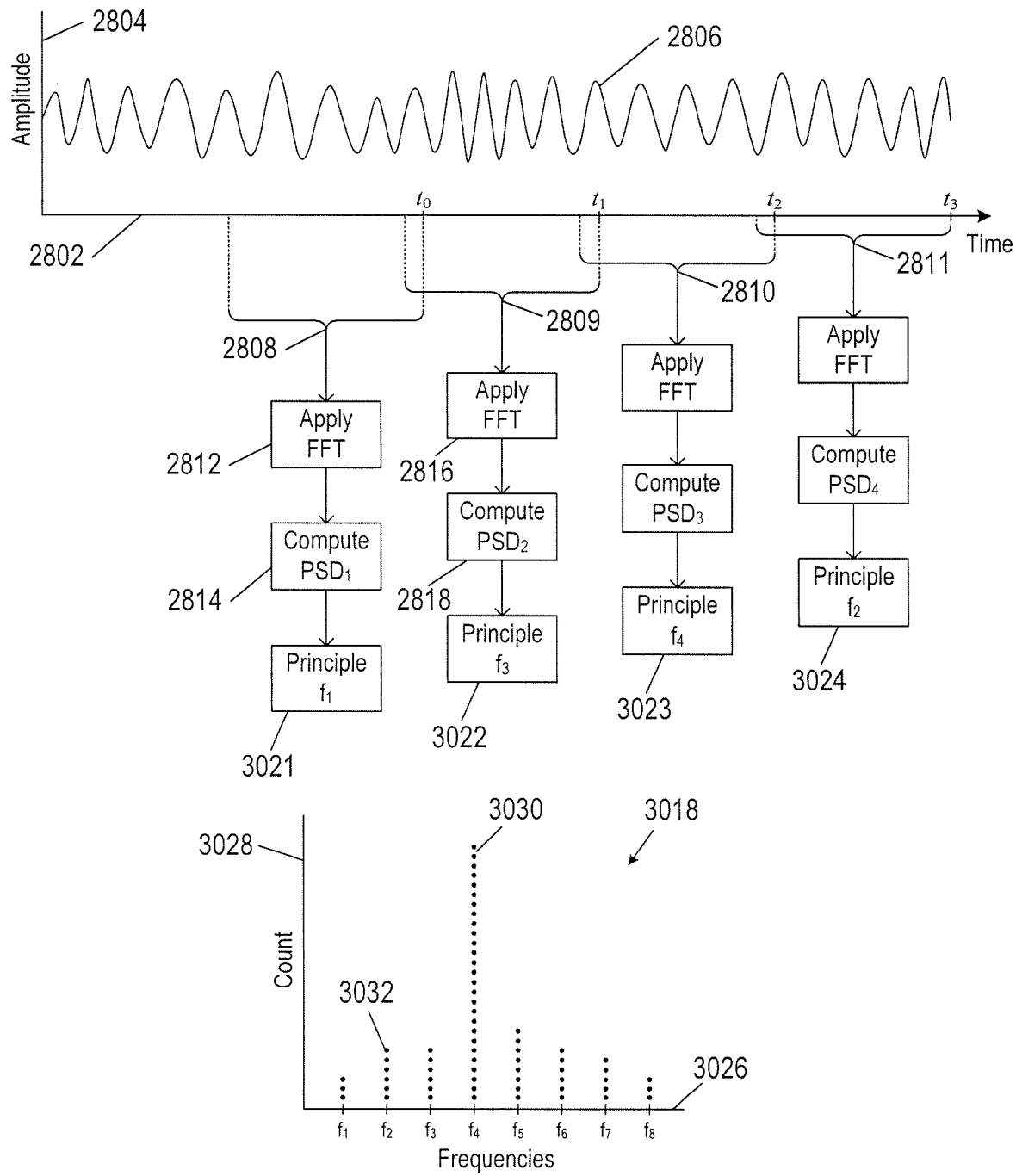
FIG. 30B shows principle frequencies and an example histogram of principle frequencies.

FIG. 30B shows principle frequencies and an example histogram 3018 of principle frequencies. Blocks 3021-3024 represent principles frequencies computed for each of the short-time windows 2808-2811 as described above with reference to FIGS. 28-29. Horizontal axis 3026 represents frequencies. Vertical axis 3028 represent counts. Each dot represents one count for a principle frequency. For example, dot 3030 represents principle frequency f$_4$ generated for the short-time window 2810. Dot 3032 represents the most recently computed principle frequency f$_2$ generated for the short-time window 2811. Clearly principle frequency f$_4$ occurs with the largest count of Count$_1$(f$_4$)=28 and principle frequency f$_5$ occurs with the second largest count of Count$_1$(f$_5$)=8. For a threshold principle frequency factor N$_f$=3, the count Count$_1$(f$_4$) satisfies the condition given by Equation (27) and the principle frequency f$_4$ (i.e., principle period p$_4$=1/f$_4$) is considered the dominant frequency and is used for forecasting as described below.

In another implementation, the i-th principle frequency f$_i$ is identified as the dominant principle frequency and is used for seasonal forecasting when the following condition is satisfied $$PSD(f_i) > N_p \times \sum_j PSD(f_j) \quad (28)$$

where

PSD(f$_i$) is the power spectral density value for the principle frequency f$_i$;

PSD(f$_j$) is power spectral density value for the principle frequency f$_j$; and N$_p$ is threshold spectral density factor (e.g., N$_p$ equals a ½, ⅓, or ¼).

In other words, when the power spectral density of the principle frequency f$_i$ is greater that fraction of the total power spectral density of the principle frequencies, then the principle frequency f$_i$ is the dominant principle frequency and is used for forecasting as described below. If the condition given by Equation (28) is not satisfied for any of the principle frequencies stored in the principle frequency circular buffer, then there is no seasonal pattern in the metric data.

Returning to FIG. 18, junction 1812 represents combining appropriate models for forecasting metric data over a forecast interval executed in block 1813. Let $\hat{z}_{n+l}$ represent forecasted metric data values for lead times t$_{n+l}$ in a forecast interval with l=1, . . . , L. The following three conditions are considered in combing appropriate models in junction 1812 for computing a forecast over a forecast interval in block 1813:

(1) Metric data in the historical window may not have a pulse wave pattern or a seasonal period. In this case, metric data are forecasted in block 1813 by combining the trend estimate given in Equation (2a) and the stochastic process model with the smallest accumulated residual error as follows:

$$\hat{z}_{n+l} = T_{n+l} + \hat{z}_{n+l}^{(m)} \quad (29)$$

Figure 31A:
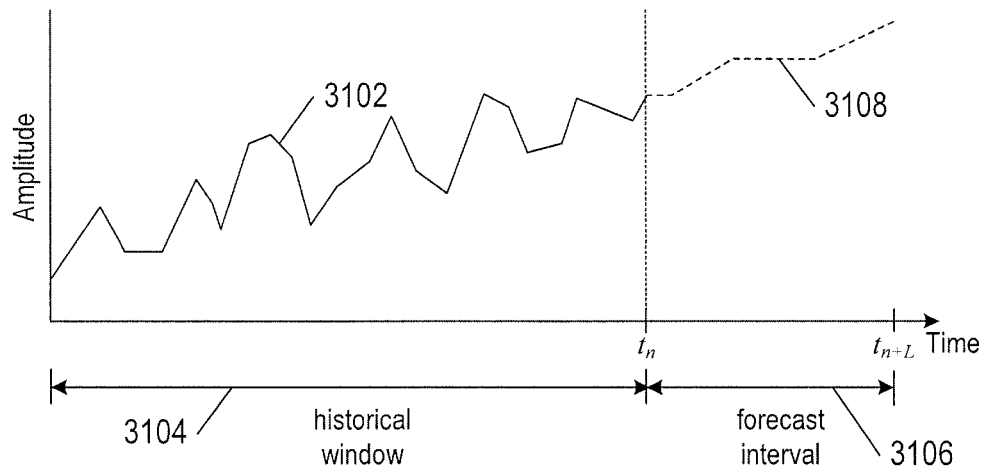
FIG. 31A shows a plot of example trendy, non-periodic metric data and forecasted metric data over a forecast interval.

FIG. 31A shows a plot of example trendy, non-periodic metric data and forecasted metric data over a forecast interval. Jagged curve 3102 represents a non-seasonal sequence of metric data with an increasing trend over historical window 3104. At time stamp t$_n$, a forecast is requested for a forecast interval 3106. The parameters of the trend estimate and the stochastic process models are computed from the sequence of metric data in the historical window 3106 as described above. Jagged dashed-line curve 3108 represents forecasted metric data computed using Equation (29) at lead times in the forecast interval 3106.

(2) Metric data in the historical window may be pulse wave metric data. In this case, metric data are forecasted in block 1813 by combining the trend estimate given in Equation (2a) with the stochastic process model AR(0), ARMA(0,0), or ARIMA(0,0) and the latest pulse width and period given by back-sliding histogram as described above with reference to FIG. 30A as follows:

$$\hat{z}_{n+l} = T_{n+l} + a_{n+l} + S(A, pw, p) \quad (30)$$

where $$S(A, pw, p) = \begin{cases} A & t_s + mp \le t_{n+l} \le t_s + m(p + pw) \\ 0 & t_{n+l} < t_s + mp \text{ and } t_s + m(p + pw) < t_{n+l} \end{cases}$$

$$m = 1, 2, \ldots \text{ for } t_s + mp \le t_{n+L}.$$

Figure 31B:
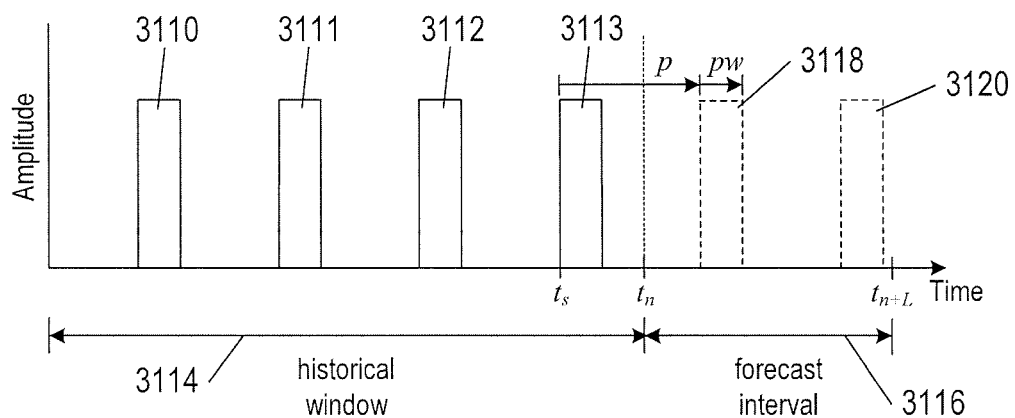
FIG. 31B shows a plot of example trendy, pulse-wave metric data and forecasted metric data over a forecast interval.

FIG. 31B shows a plot of example trendy, pulse-wave metric data and forecasted metric data over a forecast interval. Pulses 3110-3113 represent sequence of pulse wave metric data over historical window 3114. At time stamp t$_n$, a forecast is requested for a forecast interval 3116. Upward edges of forecasted pulses in the forecast interval 3114 are given by (t$_s$+mp, A+T$_{n+l}$+a$_{n+l}$) and downward edges of forecasted pulses in the forecast model are given by (t$_s$+m(p+pw), A+T$_{n+l}$+a$_{n+l}$). Dashed-line pulses 3118 and 3120 represent two forecasted pulses of metric data computed using Equation (30) over the forecast interval 3116.

(3) Metric data in the historical window may not have a pulse wave pattern but may have a seasonal period. In this case, metric data are forecasted in block 1813 by combining the trend estimate given in Equation (2a) with the stochastic process model AR(0), ARMA(0,0), or ARIMA(0,0) and the seasonal period model with the latest principle period P given by the back-sliding histogram as described above with reference to FIG. 30B as follows:

$$\hat{z}_{n+l} = T_{n+l} + a_{n+l} + S_{(n+l) \bmod P} \quad (31)$$

where

P is the principle period (i.e., P=N/k*); and

S$_{(n+l) \bmod P}$=$\hat{z}_{(n-P+l) \bmod P}$.

Figure 31C:
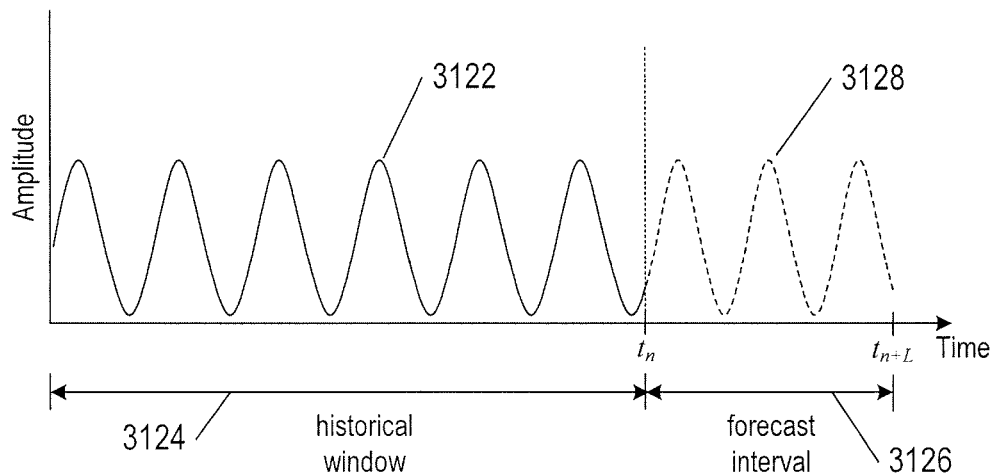
FIG. 31C shows a plot of example trendy, periodic metric data and forecasted metric data over a forecast interval.

FIG. 31C shows a plot of example trendy, seasonal metric data and forecasted metric data over a forecast interval. Sinusoidal curve 3122 represents seasonal metric data over the historical window 3124. At time stamp t$_n$, a forecast is requested for a forecast interval 3126. The parameters of the trend estimate and the seasonal periodic model are computed from the sequence of metric data in the historical window 3124 as described above. Dashed curve 3128 represents forecasted metric data computed using Equation (31) over the forecast interval 3126.

Returning to FIG. 15, analytics features, such as workload placement 1514, capacity planning 1516, and other applications 1518, proactively request forecasts over forecast intervals from a metric processor of the forecast engine 1504. The analytics features utilize the forecasted metric data to proactively optimize resource utilization and avoid potential problems. For example, when forecasted metric data approaches or is expected to exceed a resource threshold limit in the forecast interval, the analytics features may move or schedule virtual objects to proactively avoid slowdowns created by overused resources and thereby optimizing resource utilization.

FIGS. 32A-32C show an example of planning optimal resource usage of a cluster of server computers. The resource may be CPU usage, memory usage, network throughput, or another resource of a server computer. FIG. 32A shows a plot of resource demand by a VM over a historical window and forecast interval. Historical and forecasted demand for the resource are represented by bars. Each bar represents demand for the resource in a time bin. For example, bar 3202 represents current demand for the resource by the VM. Forecasted demand in each time bin of the forecast interval 3204 is computed as described above. Dashed line 3206 represents effective demand for the resource by the VM. In other words, the largest forecast demand represented by bar 3208 corresponds to the intended demand for the resource in the future.

FIG. 32B shows a plot of collective demand for the resource by a clusters of server computers. Each bar represents cluster demand for the same resource by the cluster of server computers in a time bin. Each bar represents demand for the resource in a time bin. For example, bar 3210 represents current demand for the resource by the cluster of server computers. Forecasted demand in each time bin of the forecast interval 3212 is computed as described above. Dashed line 3214 represents effective demand for the resource by the cluster of server computers. In other words, the largest forecast demand represented by bar 3216 corresponds to the intended demand for the resource in the future.

FIG. 32C show the result of adding the historical and forecasted demand for the resource by the VM to the historical and forecasted demand for the resource by the cluster of server computers. If the VM was added to the cluster of server computers, the current demand for the resource would be represented by bar 3218. The forecasted combined effective demand would be increased as represented by dashed line 3220. The forecasted combined effected demand over the forecast interval can be used to redistribute resources in the cluster to accommodate the VM. Alternatively, the forecasted combined effected demand over the forecast interval may be compared with the capacity of the resource. If the forecasted combined effective demand is greater than the capacity of the resource for the cluster, the workload placement 1514 may deny migration or starting of the VM in the cluster of server computers. Alternatively, if the forecasted combined effective demand is less than the capacity of the resource for the cluster, the workload placement 1514 may generate a recommendation to migrate or start the VM in the cluster of server computers, or the workload placement 1514 may proactively migrate the VM in the cluster of the server computers.

Forecasted metric data provides three advantages over reactive analytics that identify problems in metric data: First, forecasting metric data allows workload placement 1514 to predict stress levels of a cluster, server computer, network, or any resource in the future and proactively rebalance workloads to avoid reaching a threshold for utilization of the resource. Second, forecasting metric data enables workload placement 1514 to make more precise changes in use of resources to reduce stress on resources and avoid moving applications, VMs, and containers from server computer to server computer, thereby efficiently utilizing server computer and cluster resources. Third, forecasting metric data allows workload placement 1514 to place applications, VMs, and containers in the same cluster of server computers provided the forecast peaks occur at different times and the superimposed effective demand for cluster resources do not cross corresponding resource thresholds.

The methods described below with reference to FIGS. 33-40 are stored in one or more data-storage devices as machine-readable instructions that when executed by one or more processors of the computer system shown in FIG. 1 to manage resource utilization in a distributed computing system.

Figure 33:
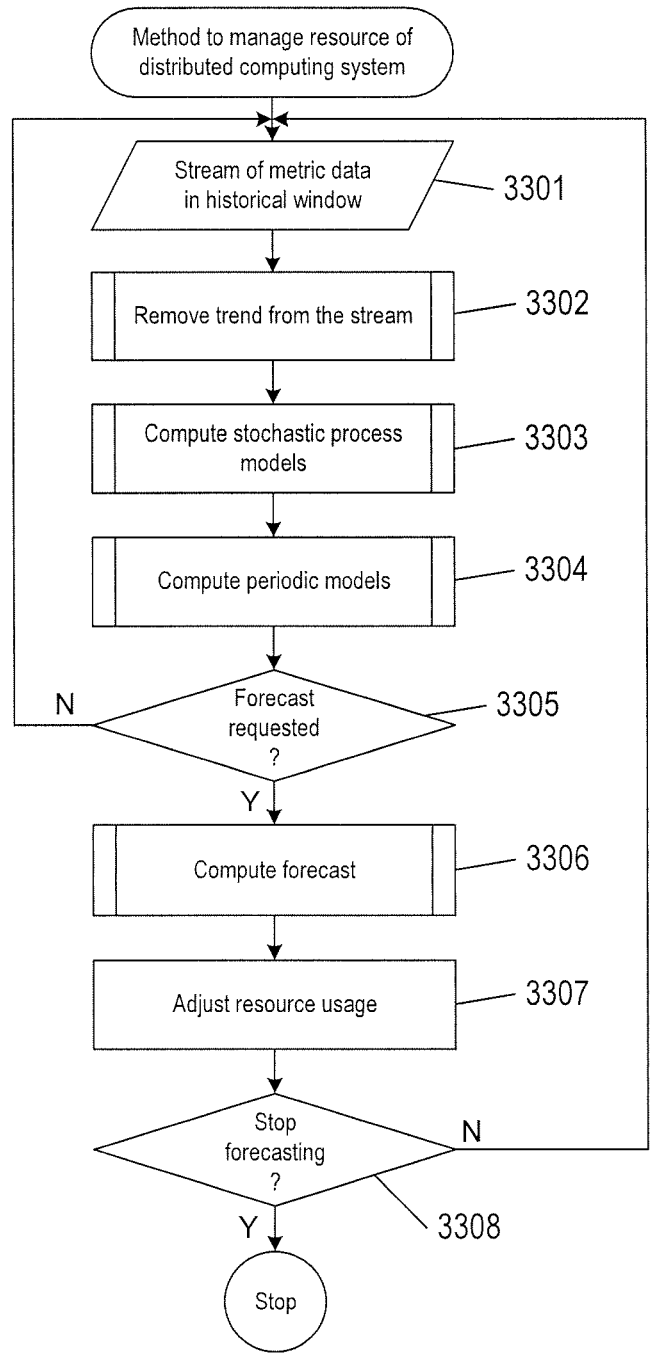
FIG. 33 shows a control-flow diagram of a method to manage a resource of a distributed computing system.

FIG. 33 shows a control-flow diagram of a method to manage a resource of a distributed computing system. In block 3301, a stream of metric data is received at a metric processor as described above with reference to FIG. 17. In block 3302, a routine "remove trend from the stream" is called. In block 3303, a routine "compute stochastic process models" is called. In block 3304, a routine "compute periodic models" is called. In decision block 3305, when a forecast requested is received, control flows to block 3306. Otherwise, control flows to block 3301. In block 3306, a routine "compute forecast" is called. In block 3307, utilization of resources may be adjusted to accommodate the forecast. For example, virtual objects may be migrated or started on a computer based on the forecast, as described above with reference to FIG. 39. In decision block 3308, when a user selects stop forecast, the analytics services manager stops sending the stream of metric data to the metric processor.

Figure 34:
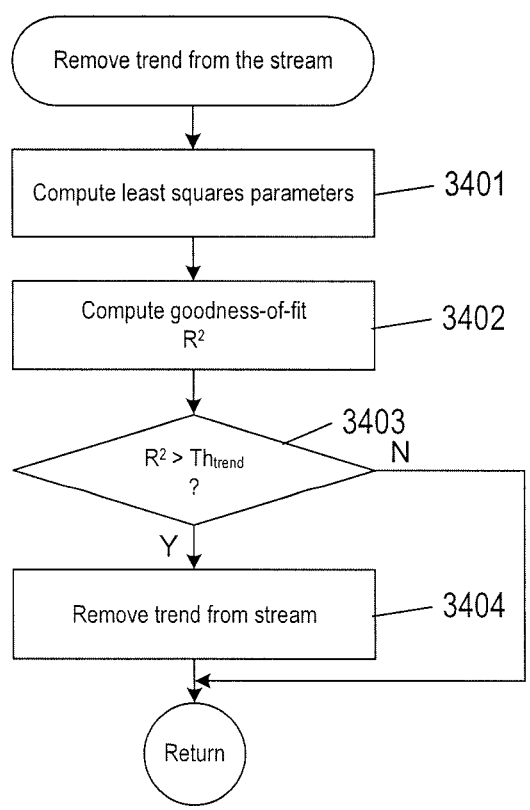
FIG. 34 shows a control-flow diagram of a routine "remove trend from the stream" called in FIG. 33.

FIG. 34 shows a control-flow diagram of the routine "remove trend from the stream" called in block 3302 of FIG. 33. In block 3401, least squares parameters for the sequence of metric data in the historical window, as described above with reference to Equations (2c) and (2d). In block 3402, a goodness-of-fit parameter is computed as described above with reference to Equation (3). In decision block 3403, when the goodness-of-parameter is greater than a threshold, control flows to block 3404. In block 3404, a trend computed using the least squares parameters is subtracted from the metric data in the historical window, as described above with reference to Equations (2a), (4) and FIGS. 19B and 19C.

Figure 35:
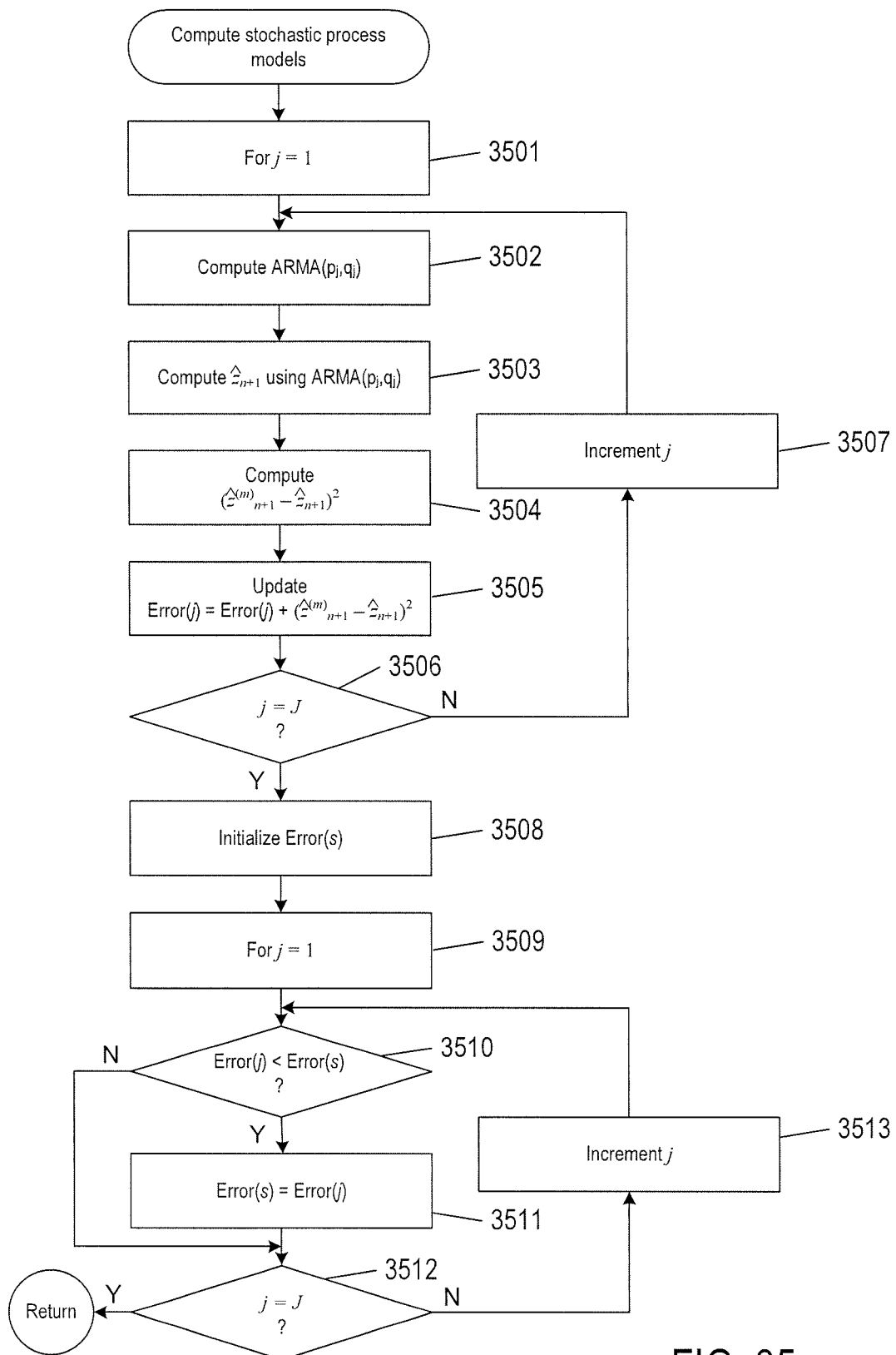
FIG. 35 shows a control-flow diagram of a routine "compute stochastic process models" called in FIG. 33.

FIG. 35 shows a control-flow diagram of the routine "compute stochastic process models" called in block 3303 of FIG. 33. A loop beginning with block 3501 repeats the computational operations represented by blocks 3502-3507 for each J different stochastic models, where J is the number of different stochastic models. In block 3502, weight parameters of a stochastic process model are computed based on previous values of the non-trendy metric data in the historical window, as described above with reference to FIG. 20. In block 3503, when a new non-trendy (e.g., detrended) metric data values is received, estimated metric data values are computed using each of the stochastic process models as described above with reference to Equation (9) and FIG. 21. In block 3504, a residual error is computed for each of the stochastic process models as described above with reference to Equation (10). In block 3505, an accumulated residual error is computed for the stochastic model as described above with reference to Equation (10). In decision block 3506, when weight parameters and accumulated residual errors have been computed for each of stochastic process models, control flow to block 3508. Otherwise, the parameter j is incremented in block 3507. In block 3508, a minimum residual error is initialized (e.g., Error(s)=100). A loop beginning with block 3509 repeats the computational operations of blocks 3510-3512 for each stochastic process model to identify the stochastic process model with the smallest accumulated residual error. In decision block 3510, when the accumulated residual error of the j-th stochastic process model is less the minimum residual error, control flow to block 3511. Otherwise, control flows to decision block 3512. In block 3511, the minimum residual error is set equal to the accumulated residual error. In decision block 3512, when accumulated residual errors for all J of the stochastic residual models have been considered control returns to FIG. 33. In block 3513, the parameter j is incremented.

Figure 36:
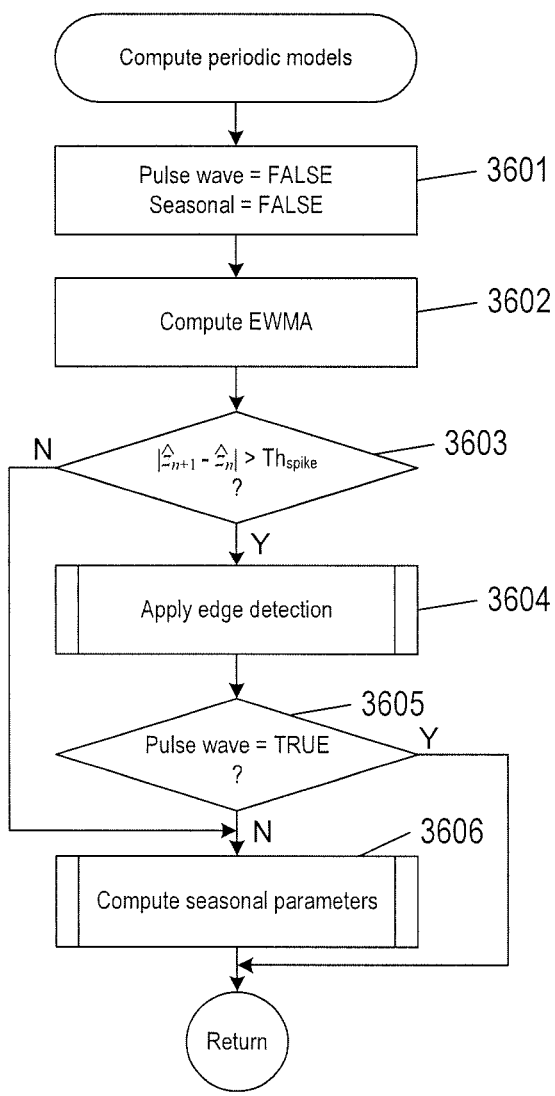
FIG. 36 shows a control-flow diagram of a routine "compute periodic models" called in FIG. 33.

FIG. 36 shows a control-flow diagram of the routine "compute periodic models" called in block 3304 of FIG. 33. In block 3601, logical parameters "Pulse wave" and "Seasonal" are set to FALSE. In block 3602, the EWMA is computed as described above with reference to Equation (14a). In decision block 3603, when the absolute difference $\Delta_{n+1}$ satisfies the condition given by Equation (14b), control flows to block 3604. Otherwise, control flows to block 3606. In block 3604, a routine "apply edge detection" is called. If pulse edges are determined in block 3604, "Pulse wave" is set to TRUE as described below with reference to FIG. 37. In decision block 3605, if "Pulse wave" is set to TRUE, control flows to block 3604. Otherwise, control flows to block 3606. In block 3606, a routine "compute seasonal parameters" is called. If a seasonal parameter is determined in block 3608, "Seasonal" is set to TRUE as described below with reference to FIG. 38.

Figure 37:
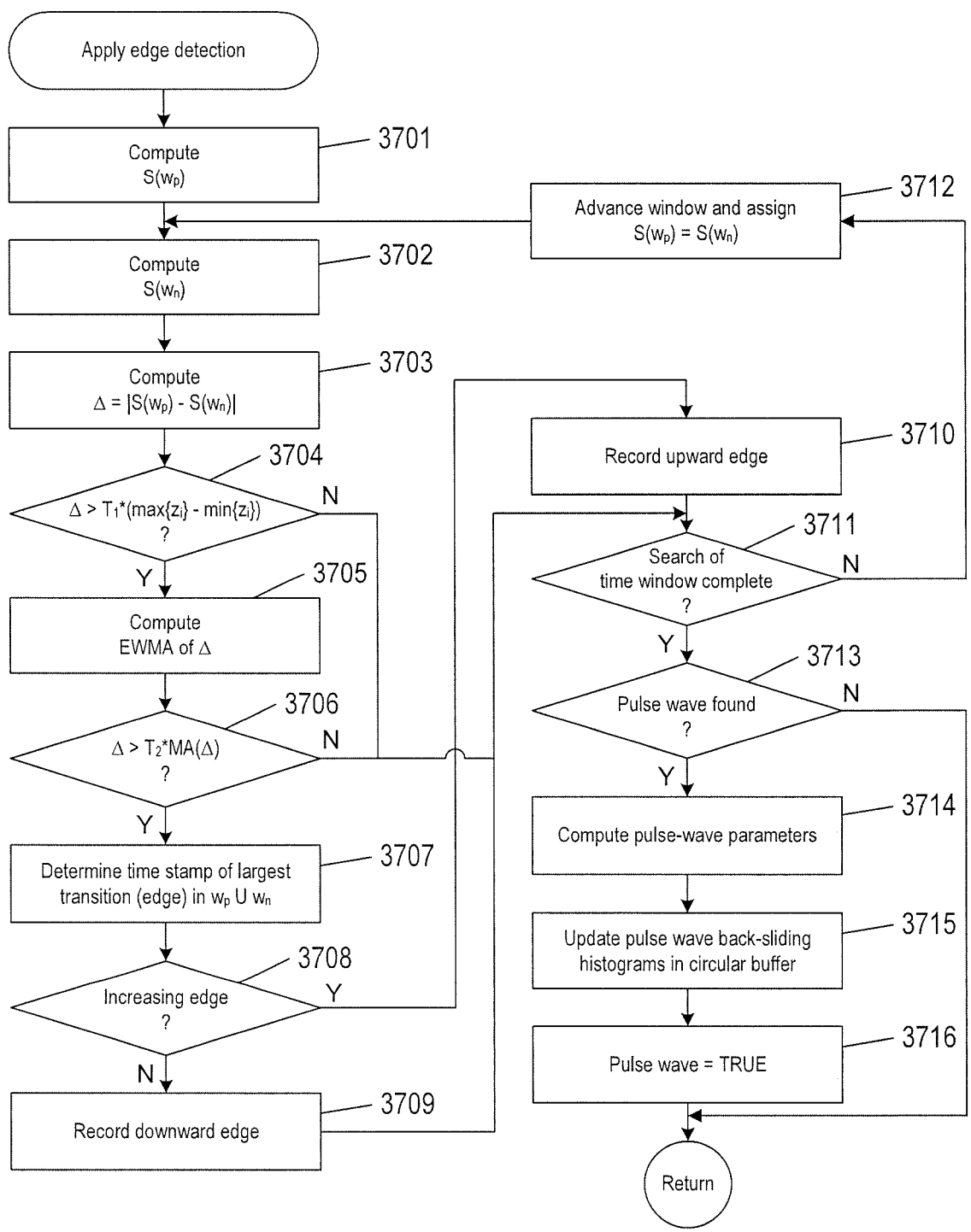
FIG. 37 shows a control-flow diagram of a routine "apply edge detection" called in FIG. 36.

FIG. 37 shows a control-flow diagram of the routine "apply edge detection" called in block 3601 of FIG. 36. In block 3701, an average of metric data values in a previous time window is computed as described above with reference to Equation (15a). In block 3702, an average of metric data values in a previous time window is computed as described above with reference to Equation (15b). In block 3703, a change parameter is computed based on an absolute difference between the averages of metric data values as described above with reference to Equation 16. In decision block 3704, when the change parameter is greater than a maximum amplitude range threshold computed as described above with reference to Equation (17a), control flows to block 3705. Otherwise, control flows to decision block 3711. In block 3705, an EWMA of change parameters is computed with the change parameter computed in block 3703 as the most recent change parameter. In decision block 3706, when the change parameter is greater than an EWMA threshold as described above with reference to Equation (17b), control flows to block 3707. Otherwise, control flows to decision block 3711. In block 3707, a largest absolute difference between consecutive pairs of metric data values is determined for metric data values in a time interval formed from the previous and next time windows as described above with reference to Equation (18). In block 3708, when the metric data values of the largest absolute difference between consecutive metric data values is increasing (i.e., $z_{i+1} - z_i > 0$), the edge is an upward edge and control flows to block 3710. Otherwise, the largest absolute difference between consecutive metric data values is decreasing (i.e., $z_{i+1} - z_i < 0$), control flows to block 3709. In block 3709, a downward edge is recorded for time $t_i$. In block 3710, an upward edge is recorded for time $t_{i+1}$. In decision block 3711, when the duration of the time window of the historical window is complete control flows to decision block 3712. Otherwise, control flows to block 3713. In block 3712, the previous and next time windows are advanced as described above with reference to FIG. 25A and the average of metric data values in the next time window assigned to the average of metric data values of the previous time window. In decision block 3713, when upward and/or downward edges have been identified as described above with reference to blocks 3708-3710, control flows to block 3714. Otherwise, control flows back to the routine "compute periodic models" in FIG. 36. In block 3714, pulse width and period of a pulse wave are computed as described above with reference to FIG. 26. In block 3715, pulse wave back-sliding histograms of pulse width and period are updated as described above with reference to FIG. 30A. In block 3716, "Pulse wave" is set to TRUE.

Figure 38:
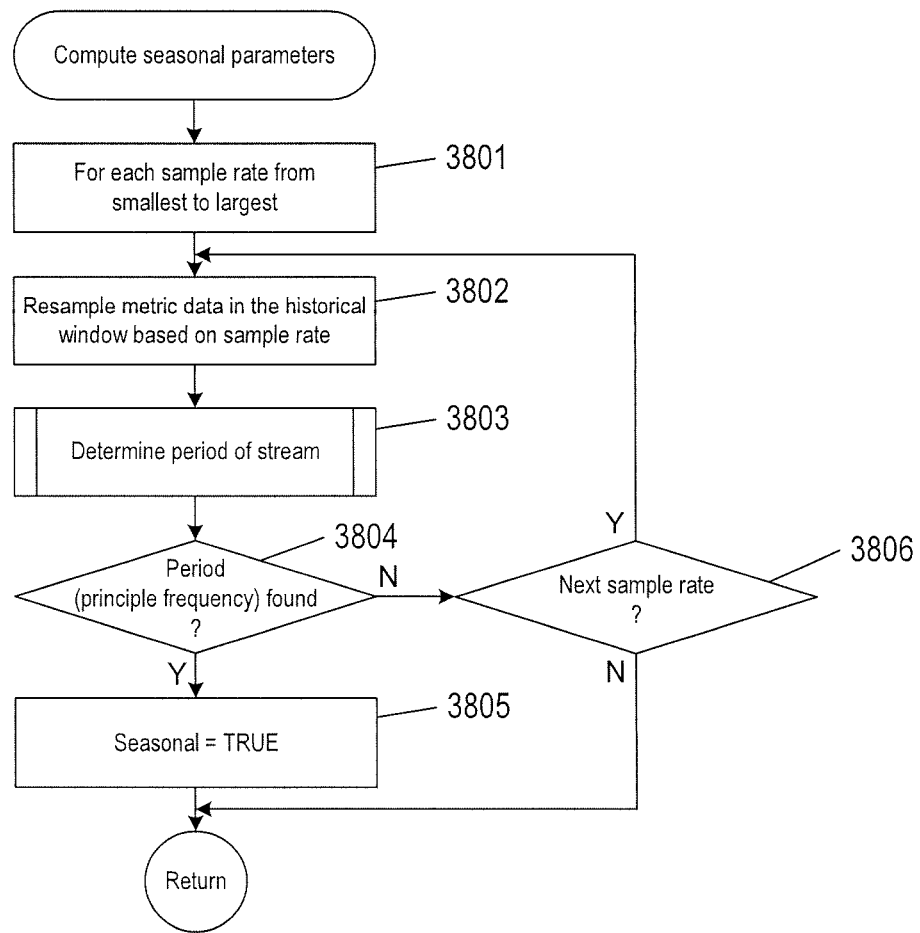
FIG. 38 shows a control-flow diagram of a routine "compute seasonal period parameters" called in FIG. 36.

FIG. 38 shows a control-flow diagram of the routine "compute seasonal parameters" called in block 3604 of FIG. 36. A loop beginning with block 3801 repeats the computational operations represented by blocks 3802-3808 for smallest to largest sampling rate, as described above with reference to FIG. 27. In block 3802, metric data in the historical window is resampled according to the sample rate as described above with reference to FIG. 27. In block 3803, a routine "determine period of stream" is called. In decision block 3804, when a period for the metric data has been determined in block 3803, control flows to block 3805. In block 3805, "Seasonal" is set to TRUE. In decision block 3806, the computational operations represented by blocks 3802-3804 are repeated for another sample rate.

Figure 39:
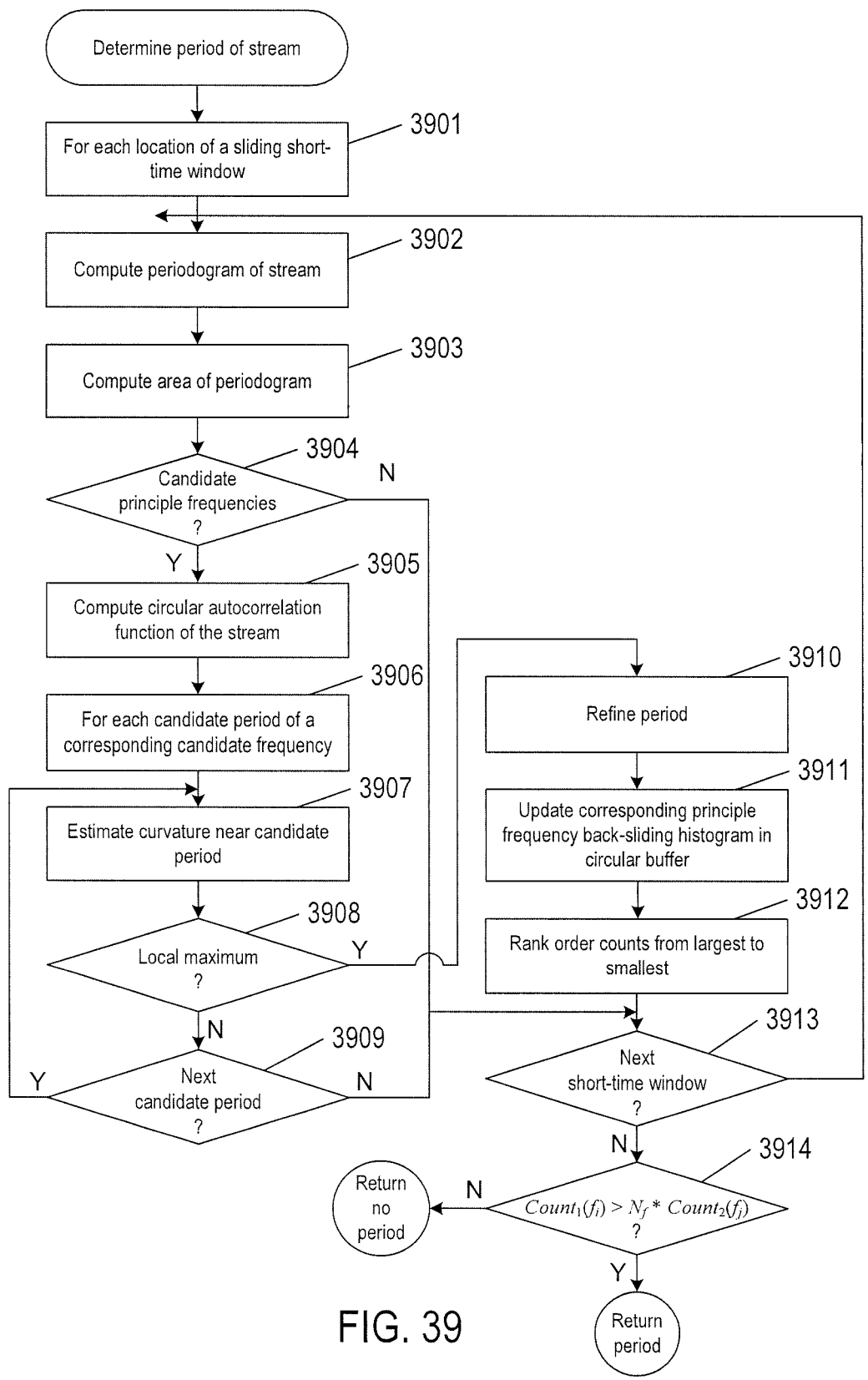
FIG. 39 shows control-flow diagram of a routine "compute period of stream" called in FIG. 38.

FIG. 39 shows a control-flow diagram of the routine "determine period of stream" called in block 3802 of FIG. 38. A loop beginning with block 3901 repeats the computational operations represented by blocks 3902-3913 for each short-time window as described above with reference to FIG. 28. In block 3902, a periodogram is computed for a short-time window of the historical window as described above with reference to Equations (19)-(20) and FIG. 28. In block 3903, the area of the periodogram is computed as described above with reference to Equation (21). In decision block 3904, if no frequencies of the periodogram satisfy the condition of Equation (22), then no candidate principle frequencies exist in the periodogram and the routine does not return a seasonal period for the short-time window. Otherwise, control flows to block 3913. In block 3905, a circular autocorrelation function is computed in neighborhoods of candidate periods that correspond to the candidate principle frequencies, as described above with reference to Equation (23) and FIG. 29B. A loop beginning with block 3906 repeats the computational operations of blocks 3907-3909 for each candidate period. In block 3907, curvature near a candidate period is estimated as described above with reference to Equation (25). In decision block 3908, when the curvature corresponds to a local maximum, control flows to block 3909. In block 3909, the period is refined to the period that corresponds to the maximum ACF value in the neighborhood and the period is returned as the principle period, as described above with reference to FIG. 29C. In decision block 3910, operations represented by blocks 3907-3909 are repeated for another candidate period. Otherwise, no principle period (i.e., principle frequency) is returned. In block 3911, a principle frequency back-sliding histogram stored in a circular buffer is updated as described above with reference to FIG. 30B. In block 3912, the frequency counts of the frequencies in the principle frequency back-sliding histogram are rank ordered from largest to smallest. In decision block 3913, when the short-time windows resampled historical window have been considered, control flows to decision block 3914. Otherwise, the computational operations represented by blocks 3902-3913 are repeated for another location of the short-time window in the historical window of resampled metric data. In decision block 3914, when the condition described above with reference to Equation (27) is satisfied, the principle period that corresponds to dominant principle frequency is returned.

Figure 40:
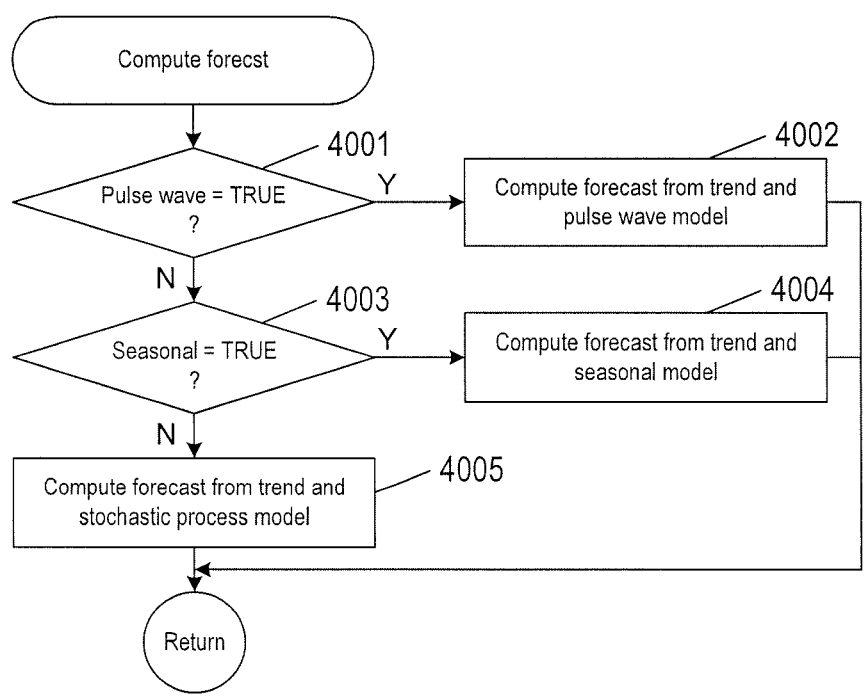
FIG. 40 shows a control-flow diagram a routine "compute forecast" called in FIG. 33.

FIG. 40 shows a control-flow diagram the routine "compute forecast" called in block 3306 of FIG. 33. In decision block 4001, when "Pulse wave" equals TRUE, control flows to block 4002. In block 4002, a forecast is computed over a forecast interval as described above with reference to Equation (30). In decision block 4003, when "Seasonal" equals TRUE, control flows to block 4004. In block 4004, a forecast is computed over the forecast interval as described above with reference to Equation (31). In block 4005, a forecast is computed over the forecast interval as described above with reference to Equation (29).

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process stored in one or more data-storage devices and executed using one or more processors of a computer system to proactively manage resources in a distributed computing system, the process comprising:
   detrending a sequence of metric data to obtain a sequence of non-trendy metric data, the sequence of metric data representing latest usage of a resource in the distributed computing system;
   computing stochastic process models of the sequence of non-trendy metric data and corresponding accumulated residual errors;
   computing a pulse wave model based on changes in averages of metric data in two sliding adjacent time windows of the sequence of non-trendy metric data;
   computing two or more seasonal models for the sequence of non-trendy metric data for two or more sample rates applied to the sequence of non-trendy metric data;
   when a forecast request is received,
      computing a sequence of forecasted metric data over a forecast interval based on the pulse wave model when the sequence of non-trendy metric data is a pulse wave,
      computing the sequence of forecasted metric data over the forecast interval based on the seasonal model when the sequence of non-trendy metric data is seasonal, or
      when the sequence of non-trendy metric data is not a pulse wave and not seasonal, computing the sequence of forecasted metric data over the forecast interval based on a stochastic process model of the stochastic process models with a smallest of the corresponding accumulated residual errors; and
   adjusting usage of the resource by virtual objects of the distributed computing system based on the sequence of forecasted metric data.

2. The process of claim 1 wherein detrending the sequence of metric data to obtain the sequence of non-trendy metric data comprises:
   applying linear regression to the sequence of metric data to generate least squares parameters;
   computing a trend estimate for each time stamp of the sequence of metric data based on the least squares parameters;
   computing a goodness-of-fit parameter based the sequence of metric data and a trend estimate at each time stamp of the sequence of metric data; and
   when the goodness-of-fit parameter is greater than a user-defined trend threshold; subtracting the trend estimate from corresponding metric data values in the sequence of metric data to generate the sequence of non-trendy metric data.

3. The process of claim 1 wherein computing the stochastic process models comprises:
   fitting weight parameters of each of the stochastic process models to a different number of most recent subsequence of metric data in the sequence of non-trendy metric data;
   when a new metric data value is received, detrending new metric data value to obtain a non-trendy metric data value and computing estimated non-trendy metric data values from the stochastic process models;
   for each of the stochastic process models, computing a residual error between the estimated non-trendy metric data value and the new non-trendy metric data value; and
   for each of the stochastic process models, summing the residual errors to generate the corresponding accumulated residual error.

4. The process of claim 1 wherein computing the pulse wave model comprises:
   computing an exponentially weighted moving average of absolute differences between consecutive pairs of the sequence of non-trendy metric data;
   computing an absolute difference between a new non-trendy metric data value and a most recent metric data value in the sequence of non-trendy metric data;
   when the absolute difference between the new non-trendy metric data value and the most recent metric data value is greater than a spike threshold, applying edge detection to determine if the sequence of non-trendy metric data is a pulse wave based on the two sliding adjacent windows; and
   if the sequence of non-trendy metric data is a pulse wave, determining the pulse width and a period of the sequence of non-trendy metric data.

5. The process of claim 4 wherein applying edge detection to determine if the sequence of non-trendy metric data is a pulse wave comprises:
   applying a smoothing filter to the sequence of non-trendy metric data;
   for each location of the previous and next sliding windows,
      computing an average of metric data values in the previous time window,
      computing an average of metric data values in the next time window,
      computing a change parameter as an absolute difference between the average of metric data values in the previous time window and the average of metric data values in the previous time window,
      when the change parameter is greater than a maximum amplitude range of metric data values threshold and is greater than a change parameter exponentially weighted moving average threshold, determining a time stamp of a pulse edge in a time interval of the previous and next sliding windows, and
      identifying pulse edge as upward or downward;

determining each pulse width as a difference between different pairs of consecutive upward and downward edges;

determining each period as a difference between different pairs of consecutive upward edges;

recording counts of the pulse widths and periods in bins of corresponding back-sliding pulse width and period histograms; and identifying the most recent pulse width and most recent period with counts in corresponding bins of the pulse width and period histograms that are greater than corresponding histogram thresholds.

6. The process of claim 1 wherein computing the two or more seasonal model for the sequence of non-trendy metric data comprises:

for each of the two or more sampling rates applied to the sequence of non-trendy metric data, resampling the sequence of non-trendy metric data at a sampling rate to obtain a subsequence of the non-trendy metric data, computing a periodogram of the subsequence, identifying each frequency of the periodogram that is greater than a principle frequency threshold as a candidate principle frequency, computing autocorrelation function values in a neighborhood of a candidate period, the candidate period corresponding to a largest of the principle candidate frequencies, estimating curvature of the autocorrelation function in the neighborhood of the candidate period, when the estimated curvature of the autocorrelation function is concave down, determining a principle period that corresponds to a maximum of the autocorrelation function value in the neighborhood, otherwise, identifying subsequence as not having a principle period, and recording counts of principle frequencies in a back-sliding principle frequency histogram, rank ordering counts of principle frequencies; and when a largest count is greater than a dominant principle frequency threshold computed as a function of the second largest count, the principle period of the principle frequency with the largest count is used as the seasonal period of the sequence of non-trendy metric data.

7. The process of claim 1 wherein adjusting usage of the resource by virtual objects comprises one or more of adjusting use of the resource by the virtual objects when the sequence of forecasted metric data approaches a resource threshold limit over the forecast interval;

increasing resource allocation to the virtual objects when the sequence of forecasted metric data approaches a resource threshold limit over the forecast interval; and migrating virtual objects to a different server computer within the distributed computing system when the sequence of forecasted metric data approaches a resource threshold limit over the forecast interval.

8. A computer system to proactively manage resources in a distributed computing system, the system comprising:

one or more processors;

one or more data-storage devices; and machine-readable instructions stored in the one or more data-storage devices that when executed using the one or more processors controls the system to perform operations comprising:

detrending a sequence of metric data to obtain a sequence of non-trendy metric data, the sequence of metric data representing latest usage of a resource in the distributed computing system;

computing stochastic process models of the sequence of non-trendy metric data and corresponding accumulated residual errors;

computing a pulse wave model based on changes in averages of metric data in two sliding adjacent time windows of the sequence of non-trendy metric data;

computing two or more seasonal models for the sequence of non-trendy metric data for two or more sample rates applied to the sequence of non-trendy metric data;

when a forecast request is received, computing a sequence of forecasted metric data over a forecast interval based on the pulse wave model when the sequence of non-trendy metric data is a pulse wave, computing the sequence of forecasted metric data over the forecast interval based on the seasonal model when the sequence of non-trendy metric data is seasonal, or when the sequence of non-trendy metric data is not a pulse wave and not seasonal, computing the sequence of forecasted metric data over the forecast interval based on a stochastic process model of the stochastic process models with a smallest of the corresponding accumulated residual errors; and adjusting usage of the resource by virtual objects of the distributed computing system based on the sequence of forecasted metric data.

9. The system of claim 8 wherein detrending the sequence of metric data to obtain the sequence of non-trendy metric data comprises:

applying linear regression to the sequence of metric data to generate least squares parameters;

computing a trend estimate for each time stamp of the sequence of metric data based on the least squares parameters;

computing a goodness-of-fit parameter based the sequence of metric data and a trend estimate at each time stamp of the sequence of metric data; and when the goodness-of-fit parameter is greater than a user-defined trend threshold, subtracting the trend estimate from corresponding metric data values in the sequence of metric data to generate the sequence of non-trendy metric data.

10. The system of claim 8 wherein computing the stochastic process models comprises:

fitting weight parameters of each of the stochastic process models to a different number of most recent subsequence of metric data in the sequence of non-trendy metric data;

when a new metric data value is received, detrending new metric data value to obtain a non-trendy metric data value and computing estimated non-trendy metric data values from the stochastic process models;

for each of the stochastic process models, computing a residual error between the estimated non-trendy metric data value and the new non-trendy metric data value; and for each of the stochastic process models, summing the residual errors to generate the corresponding accumulated residual error.

11. The system of claim 8 wherein computing the pulse wave model comprises:

computing an exponentially weighted moving average of absolute differences between consecutive pairs of the sequence of non-trendy metric data;
computing an absolute difference between a new non-trendy metric data value and a most recent metric data value in the sequence of non-trendy metric data;
when the absolute difference between the new non-trendy metric data value and the most recent metric data value is greater than a spike threshold, applying edge detection to determine if the sequence of non-trendy metric data is a pulse wave based on the two sliding adjacent windows; and
if the sequence of non-trendy metric data is a pulse wave, determining the pulse width and a period of the sequence of non-trendy metric data.

12. The system of claim 11 wherein applying edge detection to determine if the sequence of non-trendy metric data is a pulse wave comprises:
applying a smoothing filter to the sequence of non-trendy metric data;
for each location of the previous and next sliding windows,
computing an average of metric data values in the previous time window,
computing an average of metric data values in the next time window,
computing a change parameter as an absolute difference between the average of metric data values in the previous time window and the average of metric data values in the previous time window,
when the change parameter is greater than a maximum amplitude range of metric data values threshold and is greater than a change parameter exponentially weighted moving average threshold, determining a time stamp of a pulse edge in a time interval of the previous and next sliding windows, and
identifying pulse edge as upward or downward;
determining each pulse width as a difference between different pairs of consecutive upward and downward edges;
determining each period as a difference between different pairs of consecutive upward edges;
recording counts of the pulse widths and periods in bins of corresponding back-sliding pulse width and period histograms; and
identifying the most recent pulse width and most recent period with counts in corresponding bins of the pulse width and period histograms that are greater than corresponding histogram thresholds.

13. The system of claim 8 wherein computing the two or more seasonal model for the sequence of non-trendy metric data comprises:
for each of the two or more sampling rates applied to the sequence of non-trendy metric data,
resampling the sequence of non-trendy metric data at a sampling rate to obtain a subsequence of the non-trendy metric data,
computing a periodogram of the subsequence,
identifying each frequency of the periodogram that is greater than a principle frequency threshold as a candidate principle frequency,
computing autocorrelation function values in a neighborhood of a candidate period, the candidate period corresponding to a largest of the principle candidate frequencies,
estimating curvature of the autocorrelation function in the neighborhood of the candidate period,
when the estimated curvature of the autocorrelation function is concave down, determining a principle period that corresponds to a maximum of the autocorrelation function value in the neighborhood, otherwise, identifying the subsequence as not having a principle period, and
recording counts of principle frequencies in a back-sliding principle frequency histogram,
rank ordering counts of principle frequencies; and
when a largest count is greater than a dominant principle frequency threshold computed as a function of the second largest count, the principle period of the principle frequency with the largest count is used as the seasonal period of the sequence of non-trendy metric data.

14. The process of claim 8 wherein adjusting usage of the resource by virtual objects comprises one or more of
adjusting use of the resource by the virtual objects when the sequence of forecasted metric data approaches a resource threshold limit over the forecast interval;
increasing resource allocation to the virtual objects when the sequence of forecasted metric data approaches a resource threshold limit over the forecast interval; and
migrating virtual objects to a different server computer within the distributed computing system when the sequence of forecasted metric data approaches a resource threshold limit over the forecast interval.

15. A non-transitory computer-readable medium encoded with machine-readable instructions that implement a method carried out by one or more processors of a computer system to perform operations comprising:
detrending a sequence of metric data to obtain a sequence of non-trendy metric data, the sequence of metric data representing latest usage of a resource in the distributed computing system;
computing stochastic process models of the sequence of non-trendy metric data and corresponding accumulated residual errors;
computing a pulse wave model based on changes in averages of metric data in two sliding adjacent time windows of the sequence of non-trendy metric data;
computing two or more seasonal models for the sequence of non-trendy metric data for two or more sample rates applied to the sequence of non-trendy metric data;
when a forecast request is received,
computing a sequence of forecasted metric data over a forecast interval based on the pulse wave model when the sequence of non-trendy metric data is a pulse wave,
computing the sequence of forecasted metric data over the forecast interval based on the seasonal model when the sequence of non-trendy metric data is seasonal, or
when the sequence of non-trendy metric data is not a pulse wave and not seasonal, computing the sequence of forecasted metric data over the forecast interval based on a stochastic process model of the stochastic process models with a smallest of the corresponding accumulated residual errors; and
adjusting usage of the resource by virtual objects of the distributed computing system based on the sequence of forecasted metric data.

16. The medium of claim 15 wherein detrending the sequence of metric data to obtain the sequence of non-trendy metric data comprises:
applying linear regression to the sequence of metric data to generate least squares parameters;

computing a trend estimate for each time stamp of the sequence of metric data based on the least squares parameters;

computing a goodness-of-fit parameter based the sequence of metric data and a trend estimate at each time stamp of the sequence of metric data; and when the goodness-of-fit parameter is greater than a user-defined trend threshold, subtracting the trend estimate from corresponding metric data values in the sequence of metric data to generate the sequence of non-trendy metric data.

17. The medium of claim 15 wherein computing the stochastic process models comprises:

fitting weight parameters of each of the stochastic process models to a different number of most recent subsequence of metric data in the sequence of non-trendy metric data;

when a new metric data value is received, detrending new metric data value to obtain a non-trendy metric data value and computing estimated non-trendy metric data values from the stochastic process models;

for each of the stochastic process models, computing a residual error between the estimated non-trendy metric data value and the new non-trendy metric data value; and for each of the stochastic process models, summing the residual errors to generate the corresponding accumulated residual error.

18. The medium of claim 15 wherein computing the pulse wave model comprises:

computing an exponentially weighted moving average of absolute differences between consecutive pairs of the sequence of non-trendy metric data;

computing an absolute difference between a new non-trendy metric data value and a most recent metric data value in the sequence of non-trendy metric data;

when the absolute difference between the new non-trendy metric data value and the most recent metric data value is greater than a spike threshold, applying edge detection to determine if the sequence of non-trendy metric data is a pulse wave based on the two sliding adjacent windows; and if the sequence of non-trendy metric data is a pulse wave, determining the pulse width and a period of the sequence of non-trendy metric data.

19. The medium of claim 18 wherein applying edge detection to determine if the sequence of non-trendy metric data is a pulse wave comprises:

applying a smoothing filter to the sequence of non-trendy metric data;

for each location of the previous and next sliding windows, computing an average of metric data values in the previous time window, computing an average of metric data values in the next time window, computing a change parameter as an absolute difference between the average of metric data values in the previous time window and the average of metric data values in the previous time window, when the change parameter is greater than a maximum amplitude range of metric data values threshold and is greater than a change parameter exponentially weighted moving average threshold, determining a time stamp of a pulse edge in a time interval of the previous and next sliding windows, and identifying pulse edge as upward or downward;

determining each pulse width as a difference between different pairs of consecutive upward and downward edges;

determining each period as a difference between different pairs of consecutive upward edges;

recording counts of the pulse widths and periods in bins of corresponding back-sliding pulse width and period histograms; and identifying the most recent pulse width and most recent period with counts in corresponding bins of the pulse width and period histograms that are greater than corresponding histogram thresholds.

20. The medium of claim 15 wherein computing the two or more seasonal model for the sequence of non-trendy metric data comprises:

for each of the two or more sampling rates applied to the sequence of non-trendy metric data, resampling the sequence of non-trendy metric data at a sampling rate to obtain a subsequence of the non-trendy metric data, computing a periodogram of the subsequence, identifying each frequency of the periodogram that is greater than a principle frequency threshold as a candidate principle frequency, computing autocorrelation function values in a neighborhood of a candidate period, the candidate period corresponding to a largest of the principle candidate frequencies, estimating curvature of the autocorrelation function in the neighborhood of the candidate period, when the estimated curvature of the autocorrelation function is concave down, determining a principle period that corresponds to a maximum of the autocorrelation function value in the neighborhood, otherwise, identifying the subsequence as not having a principle period, and recording counts of principle frequencies in a back-sliding principle frequency histogram, rank ordering counts of principle frequencies; and when a largest count is greater than a dominant principle frequency threshold computed as a function of the second largest count, the principle period of the principle frequency with the largest count is used as the seasonal period of the sequence of non-trendy metric data.

21. The medium of claim 15 wherein adjusting usage of the resource by virtual objects comprises one or more of adjusting use of the resource by the virtual objects when the sequence of forecasted metric data approaches a resource threshold limit over the forecast interval;

increasing resource allocation to the virtual objects when the sequence of forecasted metric data approaches a resource threshold limit over the forecast interval; and migrating virtual objects to a different server computer within the distributed computing system when the sequence of forecasted metric data approaches a resource threshold limit over the forecast interval.

* * * * *